(12) United States Patent
Wang

(10) Patent No.: US 9,161,039 B2
(45) Date of Patent: Oct. 13, 2015

(54) BITSTREAM PROPERTIES IN VIDEO CODING

(71) Applicant: QUALCOMM Incorporated, San Diego, CA (US)

(72) Inventor: Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 262 days.

(21) Appl. No.: 14/034,172

(22) Filed: Sep. 23, 2013

(65) Prior Publication Data

US 2014/0086333 A1 Mar. 27, 2014

Related U.S. Application Data

(60) Provisional application No. 61/705,047, filed on Sep. 24, 2012, provisional application No. 61/707,612, filed on Sep. 28, 2012.

(51) Int. Cl.
| | |
|---|---|
| *H04N 7/12* | (2006.01) |
| *H04N 19/70* | (2014.01) |
| *H04N 21/235* | (2011.01) |
| *H04N 21/435* | (2011.01) |
| *H04N 21/845* | (2011.01) |
| *H04N 21/854* | (2011.01) |
| *H04N 21/2381* | (2011.01) |

(52) U.S. Cl.
CPC ......... *H04N 19/00884* (2013.01); *H04N 19/70* (2013.01); *H04N 21/235* (2013.01); *H04N 21/435* (2013.01); *H04N 21/8451* (2013.01); *H04N 21/85406* (2013.01); *H04N 21/2381* (2013.01)

(58) Field of Classification Search
CPC ............ H04N 19/00884; H04N 19/70; H04N 21/8451; H04N 21/85406; H04N 21/235; H04N 21/435; H04N 21/2381
USPC ........................................ 375/240.25, 240.18
See application file for complete search history.

(56) References Cited

U.S. PATENT DOCUMENTS

| | | |
|---|---|---|
| 2008/0253467 A1 | 10/2008 | Wang et al. |
| 2012/0023249 A1 | 1/2012 | Chen et al. |
| 2012/0163469 A1* | 6/2012 | Kim et al. ................ 375/240.18 |
| 2012/0201521 A1 | 8/2012 | Froejdh et al. |
| 2013/0003864 A1 | 1/2013 | Sullivan |
| 2013/0266077 A1* | 10/2013 | Boyce et al. ............. 375/240.25 |

FOREIGN PATENT DOCUMENTS

WO 2013030458 A1 3/2013

OTHER PUBLICATIONS

Bross et al., "High efficiency video coding (HEVC) text specification draft 10 (For FDIS & Last Call)," 12th Meeting: Geneva, CH, Jan. 14-23, 2013, JCTVC-L1003_v34, 310 pp.

(Continued)

*Primary Examiner* — Allen Wong
(74) *Attorney, Agent, or Firm* — Shumaker & Sieffert, P.A.

(57) ABSTRACT

A device signals a property of a bitstream. The bitstream comprises a plurality of coded video sequences (CVSs). When the property has a particular value, all the CVSs of the bitstream conform to the same profile. A video processing device is able to determine, based on the property, whether to process the bitstream.

51 Claims, 7 Drawing Sheets

(56) References Cited

OTHER PUBLICATIONS

Bross et al., "High efficiency video coding (HEVC) text specification draft 7," 9th Meeting: Geneva, CH, Apr. 27-May 7, 2012, JCTVC-I1003_d2, 290 pp.
Bross, et al., "High Efficiency Video Coding (HEVC) text specification draft 8", JCT-VC Meeting; MPEG Meeting; Jul. 11-20, 2012; Stockholm; (Joint Collaborative Team on Video Coding of ISO/IEC JTC1/SC29/WG11 and ITU-T SG.16 ); URL: http://wftp3.itu.int/av-arch/jctvc-site/ No. JCTVC-J1003_d7, XP030112947, 261 pp.
Bross et al., "High efficiency video coding (HEVC) text specification draft 8," 10th Meeting: Stockholm, SE, Jul. 11-20, 2012, JCTVC-J1003_d7, 261 pp.
Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.
Bross et al., "High efficiency video coding (HEVC) text specification draft 9," 11th Meeting: Shanghai, CN, Oct. 10-19, 2012, JCTVC-K1003_v7, 290 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 21-30, 2011, JCTVC-G1103_d2, 214 pp.
Chen, et al., "AHG10: Video parameter set for HEVC base specification", JCT-VC Meeting; MPEG Meeting; Jul. 11-20, 2012; Stockholm; (Joint Collaborative Team on Video Coding of ISO/IEC JTC1/SC29/WG11 and ITU-T SG.16 ); URL: URL:http://witp3.itu.int/AV-ARCH/JCTVC-SITE/, No. JCTVC-J0114, XP030112476, 15 pp.
Singer, et al., "ISO/IEC 14496-15/FDIS, International Organization for Standardization Organization Internationale De Normalization ISO/IEC JTC1/SC29/WG11 Coding of Moving Pictures and Audio", ISO/IEC 2003, Aug. 11, 2003, 34 pp.
International Search Report and Written Opinion from International Application No. PCT/US2013/061337, dated Jan. 22, 2014, 26 pp.
International Standard ISO/IEC 14496-12, Information Technology—Coding of audio-visual objects—Part 12: ISO base media file format, Third Edition, Oct. 15, 2008, 120 pp.
ITU-T H 264: "ITU-T Recommendation H.264: Advanced video coding for generic audiovisual services", Internet Citation, Mar. 1, 2005, XP008095420, Retrieved from the Internet: URL:www.itu.int/rec/T-REC-H.264/en.
ITU-T H.261, "Video CODEC for Audiovisual Services at p×64 kbit/s", Line Transmission of Non-telephone Signals, Nr:H.261, Mar. 1993, XP30001504, ISSN 0000-0511, 28 pp.
ITU-T H.262, "Information Technology—Generic Coding of Moving Pictures and Associated Audio Information: Video", Series H: Audiovisual and Multimedia Systems, Infrastructure of Audiovisual Services—Coding of Moving Video, Feb. 2000, 220 pp.
ITU-T H.263, "Video Coding for Low Bit Rate Communication", Series H: Audiovisual and Multimedia Systems, Infrastructure of audiovisual services—Coding of moving video, Jan. 2005, 226 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
"Part 14: MP4 file format," Information technology—Coding of audio-visual objects, ISO/IEC 14496-14, Nov. 15, 2003, 18 pp.
Wang, et al., "AHG9: Signalling of bitstream and elementary stream properties", JCT-VC Meeting; MPEG Meeting; Oct. 10-19, 2012; Shanghai; (Joint Collaborative Team on Video Coding of ISO/IEC JTC1/SC29/WG11 and ITU-T SG.16); URL:http://wtfp3.itu.int/av-arch/jctvc-site/, No. JCTVC-K0127, XP030113009.
Wang, et al., "RTP Payload Format for H.264 Video", Draft-IETF-AVT-RTP-RFC3984BIS-05.TXT, Internet Engineering Task Force (IETF), Standardworkingdraft, Internet Society (ISOC) 4, Rue Des Falaises CH—1205 Geneva, Switzerland, vol. avt, No. 5, Apr. 22, 2009, XP015062176.
Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
International Preliminary Report on Patentability from International Application No. PCT/US2013/061337, dated Sep. 3, 2014, 27 pp.
Wang, et al., "RTP Payload Format for H.264 Video," Internet Engineering Task Force, RFC 6184, May 2011, 101 pp.
Wenger, et al., "RTP Payload Format for Scalable Video Coding," Internet Engineering Task Force, RFC 6190, May 2011, 100 pp.
Gellens, et al., "The 'Codecs' and 'Profiles' Parameters for "Bucket" Media Types," Internet Engineering Task Force, RFC 6381, Aug. 2011, 19 pp.

\* cited by examiner

BITSTREAM PROPERTIES IN VIDEO CODING

This application claims the benefit of U.S. Provisional Patent Application No. 61/705,047, filed Sep. 24, 2012, and U.S. Provisional Patent Application No. 61/707,612, filed Sep. 28, 2012, the entire content of each of which is incorporated herein by reference.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

A multiview coding bitstream may be generated by encoding views, e.g., from multiple perspectives. Some three-dimensional (3D) video standards have been developed that make use of multiview coding aspects. For example, different views may transmit left and right eye views to support 3D video. Alternatively, some 3D video coding processes may apply so-called multiview plus depth coding. In multiview plus depth coding, a 3D video bitstream may contain not only texture view components, but also depth view components. For example, each view may comprise one texture view component and one depth view component.

SUMMARY

In general, this disclosure describes techniques for signaling bitstream properties and elementary stream properties in video encoding, decoding, storage, and application systems. In some examples, a device signals a property of a bitstream. The bitstream comprises a plurality of coded video sequences (CVSs). When the property has a particular value, all the CVSs of the bitstream conform to the same profile. A video processing device may determine, based on the property, whether to process (e.g., decode) the bitstream.

In one example, this disclosure describes a method of processing video data, the method comprising: determining, based on a signaled property of a bitstream that comprises an encoded representation of the video data, whether a video decoder is able to decode the bitstream, wherein the bitstream conforms to a video coding specification and comprises a plurality of CVSs and when the signaled property has a particular value, all the CVSs of the bitstream conform to the same profile, the profile being a subset of an entire bitstream syntax that is specified by the video coding specification; and processing, based on the determination, the bitstream.

In another example, this disclosure describes a method of processing video data, the method comprising: signaling a property of a bitstream, wherein the bitstream conforms to a video coding specification and comprises a plurality of CVSs, wherein when the property has a particular value, all the CVSs of the bitstream conform to the same profile, the profile being a subset of an entire bitstream syntax that is specified by the video coding specification.

In another example, this disclosure describes a video processing device comprising one or more processors configured to: determine, based on a signaled property of a bitstream that comprises an encoded representation of video data, whether a video decoder is able to decode the bitstream, wherein the bitstream conforms to a video coding specification and comprises a plurality of CVSs and when the signaled property has a particular value, all the CVSs of the bitstream conform to the same profile, the profile being a subset of an entire bitstream syntax that is specified by the video coding specification; and process, based on the determination, the bitstream.

In another example, this disclosure describes a video processing device comprising one or more processors configured to: signal a property of a bitstream, wherein the bitstream conforms to a video coding specification and conforms to a video coding specification and comprises a plurality of CVSs, wherein when the property has a particular value, all the CVSs of the bitstream conform to the same profile, the profile being a subset of an entire bitstream syntax that is specified by the video coding specification.

In another example, this disclosure describes a video decoding device comprising: means for determining, based on a signaled property of a bitstream that comprises an encoded representation of video data, whether a video decoder is able to decode the bitstream, wherein the bitstream conforms to a video coding specification and comprises a plurality of CVSs and when the signaled property has a particular value, all the CVSs of the bitstream conform to the same profile, the profile being a subset of an entire bitstream syntax that is specified by the video coding specification; and means for processing, based on the determination, the bitstream.

In another example, this disclosure describes a video processing device comprising: means for signaling a property of a bitstream, wherein the bitstream conforms to a video coding specification and conforms to a video coding specification and comprises a plurality of CVSs, wherein when the property has a particular value, all the CVSs of the bitstream conform to the same profile, the profile being a subset of an entire bitstream syntax that is specified by the video coding specification.

A non-transitory computer-readable data storage medium having instructions stored thereon that, when executed, configure a video decoder to: determine, based on a signaled property of a bitstream that comprises an encoded representation of video data, whether a video decoder is able to decode the bitstream, wherein the bitstream conforms to a video coding specification and comprises a plurality of CVSs and when the signaled property has a particular value, all the CVSs of the bitstream conform to the same profile, the profile being a subset of an entire bitstream syntax that is specified by the video coding specification; and process, based on the determination, the bitstream.

A non-transitory computer-readable data storage medium having instructions stored thereon that, when executed, configure a video processing device to: signal a property of a bitstream, wherein the bitstream conforms to a video coding specification and comprises a plurality of CVSs, wherein when the property has a particular value, all the CVSs of the bitstream conform to the same profile, the profile being a subset of an entire bitstream syntax that is specified by the video coding specification.

The details of one or more examples of the disclosure are set forth in the accompanying drawings and the description below. Other features, objects, and advantages will be apparent from the description, drawings, and claims.

DETAILED DESCRIPTION

Figure 1:
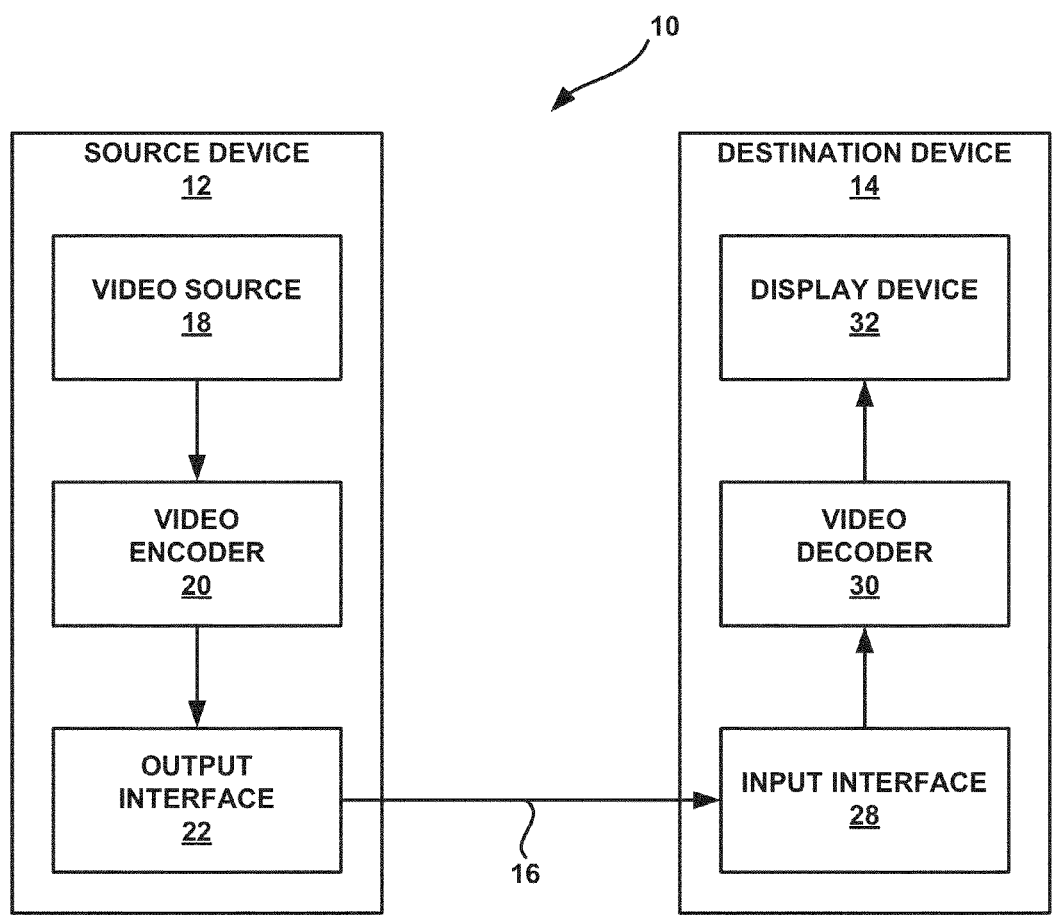
FIG. 1 is a block diagram illustrating an example video coding system that may utilize the techniques described in this disclosure.

A bitstream may comprise a sequence of bits that forms a representation of coded pictures and associated data forming one or more coded video sequences (CVSs). An elementary stream may comprise a sequence of one or more bitstreams. A coded picture may comprise a coded representation of a picture containing all coding tree units of the picture. A coding tree unit (CTU) may comprise a coding tree block (CTB) of luma samples and two corresponding CTBs of chroma samples and syntax structures used to code the samples. A CVS may comprise a sequence of access units. Each of the access units may comprise a set of coded pictures associated with the same time instance.

Profiles, tiers, and levels specify restrictions on bitstreams and hence limits on the capabilities needed to decode the bitstreams. Profiles, tiers and levels may also be used to indicate interoperability points between individual decoder implementations. A profile may be a subset of the entire bitstream syntax that is specified by a video coding specification (e.g., HEVC). For instance, each profile may specify a subset of algorithmic features and limits that shall be supported by all decoders conforming to that profile. Video encoders are not required to make use of all features supported in a profile.

Each level of a tier may specify a set of limits on the values that may be taken by the syntax elements. The same set of tier and level definitions is used with all profiles, but individual implementations may support different tiers and within a tier different levels for each supported profile. For any given profile, a level of a tier may generally correspond to a particular decoder processing load and memory capability. Capabilities of video decoders may be specified in terms of the ability to decode video streams conforming to the constraints of profiles, tiers and levels. For each such profile, the tier, and level supported for that profile may be also be expressed. Some video decoders may not be able to decode particular profiles, tiers, or levels.

A bitstream may contain multiple CVSs that are associated with different profiles. Thus, given a bitstream, simply inspecting the profile information included in an active sequence parameter set (SPS) for a first CVS of the bitstream may not be sufficient to know whether a video decoder conforming to a particular profile is able to decode the entire bitstream. To ensure that a video decoder can decode an entire bitstream, the video decoder may need to inspect all CVSs in the bitstream to determine whether all the CVSs conform to a profile that the video decoder is able to decode. Such inspection may not be simple because virtually all network abstraction layer (NAL) units in the bitstream may have to be checked to identify all the active SPSs.

Some example techniques of this disclosure may solve the previously-mentioned problems in bitstreams by signaling properties of the bitstream in the bitstream. A video decoder may use the signaled properties of the bitstream to determine whether the video decoder is able to decode the bitstream. Thus, the video decoder may not need to inspect all parameter sets (e.g. video parameter sets (VPSs), SPSs, picture parameter sets (PPSs), etc.) in the bitstream to determine which parameter sets are active during decoding of the bitstream.

In some techniques of this disclosure, a video encoder (or other video processing device) may signal a property of a bitstream. The bitstream comprises a plurality of CVSs. When this signaled property of the bitstream has a particular value, all the CVSs of the bitstream conform to the same profile. A video processing device may be able to determine, based on the property, whether to process (e.g. decode) the bitstream. For example, the video encoder (or other video processing device) may signal bitstream properties of a bitstream in a bitstream properties Supplemental Enhancement Information (SEI) message. SEI messages may include metadata that is not required for correct decoding of the sample values of pictures. The bitstream properties SEI message may provide information for the entire bitstream containing the SEI message. For example, each SPS of the bitstream may include a profile indicator syntax element that indicates a profile to which the applicable CVS for the SPS conforms. In this example, a particular syntax element in the bitstream properties SEI message having a particular value (e.g., 1) indicates that the values of the profile indicator syntax elements are identical for all SPSs that are activated when the bitstream is decoded.

An elementary stream may comprise a sequence of one or more bitstreams. The techniques of this disclosure may solve similar problems with regard to elementary streams. That is, a video decoder may be unable to determine whether the video decoder is able to decode an elementary stream without parsing each CVS of the elementary stream to determine which parameter sets are active during decoding of the elementary stream. The techniques of this disclosure may overcome this problem by signaling properties of an elementary stream in the elementary stream. In accordance with some such techniques of this disclosure, a video encoder (or other video processing device) may signal a property of an elementary stream. The elementary stream comprises one or more bitstreams, each of which includes one or more CVSs. When the property has a particular value, all the CVSs of the elementary stream conform to the same profile. A video processing device may be able to determine, based on the property, whether to process the elementary stream.

For example, the video processing device may generate an elementary stream properties (ESP) SEI message to signal elementary stream level properties. The ESP SEI message provides information for the entire elementary stream containing the ESP SEI message. For example, each SPS of an elementary stream may include a profile indicator syntax element that indicates a profile to which the applicable CVS for the SPS conforms. In this example, a particular syntax element in the ESP SEI message having a particular value (e.g., 1) indicates that the values of the profile indicator syntax elements are identical for all SPSs that are activated when the elementary stream is decoded.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium, e.g. via disk access or card access. The storage medium may include a variety of locally-accessed data storage media such as Blu-ray discs, DVDs. CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., digital subscriber line (DSL), cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Video decoder 30 may decode encoded video data. Display device 32 may display the decoded video data. Display device 32 may be integrated with or may be external to destination device 14. Display device 32 may comprise a variety of display devices, such as a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information to another device, such as video decoder 30. The term "signaling" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

In some examples, video encoder 20 and video decoder 30 operate according to a video compression standard, such as International Organization for Standardization (ISO)/IEC MPEG-4 Visual and ITU-T H.264 (also known as ISO/IEC MPEG-4 AVC), including its Scalable Video Coding (SVC) extension, Multiview Video Coding (MVC) extension, and MVC-based three-dimensional video (3DV) extension. In some instances, any bitstream conforming to the MVC-based 3DV extension of H.264/AVC always contains a sub-bitstream that is compliant to the MVC extension of H.264/AVC. Furthermore, video encoder 20 and video decoder 30 may operate according to a 3DV coding extension to H.264/AVC (i.e., AVC-based 3DV) that is currently under development. In other examples, video encoder 20 and video decoder 30 may operate according to International Telecommunication Union Telecommunication Standardization Sector (ITU-T) H.261, International Organization for Standardization (ISO)/International Electrotechnical Commission (IEC) Moving Picture Experts Group (MPEG)-1 Visual, ITU-T H.262 or ISO/IEC MPEG-2 Visual, and ITU-T H.264, ISO/IEC Visual.

In other examples, video encoder 20 and video decoder 30 may operate according to the High Efficiency Video Coding (HEVC) developed by the Joint Collaboration Team on Video Coding (JCT-VC) of ITU-T Video Coding Experts Group (VCEG) and ISO/IEC Motion Picture Experts Group (MPEG). A draft of the HEVC standard, referred to as "HEVC Working Draft 8" is described in Bross et al., "High Efficiency Video Coding (HEVC) text specification draft 8," Joint Collaborative Team on Video Coding (JCT-VC) of ITU-T SG16 WP3 and ISO/IEC JTC1/SC29/WG11, $10^{th}$ Meeting, Stockholm, Sweden, July 2012, which as of Sep. 3, 2013, is available from http://phenix.int-evry.fr/jct/doc_en-d_useridocuments/10_Stockholm/wg11/JCTVC-J1003-v8.zip. Furthermore, video encoder 20 and video decoder 30 may operate according to scalable video coding, multi-view coding, and 3DV extensions for HEVC that are currently under development. The scalable video coding extension of HEVC may be referred to as SHEVC. The 3DV extension of HEVC may be referred to as HEVC-based 3DV or 3D-HEVC.

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU. In this disclosure, the phrase "based on" may indicate "based at least in part on." If video encoder 20 uses inter prediction to generate the predictive blocks of a PU, video encoder 20 may generate the predictive blocks of the PU based on decoded samples of one or more pictures other than the picture associated with the PU.

To support inter prediction, video encoder 20 may generate one or more reference picture lists. These reference picture lists may be referred to as RefPicList0 and RefPicList1. In some examples, video encoder 20 may generate different reference picture lists for different pictures or different slices of pictures. Hence, different PUs of different pictures and/or slices may be associated with different versions of RefPicList0 and RefPicList1.

Furthermore, when video encoder 20 uses inter prediction to generate a predictive block of a PU, the video encoder may signal motion information for the PU. The motion information may include a reference index for the PU and a motion vector for the PU. The reference index for the PU may indicate a position, within one of the reference picture lists associated with the PU, of a reference picture. The motion vector for the PU may indicate a spatial displacement between a prediction block of the PU and a reference location in the reference picture. Video encoder 20 may use samples of the reference picture associated with the reference location to generate a predictive block for the PU. Because the PU may be associated with two reference pictures, the PU may have two reference indexes and two motion vectors. Hence, a PU may have a RefPicList0 reference index and a RefPicList1 reference index. The PU's RefPicList0 reference index indicates a reference picture in the PU's version of RefPicList0. The PU's RefPicList1 reference index indicates a reference picture in the PU's version of RefPicList1. Similarly, the PU may have a RefPicList0 motion vector and a RefPicList1 motion vector. The PU's RefPicList0 motion vector may indicate a reference location in a reference picture in the PU's version of RefPicList0. The PU's RefPicList1 motion vector may indicate a reference location in a reference picture in the PU's version of RefPicList1.

Video encoder 20 may signal a PU's reference indexes and motion vectors in a bitstream. In other words, video encoder 20 may include, in the bitstream, data that indicate the PU's reference indexes and motion vectors. Video decoder 30 may reconstruct the PU's versions of RefPicList0 and/or RefPicList1 and may use the PU's reference indexes and motion vectors to determine one or more predictive blocks for the PU. Video decoder 30 may use the predictive blocks for the PU, along with residual data, to decode samples.

After video encoder 20 generates predictive luma blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block may be a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The term "bitstream" may be a collective term used to refer to either a Network Abstraction Layer (NAL) unit stream (e.g., a sequence of NAL units) or a byte stream (e.g., an encapsulation of a NAL unit stream containing start code prefixes and NAL units as specified by Annex B of the HEVC standard). A NAL unit is a syntax structure containing an indication of the type of data in the NAL unit and bytes containing that data in the form of a raw byte sequence payload (RBSP) interspersed as necessary with emulation prevention bits. Each of the NAL units may include a NAL unit header and may encapsulate an RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for SEI, and so on. NAL units that encapsulate RBSPs for video coding data (as opposed to RBSPs for parameter sets and SEI messages) may be referred to as video coding layer (VCL) NAL units. NAL units that contain parameter sets (e.g., VPSs, SPSs, PPSs, etc.) may be referred to as parameter set NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use motion vectors of PUs to determine predictive blocks for the PUs of a current CU. In addition, video decoder 30 may inverse quantize coefficient blocks associated with TUs of the current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In multi-view coding, there may be multiple views of the same scene from different viewpoints. In the context of multi-view coding, the term "access unit" may be used to refer to the set of pictures that correspond to the same time instance. Thus, video data may be conceptualized as a series of access units occurring over time. A "view component" may be a coded representation of a view in a single access unit. In this disclosure, a "view" may refer to a sequence of view components associated with the same view identifier. In some examples, a view component may be a texture view component (i.e. a texture picture) or a depth view component (i.e., a depth picture).

Multi-view coding supports inter-view prediction. Inter-view prediction is similar to the inter prediction used in HEVC and may use the same syntax elements. However, when a video coder performs inter-view prediction on a current video unit (such as a PU), video encoder 20 may use, as a reference picture, a picture that is in the same access unit as the current video unit, but in a different view. In contrast, conventional inter prediction only uses pictures in different access units as reference pictures.

In multi-view coding, a view may be referred to as a "base view" if a video decoder (e.g., video decoder 30) can decode pictures in the view without reference to pictures in any other view. When coding a picture in one of the non-base views, a video coder (such as video encoder 20 or video decoder 30) may add a picture into a reference picture list if the picture is in a different view but within a same time instance (i.e., access unit) as the picture that the video coder is currently coding. Like other inter prediction reference pictures, the video coder may insert an inter-view prediction reference picture at any position of a reference picture list.

For instance, NAL units may include headers (i.e., NAL unit headers) and payloads (e.g. RBSPs). The NAL unit headers may include nuh_reserved_zero_6 bits syntax elements. NAL units that have nuh_reserved_zero_6 bit syntax elements that specify different values belong to different "layers" of a bitstream. Thus, in multi-view coding, 3DV, or SVC, the nuh_reserved_zero_6 bits syntax element of the NAL unit specifies a layer identifier (i.e., a layer ID) of the NAL unit. The nuh_reserved_zero_6 bits syntax element of a NAL unit is equal to 0 if the NAL unit relates to a base layer in multi-view coding, 3DV coding, or SVC. Data in a base layer of a bitstream may be decoded without reference to data in any other layer of the bitstream. If the NAL unit does not relate to a base layer in multi-view coding, 3DV, or SVC, the nuh_reserved_zero_6 bits syntax element may have a non-zero value. In multi-view coding and 3DV coding, different layers of a bitstream may correspond to different views. In SVC, layers other than the base layer may be referred to as "enhancement layers" and may provide information that enhances the visual quality of video data decoded from the bitstream.

Furthermore, some pictures within a layer may be decoded without reference to other pictures within the same layer. Thus, NAL units encapsulating data of certain pictures of a layer may be removed from the bitstream without affecting the decodability of other pictures in the layer. Removing NAL units encapsulating data of such pictures may reduce the frame rate of the bitstream. A subset of pictures within a layer that may be decoded without reference to other pictures within the layer may be referred to herein as a "sub-layer" or a "temporal sub-layer."

NAL units may include temporal_id syntax elements. The temporal_id syntax element of a NAL unit specifies a temporal identifier of the NAL unit. The temporal identifier of a NAL unit identifies a sub-layer with which the NAL unit is associated. Thus, each sub-layer of a bitstream may be associated with a different temporal identifier. If the temporal identifier of a first NAL unit is less than the temporal identifier of a second NAL unit, the data encapsulated by the first NAL unit may be decoded without reference to the data encapsulated by the second NAL unit.

A bitstream may be associated with a plurality of operation points. Each operation point of a bitstream is associated with a set of layer identifiers (i.e., a set of nuh_reserved_zero_6 bits values) and a temporal identifier. The set of layer identifiers may be denoted as OpLayerIdSet and the temporal identifier may be denoted as TemporalID. If a NAL unit's layer identifier is in an operation point's set of layer identifiers and the NAL unit's temporal identifier is less than or equal to the operation point's temporal identifier, the NAL unit is associated with the operation point. An operation point representation is a bitstream subset that is associated with an operation point. The operation point representation may include each NAL unit that is associated with the operation point. In some examples, the operation point representation does not include VCL NAL units that are not associated with the operation point.

A media aware network element (MANE) may apply bitstream thinning to an HEVC bitstream that is encoded with multiple sub-layers. At any point in the bitstream a MANE can start removing NAL units of higher sub-layers (i.e., sub-layers associated with higher temporal identifiers) based on the fact that the pictures in the lower sub-layers (i.e., sub-layers associated with lower temporal identifiers) are still decodable because the decoding process for the pictures in the lower sub-layers does not depend on the NAL units of the higher sub-layers. The action of removing all NAL units with temporal identifiers higher than a certain value can be referred to as temporal down-switching. Temporal down-switching may always be possible.

The term "temporal up-switching" may refer to the action of starting to forward NAL units of a certain sub-layer that has not been forwarded up until that point. Temporal up-switching may only be possible if none of the pictures in the layer that is switched to depend on any picture in the same sub-layer prior to the point in the bitstream at which the switch was performed. Thus, the term "temporal sub-layer switching point" may refer to a picture that has no dependency on any other picture that is in the same sub-layer as the picture and that precedes the picture in decoding order.

In the scalable video coding extension of the H.264/AVC video coding standard (i.e., H.264/SVC), temporal sub-layer switching points can be indicated through temporal_id_nesting_flag syntax elements in SPSs. For instance, if a temporal_id_nesting_flag syntax element in a SPS applicable to a particular CVS is equal to 1, all pictures in the CVS with temporal identifiers greater than 0 may be temporal layer switching points. Furthermore, in H.264/SVC, temporal level switching point SEI messages may indicate temporal sub-layer switching points. In some examples where temporal level switching point SEI messages indicate temporal sub-layer switching points, a temporal level switching point SEI message may contain information about the length of time for which a temporal layer M should have been decoded prior to a switch point in order to switch up to temporal layer M+1 at the switch point.

In HEVC, as in H.264/SVC, a SPS may include a sps_temporal_id_nesting_flag syntax element. When the sps_temporal_id_nesting_flag syntax element has a value equal to 1, all pictures with temporal identifiers greater than 0 are sub-layer switching points. In HEVC, there may be two picture types associated with sub-layer switching points, namely the temporal sub-layer access (TSA) picture type and the step-wise temporal sub-layer access (STSA) picture type. The TSA and STSA picture types can be used to indicate temporal sub-layer switching points.

A TSA picture and pictures following the TSA picture in decoding order do not use pictures with TemporalId equal to or greater than that of the TSA picture for inter prediction reference. A TSA picture enables up-switching, at the TSA picture, to the sub-layer containing the TSA picture or any higher sub-layer, from the immediately lower sub-layer. In some examples, all TSA pictures have temporal identifiers greater than 0.

An STSA picture does not use pictures with the same TemporalId as the STSA picture for inter prediction reference. Pictures following an STSA picture in decoding order with the same temporal identifier as the STSA picture do not use pictures prior to the STSA picture in decoding order with the same temporal identifier as the STSA picture for inter prediction reference. An STSA picture enables up-switching, at the STSA picture, to the sub-layer containing the STSA picture, from the immediately lower sub-layer. In some examples, all STSA pictures have temporal identifiers greater than 0. Thus, in contrast to a TSA picture, an STSA picture does not necessarily enable up-switching to any higher sub-layer. Rather, an STSA picture may only enable up-switching to the sub-layer containing the STSA picture.

HEVC inherits the concept of parameter sets from H.264/AVC. However, HEVC provides for several modifications and additions to the parameters sets of H.264/AVC. The modifications and additions to the parameter sets of H.2641AVC provided in HEVC can be categorized into three groups: (1) additions and modification made necessary by different coding tools of HEVC when compared to H.264/AVC, (2) additions and modifications resulting from operational experience with H.264/AVC, and (3) the Video Parameter Set (VPS) introduced in HEVC.

As indicated above, a picture may be partitioned into multiple segments (e.g., slices). Partitioning a picture into multiple segments and transporting the segments in their own transport units may be desirable for maximum transfer unit (MTU) size matching. Each of the slices may be transported in a transport unit (e.g., a packet). In some video coding specifications, the first transport unit of a picture may include data for a first segment of the picture and also a picture header for the picture. Because the picture header may be required to decode all segments of the picture, the loss of the first transport unit of the picture may prevent a video decoder from correctly reconstructing any segment of the picture, and sometimes segments of following pictures, even if transport units containing other segments of the picture are not lost. Moreover, the transport unit containing the first segment of a picture may include a Group-of-Pictures (GOP) header and/or a sequence header. Hence, the loss of the transport unit containing the first segment of the picture may prevent a video decoder from correctly decoding an entire GOP or an entire sequence. Thus, if a picture is partitioned into multiple segments (e.g., slices) and those segments are transported in their own transport unit (e.g., a Real Time Protocol (RTP) packet), the loss of a sequence header or a picture header may have significant impacts on the decoding process. Because of this problem, some decoder implementations would not attempt to decode the received transport units of a picture if a transport unit containing the picture header of the picture was lost.

Parameter sets were introduced in H.264/AVC in response to the effects of the losses of sequence headers and picture headers. To combat this vulnerability, transport layer based mechanisms were introduced. For example, the RTP payload format for H.263, specified in Request for Comments (RFC) 2429, allows for carrying a redundant copy of the picture header in as many packets as the encoder/packetizer chooses. During the design of H.264/AVC, it was recognized that the vulnerability of a picture header is an architectural issue of the video codec itself, rather than a transport problem, and therefore the parameter set concept was introduced as a solution for the issue. Parameter sets can be either part of a video bitstream or can be received by a video decoder through other means (including out-of-band transmission using a reliable channel, hard coding in the video encoder and the video decoder, and so on).

A parameter set may contain an identification that is referenced, directly or indirectly, from a slice header of a slice. The referencing process is known as "activation." Thus, when video decoder 30 is decoding a particular slice, a parameter set referenced, directly or indirectly, by a syntax element in a slice header of the particular slice is said to be "activated." Depending on the parameter set type, the activation may occur on a per picture basis or a per sequence basis. The concept of activation through referencing was introduced, among other reasons, because implicit activation by virtue of the position of the information in the bitstream (as is common for other syntax elements of a video codec) may not available in case of out-of-band transmission of parameter sets.

Furthermore, the VPS was introduced in HEVC to convey information that is applicable to multiple layers as well as sub-layers. No version of H.264/AVC contains a parameter set comparable to a VPS. Because H.264/AVC does not contain a parameter set comparable to a VPS, a complex modeling of the layering structure for purposes such as capability exchange and session negotiation may be required. In the SVC extension of H.264/AVC, a scalability information SEI message may offer approximately the same content as a VPS, but by its nature of being an SEI message, most of the same information is repeated in sequence parameter sets (SPSs). In some applications, the SPSs also need to be transmitted out-of-band. Consequently, the lack of a VPS in H.264/AVC may cause increased initial delay, particularly when retransmission is involved, to guarantee reliability in out-of-band transmission. In cases of broadcast and multicast with in-band transmission of parameter sets, repeating of the same information can be significant overhead as parameter sets may need to be repeated at each random access point for tuning in and channel switching. The VPS was introduced to address these shortcomings as well as to enable a clean and extensible high-level design of multi-layer codecs.

A video sequence of a bitstream may have multiple layers. The layers may be associated with the same or different SPSs. However, each layer of the video sequence may refer to the same VPS, regardless of whether the layers are associated with the same SPS or different SPSs. The VPS may convey information including:

(1) common syntax elements shared by multiple layers or operation points. Conveying common syntax elements shared by multiple layers or operation points in a VPS may avoid unnecessary duplications of such syntax elements;

(2) information of operation points needed for session negotiation, such as profile information and level information; and (3) other operation point specific information that does not belong to one SPS, such as Hypothetical Reference Decoder (HRD) parameters for layers or sub-layers.

Video decoder 30 may parse a bitstream to obtain information (e.g. syntax elements) from the bitstream. In some examples, the parsing of information of each operation point does not require video decoder 30 to perform entropy coding (e.g., CABAC, context-adaptive variable length coding (CAVLC), Golomb coding, etc.). Thus, the parsing of information of each operation point may be considered as lightweight for most network elements.

In HEVC, each type of parameter set may contain an extension mechanism. The extension mechanism of a parameter set may allow the parameter set to be extended for future versions and extensions of HEVC without breaking backward compatibility and without creating a parsing dependency to the profile/level information carried in a VPS and/or an SPS. For example, HEVC provides a mechanism for allowing extensions of HEVC (e.g., SHEVC, MV-HEVC, 3D-HEVC, etc.) to include additional syntax elements in VPSs. In other words, HEVC allows for VPS extensions that contain additional syntax elements that are specific to particular extensions of HEVC. In other words, VPS extensions specified in HEVC extensions may contain more syntax elements than those in the VPS specified for the base HEVC specification. Syntax elements in VPS extensions may provide for efficient parameter signaling, flexible and lightweight session negotiation, advanced bitstream adaptation (e.g., bitstream adaptation based on view identifiers in 3D-HEVC), and so on.

According to HEVC Working Draft 8, some information is duplicated between a VPS and SPSs belonging to a layer. This duplication may allow a video decoder that conforms to the first version of the HEVC specification to disregard the VPS NAL unit and still have available all information required to decode the bitstream.

In H.264/AVC and HEVC, SPSs may contain information that applies to all slices of a CVS. In HEVC, a CVS may start from an instantaneous decoding refresh (IDR) picture, or a broken link access (BLA) picture, or a clean random access (CRA) picture that is the first picture in the bitstream, including all subsequent pictures that are not an IDR or BLA picture. That is, in HEVC, a CVS may comprise a sequence of access units that may consist, in decoding order, of a CRA access unit that is the first access unit in the bitstream, an IDR access unit or a BLA access unit, followed by zero or more non-IDR and non-BLA access units including all subsequent access units up to but not including any subsequent IDR or BLA access unit.

A bitstream comprises (and may consist of) one or more CVSs. The content of an SPS can be divided into six categories:

(1) a self-reference (i.e., an identifier of the SPS);

(2) decoder operation point related data (e.g., profile data, level data, picture size data, number sub-layers data, and so on);

(3) flags (or other syntax elements) for enabling particular coding tools that are available within a profile, and coding tool parameters associated with particular coding tools;

(4) information restricting the flexibility of structures and information restricting the flexibility of transform coefficient coding;

(5) temporal scalability control (similar to H.264/SVC); and (6) Visual Usability Information (VUI), which includes HRD information.

A HEVC PPS may contain data that can change from picture to picture. A HEVC PPS may include data roughly comparable to the data included in an H.264/AVC PPS. For example, both HEVC PPSs and H.264/AVC PPSs may include:

(1) a self-reference (e.g., an identifier of the PPS);

(2) initial picture control information such as an initial quantization parameter (QP), a number of flags indicating the use of, or presence of, certain coding tools or control information in slice headers of slices that refer to the PPS; and (3) tiling information.

In HEVC, a slice header may contain data that can change from slice to slice. In addition, a slice header may contain picture-related data that is relatively small or relevant only for particular slice types or particular picture types. The size of a slice header may be larger than the size of a PPS, particularly when the slice header includes tile entry point offsets or wavefront entry point offsets, reference picture sets, prediction weights, or reference picture list modifications are explicitly signaled. The tile entry point offsets of a slice header for a slice may indicate starting positions, within slice data of the slice, of data associated with particular tiles. In general, a tile is an integer number of coding tree blocks co-occurring in one column and one row, ordered consecutively in coding tree block raster scan of the tile. A row may be an integer number of coding tree blocks. Columns are delineated from one another by vertical boundaries that extend from the top boundary to the bottom boundary of the picture and are ordered consecutively from left to right in the picture. Rows are delineated from one another by horizontal boundaries that extend from the left boundary to the right boundary of the picture and are ordered consecutively from top to bottom in the picture. A column may be an integer number of coding tree blocks. The wavefront entry point offsets of a slice header for a slice may indicate starting positions, within slice data of the slice, of data associated with particular wavefronts. Tiles and wavefronts are described elsewhere in this disclosure with regard to FIGS. 4 and 5, respectively.

Activation of parameter sets in HEVC is similar activation of parameter sets in H.264/AVC. In HEVC, a slice header contains a reference to PPS. The PPS, in turn, contains a reference to a SPS. The SPS contains a reference to a VPS. One common implementation strategy for parameter sets is to keep all parameter sets of a given type (e.g., PPS, SPS, and VPS) in tables whose maximum sizes are indirectly specified by the numbering range of the parameter set identifiers. Under this implementation strategy, parameter set activation can be as simple as accessing the PPS tables based on information in a slice header, copying the information found in the PPS tables into relevant decoder data structures, and following the reference in the PPS to the relevant SPS, and following the reference in SPS to the relevant VPS. As these operations may need to be performed only once per picture (in a worst case scenario), the operation may be lightweight. An SPS may also be activated by being referenced in a buffering period SEI message.

Similarly, the handling of a parameter set NAL unit, regardless of the type of the parameter set NAL unit, may also be relatively straightforward. In HEVC, parameter set NAL units do not contain parsing dependencies. In other words, the syntax elements of a parameter set NAL unit may be obtained without reference to syntax elements in any other NAL unit. Because parameter set NAL units do not contain parsing dependencies, parameter set NAL units are self-contained and do not require context derived from other NAL units for parsing. Although maintaining the ability to parse parameter set NAL units independently may cost a few more bits, maintaining the ability to parse parameter set NAL units independently may enable relatively straightforward parsing and storage of parameter sets in their respective table entries for the parameter sets.

Furthermore, HEVC Working Draft 8 includes a specification of an active parameter sets SEI message. The active parameter sets SEI message may include syntax elements that indicate an active VPS and/or an active SPS. The active parameter set SEI message may override the activation process for parameter sets that is based on parameter set identifiers in slice headers, PPSs, SPSs, and VPSs.

A video processing device (e.g., video encoder 20, a MANE, etc.) may splice two or more bitstreams. Bitstream splicing may refer to the concatenation of two or more bitstreams or parts thereof. For example, a first bitstream may be appended by a second bitstream, possibly with some modifications to either one or both of the bitstreams to generate a spliced bitstream. In this example, the first coded picture in the second bitstream may be referred to as a "splicing point." Therefore, pictures occurring after the splicing point in a spliced bitstream originated from the second bitstream while pictures preceding the splicing point in the spliced bitstream originated from the first bitstream.

Bitstream splicers may perform bitstream splicing. In some examples, bitstream splicers are lightweight and may be less sophisticated than video encoders. For example, bitstream splicers may not be equipped with entropy decoding and entropy encoding capabilities.

Bitstream switching may be used in video editing and adaptive streaming environments. A bitstream switching operation at a particular picture in a switched-to bitstream may effectively be a bitstream splicing operation in which the splicing point is the bitstream switching point, i.e., the first picture from the switched-to bitstream.

An elementary stream may comprise a sequence of one or more bitstreams. An elementary stream that comprises two or more bitstreams may be formed by splicing together the two or more bitstreams (or parts thereof). If an elementary stream contains multiple bitstreams, each of the bitstreams except for the last bitstream terminates with an end of bitstream (EOS) NAL unit.

HEVC and other video coding standards provide mechanisms for enabling random access into bitstreams. Random access refers to a decoding of a bitstream starting from a coded picture that is not the first coded picture in the bitstream. Random access to a bitstream may be needed in various video applications, such as broadcasting and streaming. Random access to a bitstream may enable users to tune in to a program at any time, to switch between different channels, to jump to specific parts of a video, or to switch to a different bitstream for stream adaptation (e.g., adaption of a bit rate, adaptation of a frame rate, adaptation of a spatial resolution, etc.). The insertion of random access pictures or random access points into a bitstream at regular intervals may enable random access. Example types of random access pictures include IDR pictures, CRA pictures, and BLA pictures. Hence, IDR pictures, CRA pictures and BLA pictures are collectively referred to as random access point (RAP) pictures.

An IDR picture contains only I slices (i.e., slices in which only intra prediction is used). An IDR picture may be the first picture in the bitstream in decoding order, or may appear later in the bitstream. Each IDR picture is the first picture of a CVS in decoding order. IDR pictures, as specified in HEVC and H.264/AVC, may be used for random access. However, pictures following an IDR picture in decoding order cannot use pictures decoded prior to the IDR picture as reference. Accordingly, bitstreams relying on IDR pictures for random access can have significantly lower coding efficiency and bitstream that use additional types of random access pictures. An IDR access unit is an access unit that contains an IDR picture.

The concept of CRA pictures was introduced in HEVC to allow pictures that follow a CRA picture in decoding order, but precede the CRA picture in output order, to use pictures decoded before the CRA picture for reference. Pictures that follow a CRA picture in decoding order, but precede the CRA picture in output order, are referred to as leading pictures associated with the CRA picture (or leading pictures of the CRA picture). That is, to improve coding efficiency, the concept of CRA pictures was introduced in HEVC to allow pictures that follow a CRA picture in decoding order but precede the CRA picture in output order to use pictures decoded before the CRA picture as reference. A CRA access unit is an access unit in which the coded picture is a CRA picture.

The leading pictures of a CRA picture are correctly decodable if the decoding starts from an IDR picture or CRA picture occurring before the CRA picture in decoding order. However, the leading pictures of a CRA picture may be non-decodable when random access from the CRA picture occurs. Hence, a video decoder typically decodes the leading pictures of a CRA picture during random access decoding. To prevent error propagation from reference pictures that may not be available depending on where the decoding starts, no picture that follows a CRA picture both in decoding order and output order may use any picture that precedes the CRA picture either in decoding order or output order (which includes the leading pictures) as reference.

The concept of a broken link access (BLA) picture was introduced in HEVC after the introduction of CRA pictures and is based on the concept of CRA pictures. A BLA picture typically originates from bitstream splicing at the position of a CRA picture, and in the spliced bitstream the splicing point CRA picture is changed to a BLA picture. An access unit that contains a RAP picture may be referred to herein as a RAP access unit. A BLA access unit is an access unit that contains a BLA picture.

One difference between BLA pictures and CRA pictures is as follows. For a CRA picture, the associated leading pictures are correctly decodable if the decoding starts from a RAP picture before the CRA picture in decoding order. However, the leading pictures associated with a CRA picture may not be correctly decodable when random access from the CRA picture occurs (i.e., when decoding starts from the CRA picture, or in other words, when the CRA picture is the first picture in the bitstream). In contrast, there may be no scenario where the leading pictures associated with a BLA picture are decodable, even when decoding starts from a RAP picture before the BLA picture in decoding order.

Some of the leading pictures associated with a particular CRA picture or a particular BLA picture may be correctly decodable even when the particular CRA picture or the particular BLA picture is the first picture in a bitstream. These leading pictures may be referred to as decodable leading pictures (DLPs). Other leading pictures may be referred to as non-decodable leading pictures (NLPs). HEVC Working Draft 8 may also refer to NLPs as tagged for discard (TFD) pictures.

One or more HEVC bitstreams may be stored in a file that conforms to a particular file format. In some examples, a video data bitstream (e.g., a HEVC bitstream) may be stored in a file that conforms to an ISO base media file format (ISOBMFF). ISOBMFF may also be referred to as ISO/IEC 14496-12. Other example file formats for storage of video data bitstreams include file formats derived from ISOBMFF, including the MPEG-4 file format (ISO/IEC 14496-14), the Third Generation Partnership Project (3GPP) file format (3GPP TS 26.244), and the AVC file format (ISO/IEC 14496-15). An amendment to the AVC file format for storage of HEVC video content is under development by MPEG. This AVC file format amendment may be referred to as the HEVC file format.

Files conforming to the HEVC file format may include a plurality of tracks. Each track may be a timed sequence of related samples. In the context of the HEVC file format, a "sample" may comprise data associated with a single timestamp. Examples of a sample include: an individual frame of video, a series of video frames in decoding order, or a compressed section of audio in decoding order. In the HEVC file format, each track may comprise a plurality of "boxes." A "box" is an object-oriented building block defined by a unique type identifier and length.

3GPP multimedia services include 3GPP dynamic adaptive streaming over HTTP (3GP-DASH, 3GPP TS 26.247), packet-switched streaming (PSS, 3GPP TS 26.234), multimedia broadcast and multicast service (MBMS, 3GPP TS 26.346) and multimedia telephone service over IMS (MTSI, 3GPP TS 26.114). MPEG has also specified a dynamic adaptive streaming over HTTP (DASH) standard (ISO/IEC IS 23009-1). Real Time Protocol (RTP) payload formats include the H.264 payload format in RFC 6184, SVC payload format in RFC 6190 and many others. Currently, the HEVC RTP payload format is being developed by the Internet Engineering Task Force (IETF).

DASH is directed to network streaming where there are multiple representations of encoded media content, but each representation has a different bitrate, which allows for bandwidth adaptation. As bandwidth increases, a client can retrieve data from a higher bandwidth representation, and when bandwidth decreases, the client can retrieve data from a lower bandwidth representation. A DASH media presentation description (MPD) is a document (e.g., an XML-formatted document) that describes what representations are available, as well as their bitrates. A DASH MPD may also be referred to as a "manifest file." A client may use the DASH MPD to select a representation, given a determined amount of network bandwidth at a particular time.

In DASH, a media presentation may contain a sequence of one or more periods. Periods may be defined by a Period element in the MPD. Each period may contain one or more representations for the same media content. A representation may be one of a number of alternative encoded versions of audio or video data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

The use of DASH may allow client devices to adapt to variations in available bandwidth that can occur along network paths between source devices and the client device. In particular, content producers often produce a set of representations, each having the same characteristics but coded at different bitrates. Such a set of representations may be referred to as an "adaptation set." A manifest file, such as a MPD, describes the characteristics of the representations of the adaptation sets, including bitrates for the representations, and also may provide information for retrieving data of the representations, such as uniform resource locators (URLs) for segments (e.g., individual files) of the representations.

HEVC and other video coding standards specify profiles, tiers, and levels. Profiles, tiers, and levels specify restrictions on bitstreams and hence limits on the capabilities needed to decode the bitstreams. Profiles, tiers, and levels may also be used to indicate interoperability points between individual decoder implementations. Each profile specifies a subset of algorithmic features and limits that is supported by all video decoders conforming to that profile. Video encoders are not required to make use of all features supported in a profile. Each level of a tier may specify a set of limits on the values that syntax elements may have. The same set of tier and level definitions may be used with all profiles, but individual implementations may support a different tier and within a tier a different level for each supported profile. For any given profile, a level of a tier may generally correspond to a particular decoder processing load and memory capability. Capabilities of video decoders may be specified in terms of the ability to decode video streams conforming to the constraints of particular profiles, tiers, and levels. For each such profile, the tier, and level supported for that profile may also be expressed. Some video decoders may not be able to decode particular profiles, tiers, or levels.

In HEVC, profiles, tiers, and levels may be signaled by the syntax structure profile_tier_level( ) syntax structure. The profile_tier_level( ) syntax structure may be included in a VPS and/or a SPS. The profile_tier_level( ) syntax structure may include a general_profile_idc syntax element, a general_tier_flag syntax element, and a general_level_idc syntax element. The general_profile_idc syntax element may indicate a profile to which a CVS conforms. The general_tier_flag syntax element may indicate a tier context for interpretation of the general_level_idc syntax element. The general_level_idc syntax element may indicate a level to which a CVS conforms. Other values for these syntax elements may be reserved.

Capabilities of video decoders may be specified in terms of the ability to decode video streams conforming to the constraints of profiles, tiers, and levels. For each such profile, the tier and level supported for that profile may also be expressed. In some examples, video decoders do not infer that a reserved value of the general_profile_idc syntax element between the values specified in HEVC indicates intermediate capabilities between the specified profiles. However, video decoders may infer that a reserved value of the general_level_idc syntax element associated with a particular value of the general_tier_flag syntax element between the values specified in HEVC indicates intermediate capabilities between the specified levels of the tier.

A bitstream may contain multiple CVSs that are of different profiles (possibly with additional restrictions such as signaled in general_profile_compatibility_flag[i] for i in the range of 0 to 31, inclusive, and general_reserved_zero_16 bits as specified in HEVC). Thus, given a bitstream, simply inspecting the profile information included in the active SPS for the first CVS is not sufficient to know whether a video decoder conforming to a particular profile can decode the entire bitstream. To ensure that a video decoder can decode the entire bitstream, the video decoder may inspect all CVSs in the bitstream to find out whether all the CVSs conform to the same profile. Such an inspection may not be simple because the video decoder may need to inspect virtually all NAL units in the bitstream to determine all the active SPSs. Determining all active SPSs may involve determining SPS NAL units, EOS NAL units, NAL units of RAP pictures, and SEI NAL units, and parsing into buffering period SEI messages and/or slice headers of NAL units of RAP pictures to determine which SPS is active for a CVS.

The situation of being unable to determine a property of a bitstream without parsing and inspecting virtually all NAL units in the bitstream may also occur with regard to other types of bitstream level information (i.e., bitstream properties), such as those listed below. It should be appreciated however that the level of complexity involved with determining some of the following bitstream properties would not necessarily require the parsing and inspection of virtually all NAL units in the bitstream.

1) Whether tier and level remain unchanged for all CVSs in the bitstream.
2) Whether all CVSs in the bitstream have the same spatial resolution.
3) Whether all CVSs in the bitstream have the same (maximum) number of temporal sub-layers.
4) Whether all CVSs in the bitstream have the same (maximum) number of layers (i.e., number of values for nuh_reserved_zero_6 bits for VCL NAL units), and if yes, whether in all CVSs in the bitstream all the layers have the same set of layer identifiers (i.e., the same set of nuh_reserved_zero_6 bits values).
5) Whether all CVSs in the bitstream support the same set of operation points.
6) Whether all CVSs in the bitstream have the same (maximum) picture rate.
7) Whether all CVSs in the bitstream have the same maximum bitrate.
8) Whether all CVSs in the bitstream have the same color format.
9) Whether all CVSs in the bitstream have the same sample aspect ratio.
10) Whether all CVSs in the bitstream have the same set of bit depths for luma and chroma. The bit depth for a sample value (e.g., a luma sample or a chroma sample) may indicate how many bits are used to represent the sample value.
11) Whether at least one parameter set in the bitstream is updated. In other words, whether the content of a VPS, SPS or PPS changes but the same VPS identifier, SPS identifier, or PPS identifier is used. In other words, whether in the bitstream at least one VPS is updated, whether in the bitstream at least one SPS is updated, and whether in the bitstream at least one PPS is updated.
12) Whether all parameter sets are present at the beginning of the bitstream (i.e. within the first access unit in the bitstream). If the condition is true, there may still be parameter sets repeated in other access units, e.g. for error resilience purposes. However, there may not be any parameter set updates among the repeated parameter sets. In other words, whether all VPSs are present at the beginning of the bitstream, whether all SPSs are present at the beginning of the bitstream, and whether all PPSs are present at the beginning of the bitstream.
13) Whether the presence of parameter sets in the bitstream enables full random accessibility. That is, whether it is possible to perform random access at the position of each RAP access unit by discarding all access units before the RAP access unit and to correctly decode the RAP picture and all the subsequent non-TFD pictures in decoding order. This may require that, when the above random access is performed at any RAP access unit, each parameter set is available in the bitstream when the parameter set needs to be activated.
14) Whether all CVSs in the bitstream contain only progressive frames coded in frame pictures, i.e. the scan type is progressive not interlaced, and there are no field pictures.
15) Whether any CVS in the bitstream contains a frame packing arrangement SEI message. In other words, whether a video segment represented by each CVS in the bitstream is frame-packed. A frame packing arrangement SEI message indicates whether a picture associated with the SEI message is a frame that is composed by packing two pictures representing different views, and if so, how the packing was done.
16) Whether tiles are enabled for all CVSs of the bitstream and/or whether all pictures in all CVSs of the bitstream have the same tile configuration.
17) Whether all CVSs in the bitstream have the same coding tree block size and the same minimum coding block size.
18) Whether all CVSs in the bitstream have the same set of sequence level HRD parameters (or a part thereof) (e.g., as signaled in the hrd_parameters( ) syntax structure as specified in HEVC) and/or the same set of decoded picture buffer sizes (e.g. as signaled by the vps_max_dec_pic_buffering[i] syntax element as specified in HEVC).
19) Whether all CVSs in the bitstream make use of a particular coding tool. For example, whether all CVSs of the bitstream make use of dependent slices (supported when the dependent_slices_enabled_flag syntax element is equal to 1), wavefront parallel processing (supported when the entropy_coding_sync_enabled_flag syntax element is equal to 1), weighted prediction, and so on.

20) Whether all CVSs in the bitstream have the same structures of pictures (SOP) as described by SOP description SEI messages. The SOP description SEI message describes the structure of the bitstream through reference picture sets (RPSs). The design of the SOP description SEI message may address several use cases where the knowledge of the temporal and inter prediction structure is helpful. For example, a gateway can use the SOP information in bit rate adaptation to determine a set of inter-related pictures that can be dropped without affecting the decoding of the forwarded bitstream. Such bitstream trimming can have a finer granularity than the sub-bitstream extraction based on TemporalId and can therefore be more suitable for subtle temporary bit rate adaptation. The SOP description SEI message resides in the first access unit of a SOP. The SOP description SEI message provides the following information for each picture in the SOP: an indication of whether the picture is a reference or a non-reference picture, the TemporalId value of the picture, the short-term RPS index used by the picture, and the picture order count relative to the first picture of the SOP. These pieces of information represent the temporal structure and the inter prediction hierarchy of the SOP comprehensively.

21) Whether TFD pictures in all CVSs in the bitstream may be decoded and outputted with acceptable quality.

22) Whether there is only one VPS that is activated when the bitstream is decoded; and if there is only one VPS activated when the bitstream is decoded, the VPS identifier of the VPS.

23) Whether there is only one SPS that is activated when the bitstream is decoded; and if there is only one SPS that is activated when the bitstream is decoded, the SPS identifier of the SPS.

24) Whether there is only one PPS that is activated when the bitstream is decoded; and if there is only one PPS that is activated when the bitstream is decoded, the PPS identifier of the PPS.

25) One or more of the following and their combinations:
 a. Whether all RAP pictures in the bitstream are IDR pictures.
 b. Whether all RAP pictures in the bitstream are not IDR pictures.
 c. Whether there are RAP pictures in the bitstream that are IDR pictures.
 d. Whether there are non-IDR RAP pictures in the bitstream.
 e. Whether all RAP pictures in the bitstream are CRA pictures.
 f. Whether all RAP pictures in the bitstream are not CRA pictures.
 g. Whether there are RAP pictures in the bitstream that are CRA pictures.
 h. Whether there are non-CRA RAP pictures in the bitstream.
 i. Whether all RAP pictures in the bitstream are BLA pictures.
 j. Whether all RAP pictures in the bitstream are not BLA pictures.
 k. Whether there are RAP pictures in the bitstream that are BLA pictures.
 l. Whether there are non-IDR BLA pictures in the bitstream.
 m. Whether there are DLP pictures in the bitstream.
 n. Whether there are TFD pictures in the bitstream.
 o. Whether there are TSA pictures in the bitstream.
 p. Whether there are STSA pictures in the bitstream.

26) Whether the values of sps_temporal_id_nesting_flag syntax elements are identical for all SPSs that are activated when the bitstream (or the elementary stream) is decoded.

27) Whether the values of vps_temporal_id_nesting_flag syntax elements are identical for all VPSs that are activated when the bitstream (or the elementary stream) is decoded.

Furthermore, the situation of parsing virtually all NAL units of a bitstream to determine a bitstream property may be applicable to some more detailed types of bitstream level information, such as the following properties:

1) The set of profiles (possibly with additional restrictions such as signaled in general_profile_compatibility_flag [i] for i in the range of 0 to 31, inclusive, and general_reserved_zero_16 bits as specified in HEVC) in the bitstream. Alternatively, the maximum set of profiles in the bitstream (i.e., no CVS in the bitstream shall conform to a profile that is not included in the set).

2) The (maximum) set of tiers and levels in the bitstream. This may be efficiently signaled as the highest tier, and for each tier the highest level.

3) The (maximum) set of spatial resolutions in the bitstream.

4) The (maximum) set of (maximum) numbers of temporal sub-layers in the bitstream.

5) The (maximum) set of (maximum) numbers of layers (i.e. number of values for nuh_reserved_zero_6 bits for VCL NAL units) and the (maximum) set of layer IDs (i.e. nuh_reserved_zero_6 bits values) in the bitstream.

6) The (maximum) set of operation points in the bitstream.

7) The (maximum) set of (maximum) frame rates in the bitstream.

8) The (maximum) set of maximum bitrates in the bitstream.

9) The (maximum) set of color formats in the bitstream.

10) The (maximum) set of sample aspect ratios in the bitstream.

11) The (maximum) set of luma bit depths and chroma bit depths in the bitstream.

12) The (maximum) set of frame packing types in the bitstream.

13) The (maximum) number of tiles in the bitstream.

14) The (maximum) set of coding tree block sizes and minimum coding block sizes in the bitstream.

In the list above, the word "maximum" in parenthesis in a sentence indicates that the word "maximum" may be optionally included in the sentence. For instance, the sentence the sentence "the (maximum) number of tiles in the bitstream" may be read as either "the number of tiles in the bitstream" or "the maximum number of tiles in the bitstream."

An elementary stream may contain multiple bitstreams and consequently may also contain multiple CVSs. The CVSs in an elementary stream may also have different profiles. Accordingly, the problem of needing to parse and inspect virtually all NAL units of a bitstream to determine properties of the bitstream may arise in the context of elementary streams. Thus, it may be necessary to parse and inspect virtually all NAL units of an elementary stream to determine properties of the elementary stream (i.e., elementary stream properties). Such elementary stream properties may include one or all of the bitstream properties listed above with the term "bitstream" replaced with the term "elementary stream").

The techniques of this disclosure may address one or more of the issues described above. For example, video encoder 20 may signal, in a bitstream, bitstream properties of the bitstream. The bitstream properties of the bitstream may be applicable to the bitstream as a whole. The bitstream properties of the bitstream may specify one or more of the bitstream properties listed above. In some techniques, a bitstream properties SEI message is defined to signal bitstream level properties. The bitstream properties SEI message provides information for the entire bitstream containing the SEI message. In other words, the bitstream properties SEI message may provide information for the entire bitstream containing the SEI message.

For example, video encoder 20 may signal a property of a bitstream that comprises a plurality of CVSs. In this example, when the property has a particular value, all the CVSs of the bitstream conform to the same profile. For instance, the property may be a particular syntax element. In this instance, video encoder 20 may signal, in the bitstream, a SEI message that contains the particular syntax element. When the particular syntax element has a particular value, general profile indicator syntax elements in respective SPSs that are activated when the bitstream is decoded have an identical value. In this example, each of the general profile indicator syntax elements indicates a profile to which a CVS conforms.

In a similar example, video decoder 30 (or another video processing device) may determine, based on a signaled property of a bitstream that comprises an encoded representation of the video data, whether video decoder 30 is able to decode the bitstream. In this example, the bitstream comprises a plurality of CVSs and when the signaled property has a particular value, all the CVSs of the bitstream conform to the same profile. Furthermore, in this example, video decoder 30 (or another video processing device) may process (e.g., decode), based on the determination, the bitstream. For instance, video decoder 30 (or another video processing device) may determine, based on a particular syntax element in a SEI message in a bitstream that comprises an encoded representation of the video data, whether video decoder 30 is able to decode the bitstream. When the particular syntax element has a particular value, general profile indicator syntax elements in respective SPSs that are activated when the bitstream is decoded have an identical value. Each of the general profile indicator syntax elements indicates a profile to which a CVS conforms. In this example, video decoder 30 may decode, based on the determination, the bitstream.

Furthermore, video encoder 20 may signal, in an elementary stream, bitstream properties of the elementary stream. The bitstream properties of the elementary stream may be applicable to the elementary stream as a whole. The elementary stream properties of the elementary stream may specify one or more of the elementary stream properties listed above. In some examples, an elementary stream properties (ESP) SEI message is defined to signal elementary stream level properties. For instance, video encoder 20 may generate an ESP SEI message that contains syntax elements that specify elementary stream properties. The ESP SEI message may provide information for the entire elementary stream containing the SEI message.

For example, video encoder 20 may signal, in an elementary stream, a SEI message that contains a particular syntax element. When the particular syntax element has a particular value, general profile indicator syntax elements in respective SPSs that are activated when the elementary stream is decoded have an identical value. In this example, each of the general profile indicator syntax elements indicates a profile to which a CVS conforms.

In a similar example, video decoder 30 may determine, based on a particular syntax element in a SEI message in an elementary stream that comprises an encoded representation of video data, whether video decoder 30 is able to decode the elementary stream. When the particular syntax element has a particular value, general profile indicator syntax elements in respective SPSs that are activated when the bitstream is decoded have an identical value. Each of the general profile indicator syntax elements may indicate a profile to which a CVS conforms. In this example, video decoder 30 may decode, based on the determination, the elementary stream.

In some examples, one or more bitstream properties of a bitstream may be signaled in an ISO base media file format. For example, one or more bitstream properties may be signaled in a sample entry in a HEVC video track of an ISO base media file format. Thus, a property of a bitstream (e.g., a property that indicates whether all CVSs of the bitstream conform to the same profile) may be signaled in an ISO base media file format file (e.g., in a HEVC video track of the ISO media file format file). Similarly, in some examples, one or more elementary stream properties may be signaled at an ISO base media file level. For example, one or more elementary stream properties may be signaled in a new box (e.g., an elementary stream properties box) that is contained in a track header box, a media information box, a video media header box, or another box of an HEVC video track.

In some examples, one or more bitstream properties may be signaled in an element or attribute in a DASH MPD. Thus, a property of a bitstream (e.g., a property that indicates whether all CVSs of the bitstream conform to the same profile) may be signaled in a DASH MPD. In some examples where one or more of the bitstream properties are signaled in an element or attribute in a DASH MPD, the one or more bitstream properties may be signaled in a period level, an adaptation set level, a representation level or a sub-representation level. Similarly, one or more of the elementary stream properties may be signaled in an element or an attribute in a DASH MPD. In some examples where one or more of the elementary stream properties are signaled in an element or attribute in a DASH MPD, the one or more elementary stream properties may be signaled in a period level, an adaptation set level, a representation level or a sub-representation level.

In accordance with some example techniques of this disclosure, one or more of the elementary stream properties may be signaled in a Session Description Protocol (SDP) file. Thus, a property of a bitstream (e.g., a property that indicates whether all CVSs of the bitstream conform to the same profile) may be signaled in a SPD. SDP is a format for describing streaming media initialization parameters. In some examples, one or more of the elementary stream properties may be signaled in various media level SDP attributes in an SDP file. For instance, multiple profiles and/or tiers and levels may be signaled in one or more media level SDP attributes to represent the (maximum) sets of profiles, tiers, and levels in the elementary stream. In the HEVC RTP payload format, an optional payload type parameter may be defined, which may contain multiple profiles. In some examples, the profiles may be comma separated. The parameter may be used to signal the properties of an elementary stream or the capabilities of a receiver implementation. Such a payload type parameter may be included in an SDP attribute in an SDP file. An SDP offer may include such an SDP attribute that may contain multiple profiles. The answerer may choose one or more of the offered profiles.

Furthermore, in accordance with one or more example techniques of this disclosure, bitstream properties or elementary stream properties may be signaled in codec parameters as defined in RFC 6381. For instance, multiple profiles and/or tiers and levels may be signaled in the codecs parameters to represent the (maximum) sets of profiles, tiers and levels of a bitstream or an elementary stream.

Figure 2:
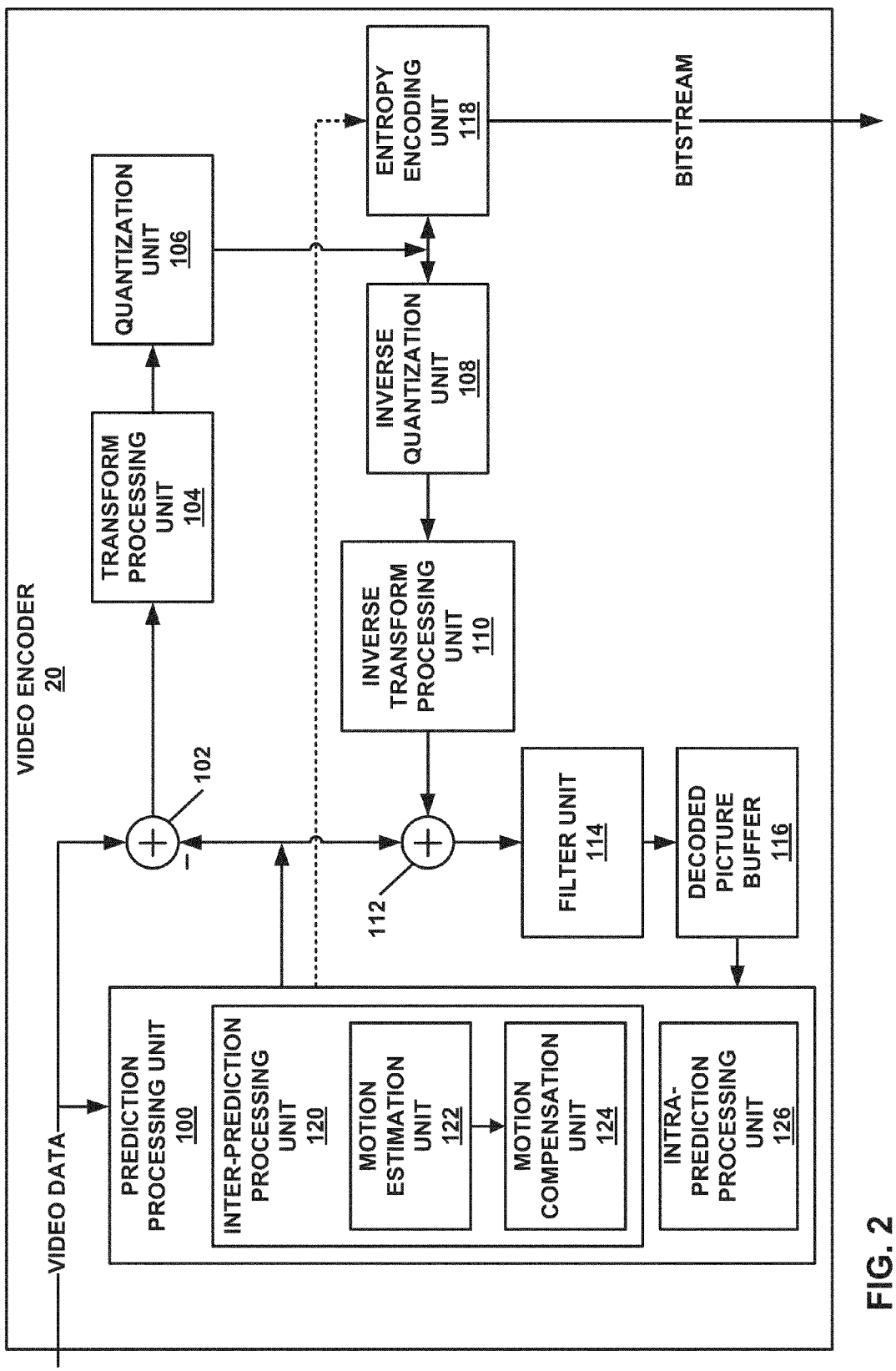
FIG. 2 is a block diagram illustrating an example video encoder that may implement the techniques described in this disclosure.

FIG. 2 is a block diagram illustrating an example video encoder 20 that may implement the techniques of this disclosure. FIG. 2 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 2, video encoder 20 includes a prediction processing unit 100, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit 122 and a motion compensation unit 124. In other examples, video encoder 20 may include more, fewer, or different functional components.

Video encoder 20 may receive video data. Video encoder 20 may encode each CTU in a slice of a picture of the video data. Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. The size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU.

If a PU is in a P slice, motion estimation unit 122 may search the reference pictures in a list of reference pictures (e.g., "RefPicList0") for a reference region for the PU. The reference region for the PU may be a region, within a reference picture, that contains samples that most closely correspond to the prediction blocks of the PU. Motion estimation unit 122 may generate a reference index that indicates a position in RefPicList0 of the reference picture containing the reference region for the PU. In addition, motion estimation unit 122 may generate a motion vector that indicates a spatial displacement between a coding block of the PU and a reference location associated with the reference region. For instance, the motion vector may be a two-dimensional vector that provides an offset from the coordinates in the current picture to coordinates in a reference picture. Motion estimation unit 122 may output the reference index and the motion vector as the motion information of the PU. Motion compensation unit 124 may generate the predictive blocks of the PU based on actual or interpolated samples at the reference location indicated by the motion vector of the PU.

If a PU is in a B slice, motion estimation unit 122 may perform uni-prediction or bi-prediction for the PU. To perform uni-prediction for the PU, motion estimation unit 122 may search the reference pictures of RefPicList0 or a second reference picture list ("RefPicList1") for a reference region for the PU. Motion estimation unit 122 may output, as the motion information of the PU, a reference index that indicates a position in RefPicList0 or RefPicList1 of the reference picture that contains the reference region, a motion vector that indicates a spatial displacement between a prediction block of the PU and a reference location associated with the reference region, and one or more prediction direction indicators that indicate whether the reference picture is in RefPicList0 or RefPicList1. Motion compensation unit 124 may generate the predictive blocks of the PU based at least in part on actual or interpolated samples at the reference location indicated by the motion vector of the PU.

To perform bi-directional inter prediction for a PU, motion estimation unit 122 may search the reference pictures in RefPicList0 for a reference region for the PU and may also search the reference pictures in RefPicList1 for another reference region for the PU. Motion estimation unit 122 may generate reference indexes that indicate positions in RefPicList0 and RefPicList1 of the reference pictures that contain the reference regions. In addition, motion estimation unit 122 may generate motion vectors that indicate spatial displacements between the reference locations associated with the reference regions and a prediction block of the PU. The motion information of the PU may include the reference indexes and the motion vectors of the PU. Motion compensation unit 124 may generate the predictive blocks of the PU based at least in part on actual or interpolated samples at the reference locations indicated by the motion vectors of the PU.

Intra-prediction processing unit 126 may generate predictive data for a PU by performing intra prediction on the PU. The predictive data for the PU may include predictive blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive blocks for the PU. When performing intra prediction using a particular intra prediction mode, intra-prediction processing unit 126 may generate predictive blocks for the PU using a particular set of samples from neighboring blocks. The neighboring blocks may be above, above and to the right, above and to the left, or to the left of the prediction blocks of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the prediction blocks of the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the luma, Cb, and Cr coding block of a CU and the selected predictive luma, Cb, and Cr blocks of the PUs of the CU, luma, Cb, and Cr residual blocks of the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks of a CU into transform blocks associated with TUs of the CU. Thus, a TU may be associated with a luma transform block and two corresponding chroma transform blocks. The sizes and positions of the luma and chroma transform blocks of TUs of a CU may or may not be based on the sizes and positions of prediction blocks of the PUs of the CU.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually-similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a CAVLC operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118.

The bitstream generated by video encoder 20 may include sets of bitstream properties that provide information about the bitstream as a whole. For example, video encoder 20 may include a bitstream properties SEI message in the bitstream. The bitstream properties SEI message may include syntax elements that specify bitstream properties. In another example, video encoder 20 may include a bitstream properties NAL unit in the bitstream. The bitstream properties NAL unit may include syntax elements that specify bitstream properties.

In some examples, video encoder 20 may generate an elementary stream that includes the bitstream. The elementary stream generated by video encoder 20 may include sets of elementary stream properties that provide information about the elementary stream as a whole. For example, video encoder 20 may include an ESP SEI message in the elementary stream. The ESP SEI message may include syntax elements that specify elementary stream properties. In another example, video encoder 20 may include an elementary stream properties NAL unit in the elementary stream. The elementary stream properties NAL unit may include syntax elements that specify elementary stream properties.

Figure 3:
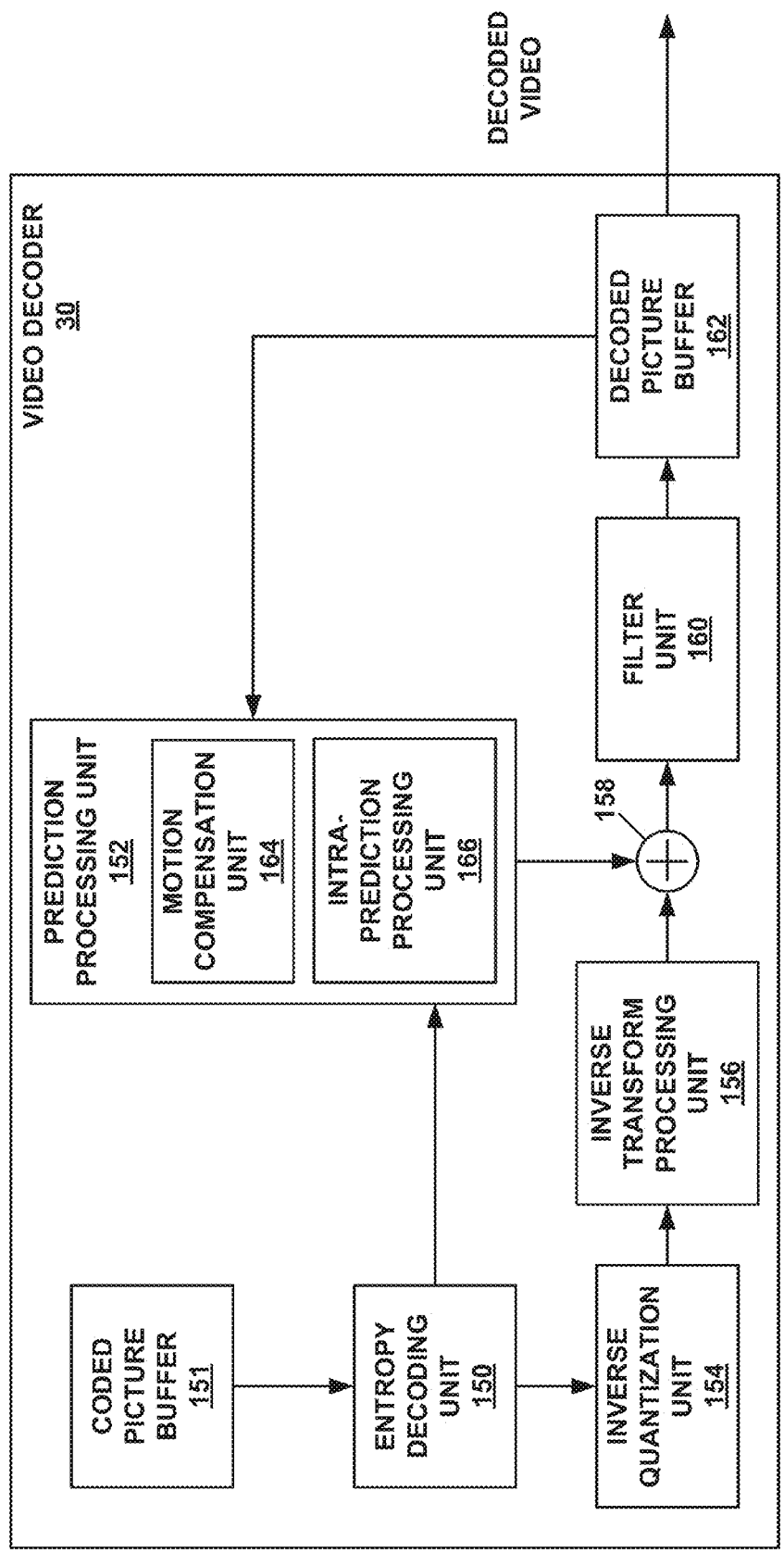
FIG. 3 is a block diagram illustrating an example video decoder that may implement the techniques described in this disclosure.

FIG. 3 is a block diagram illustrating an example video decoder 30 that is configured to implement the techniques of this disclosure. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 3, video decoder 30 includes an entropy decoding unit 150, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

A coded picture buffer (CPB) 151 may receive and store encoded video data (e.g., NAL units) of a bitstream. Entropy decoding unit 150 may receive NAL units from CPB 151 and parse the NAL units to obtain syntax elements from the bitstream. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements obtained from the bitstream.

The NAL units of the bitstream may include coded slice NAL units. As part of decoding the bitstream, entropy decoding unit 150 may parse and entropy decode syntax elements from the coded slice NAL units. Each of the coded slices may include a slice header and slice data. The slice header may contain syntax elements pertaining to a slice.

In addition to decoding syntax elements from the bitstream, video decoder 30 may perform a decoding operation on a CU. By performing the decoding operation on a CU, video decoder 30 may reconstruct coding blocks of the CU.

As part of performing a decoding operation on a CU, inverse quantization unit 154 may inverse quantize. i.e., de-quantize, coefficient blocks associated with TUs of the CU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive luma, Cb, and Cr blocks for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may obtain motion information for the PU. Motion compensation unit 164 may determine, based on the motion information of the PU, one or more reference regions for the PU. Motion compensation unit 164 may generate, based on samples at the one or more reference blocks for the PU, predictive luma, Cb, and Cr blocks for the PU.

Reconstruction unit 158 may use the residual values from the luma, Cb, and Cr transform blocks associated with TUs of a CU and the predictive luma, Cb, and Cr blocks of the PUs of the CU, i.e., either intra-prediction data or inter-prediction data, as applicable, to reconstruct the luma, Cb, and Cr coding blocks of the CU. For example, reconstruction unit 158 may add samples of the luma, Cb, and Cr transform blocks to corresponding samples of the predictive luma, Cb, and Cr blocks to reconstruct the luma, Cb, and Cr coding blocks of the CU.

Filter unit 160 may perform a deblocking operation to reduce blocking artifacts associated with the luma, Cb, and Cr coding blocks of the CU. Video decoder 30 may store the luma, Cb, and Cr coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the luma, Cb, and Cr blocks in decoded picture buffer 162, intra prediction or inter prediction operations on PUs of other CUs. In this way, video decoder 30 may extract, from the bitstream, transform coefficient levels of the significant luma coefficient block, inverse quantize the transform coefficient levels, apply a transform to the transform coefficient levels to generate a transform block, generate, based at least in part on the transform block, a coding block, and output the coding block for display.

As indicated elsewhere in this disclosure, video encoder 20 may signal ESPs of an elementary stream in an ESP SEI message. The ESP SEI message provides information applicable for the entire elementary stream containing the SEI message. In some examples, the ESP SEI message is only present in the first access unit of an elementary stream. Furthermore, in some examples, the ESP SEI message is not a nested SEI message. That is, in such examples, the SEI NAL unit containing the ESP SEI message shall not contain other SEI messages.

The nuh_reserved_temporal_id_plus 1 syntax element of a NAL unit may indicate a temporal identifier of the NAL unit, plus 1. In some examples, the nuh_reserved_temporal_id_plus 1 syntax element of a SEI NAL unit containing an elementary stream properties (ESP) SEI message may always be equal to 0.

An ESP SEI message may be signaled at various locations within an elementary stream. For example, an ESP SEI message may be present in the first access unit of a bitstream. In other words, a video coding specification may require the ESP SEI message to be present in the first access unit of the bitstream. In another example, an ESP SEI message may be present in any RAP access unit in a bitstream. In other words, a video coding specification may allow the ESP SEI message to be present in any RAP access unit in the bitstream.

In another example, an ESP SEI message may be present in any access unit in a bitstream. In other words, a video coding specification may allow an ESP SEI message to be present in any access unit in the bitstream. Furthermore, in another example, when an ESP SEI message is present in an SEI NAL unit, a video coding specification requires the ESP SEI message is the first SEI message in the SEI NAL unit. In another example, a video coding specification may require that the SEI NAL unit containing an ESP SEI message shall not contain other SEI messages. Furthermore, in another example, when an SEI NAL unit contains an ESP SEI message, a video coding specification requires that the SEI NAL unit to be the first SEI NAL unit in the access unit containing the SEI NAL unit.

In another example, a video coding specification requires that the first access unit of the elementary stream include an SEI NAL unit that contains an ESP SEI message. In another example, a video coding specification requires that the first access unit of the elementary stream includes an SEI NAL unit that contains only an ESP SEI message.

Table 1, below, shows an example syntax for an ESP SEI message. In the example of Table 1, below, and other syntax tables of this disclosure, syntax elements having descriptors of the form u(n), where n is a non-negative integer, are unsigned values of length n. In the following discussion of the semantics of the syntax elements of the ESP SEI message, the term "the elementary stream" may refer to "the elementary stream containing the elements stream properties SEI message." In other examples, the ESP SEI message may include, more, fewer, or different syntax elements that those of Table 1.

TABLE 1

| elementary_stream_properties( payloadSize ) { | Descriptor |
|---|---|
| es_profile_unchanging_flag | u(1) |
| es_tier_level_unchanging_flag | u(1) |
| es_spatial_resolution_unchanging_flag | u(1) |
| es_num_sub_layers_unchanging_flag | u(1) |
| es_max_bitrate_unchanging_flag | u(1) |
| es_max_pic_rate_unchanging_flag | u(1) |
| es_color_format_unchanging_flag | u(1) |
| es_aspect_ratio_unchanging_flag | u(1) |
| es_bit_depth_unchanging_flag | u(1) |
| es_full_random_access_enabled_flag | u(1) |
| es_all_vps_in_first_au_flag | u(1) |
| if(es_all_vps_in_first_au_flag ) | |
|    es_no_vps_set_update_flag | u(1) |
| es_all_sps_in_first_au_flag | u(1) |
| if(es_all_sps_in_first_au_flag ) | |
|    es_no_sps_set_update_flag | u(1) |
| es_all_pps_in_first_au_flag | u(1) |
| if(es_all_pps_in_first_au_flag ) | |
|    es_no_pps_set_update_flag | u(1) |
| es_progressive_frames_only_flag | u(1) |
| es_unpacked_frames_only_flag | u(1) |
| es_tiles_unchanging_flag | u(1) |
| es_wpp_unchanging_flag | u(1) |
| es_dependent_slices_unchanging_flag | u(1) |
| es_proterties_sei_extension_flag | u(1) |
| } | |

A VPS may include a general_profile_space syntax element, general_profile_idc syntax element, a general_profile_compatibility_flag[i] syntax element (i.e., a plurality of general profile compatibility flags), and a general_reserved_zero_16 bits syntax element. The general_profile_space syntax element specifies a context for the interpretation of the general_profile_idc syntax element and the general_profile_compatibility_flag[i] syntax element for all values of i in the range of 0 to 31, inclusive. When the general_profile_space syntax element is equal to 0, the general_profile_idc syntax element indicates the profile to which a CVS conforms. Annex A of HEVC Working Draft 8 describes an example set of profiles. When the general_profile_space syntax element is equal to 0 and the general_profile_compatibility_flag[i] syntax element is equal to 1, the general_profile_compatibility_flag[i] syntax element indicates that a CVS conforms to a profile indicated by the general_profile_idc syntax element equal to i. When the general_profile_space syntax element is equal to 0, the general_profile_idc[general_profile_idc] is equal to 1. "general_profile_idc[general_profile_idc]" denotes the general_profile_idc syntax element associated with an index value specified by the general_profile_idc syntax element. In some examples, the general_profile_compatibility_flag[i] syntax element is equal to 0 for any value of i that is not specified as an allowed value of general_profile_idc. Annex A of HEVC Working Draft 8 specifies an example set of allowed values of the general_profile_idc syntax element. The general_reserved_zero_16 bits syntax element is equal to 0 in bitstreams. Certain values of the general_reserved_zero_16 bits syntax elements may be used for extensions of HEVC.

In the example of Table 1, the es_profile_unchanging_flag syntax element equal to 1 indicates that the values of the general_profile_idc syntax element, the general_profile_compatibility_flag[i] syntax element for i in the range of 0 to 31, inclusive, and the general_reserved_zero_16 bits syntax element are respectively identical for all SPSs that are activated when the elementary stream is decoded. The es_profile_unchanging_flag syntax element equal to 0 indicates that the values of the general_profile_idc syntax element, the general_profile_compatibility_flag[i] syntax element for i in the range of 0 to 31, inclusive, and the general_reserved_zero_6 bits syntax element are not respectively identical for all SPSs that are activated when the elementary stream is decoded.

A VPS may include a profile_tier_level syntax structure that includes a general_tier_flag syntax element and a general_level_idc syntax element. The general_tier_flag syntax element specifies a tier context for the interpretation of the general_level_idc syntax element. The general_level_idc syntax element indicates a level to which the CVS conforms. Annex A of HEVC Working Draft 8 specifies an example interpretation of the general_level_idc syntax element based on the tier context specified by the general_tier_flag syntax element.

In the example of Table 1, the es_tier_level_unchanging_flag syntax element equal to 1 indicates that the values of the general_tier_flag syntax element and the general_level_idc syntax element are respectively identical for all SPSs that are activated when the elementary stream is decoded. The es_tier_level_unchanging_flag syntax element equal to 0 indicates that the values of the general_tier_flag syntax element and the general_level_idc syntax element are not respectively identical for all SPSs that are activated when the elementary stream is decoded. Thus, the es_tier_level_unchanging_flag syntax element may indicate whether the values of the general_tier_flag syntax element and the general_level_idc syntax element are identical for all SPSs that are activated when the elementary stream is decoded.

A SPS may include a pic_width_in_luma_samples syntax element and a pic_height_in_luma_samples syntax element. The pic_width_in_luma_samples syntax element may specify the width of each decoded picture in units of luma samples. The pic_height_in_luma_samples syntax element may specify the height of each decoded picture in units of luma samples. In the example of Table 1, the es_spatial_resolution_unchanging_flag syntax element equal to 1 indicates that the values of the pic_width_in_luma_samples syntax element and the pic_height_in_luma_samples syntax element are respectively identical for all SPSs that are activated when the elementary stream is decoded. The es_spatial_resolution_unchanging_flag syntax element equal to 0 indicates that the values of the pic_width_in_luma_samples syntax element and the pic_height_in_luma_samples syntax element are not respectively identical for all SPSs that are activated when the elementary stream is decoded. Thus, the es_spatial_resolution_unchanging_flag syntax element may indicate whether all CVSs of the elementary stream have the same spatial resolution.

As indicated in this disclosure, a temporal sub-layer may refer to a subset of pictures within a layer that may be decoded without reference to other pictures within the layer. In the example of Table 1, the es_num_sub_layers_unchanging_flag syntax element equal to 1 indicates that the number of temporal sub-layers is identical for all CVSs in the elementary stream. The es_num_sub_layers_unchanging_flag syntax element equal to 0 indicates that the number of temporal sub-layers is not identical for all CVSs in the elementary stream. Thus, the es_num_sub_layers_unchanging_flag syntax element may indicate whether the number of temporal sub-layers of the elementary stream is identical for all CVSs in the elementary stream.

Furthermore, in the example of Table 1, the es_max_bitrate_unchanging_flag syntax element equal to 1 indicates that the maximum bitrate is identical for all CVSs in the elementary stream. The es_max_bitrate_unchanging_flag syntax element equal to 0 indicates that the maximum bitrate is not identical for all CVSs in the elementary stream.

The maximum picture rate may indicate a maximum number of pictures per second. In the example of Table 1, the es_max_pic_rate_unchanging_flag syntax element equal to 1 indicates that the maximum picture rate is identical for all CVSs in the elementary stream. The es_max_pic_rate_unchanging_flag syntax element equal to 0 indicates that the maximum picture rate is not identical for all CVSs in the elementary stream. Thus, the es_max_pic_rate_unchanging_flag syntax element may indicate whether the maximum picture rate is identical for all CVSs in the elementary stream.

A SPS may include a chroma_format_idc syntax element. The chroma_format_idc syntax element of an SPS may specify a chroma sampling. In HEVC Working Draft 8, the chroma_format_idc syntax element specifies the chroma sampling relative to a luma sampling specified in subclause 6.2 of HEVC Working Draft 8. If the chroma_format_idc syntax element of a SPS activated for a current picture is equal to 0, the current picture may consist of one sample array (e.g., $S_L$). Otherwise, if the chroma_format_idc syntax element is not equal to 0, the current picture may comprise three sample arrays (e.g., $S_L$, $S_{Cb}$, and $S_{Cr}$). In the example of Table 1, the es_color_format_unchanging_flag syntax element equal to 1 indicates that the value of chroma_format_idc is identical for all SPSs that are activated when the elementary stream is decoded. The es_color_format_unchanging_flag syntax element equal to 0 indicates that the value of the chroma_format_idc syntax element is not identical for all SPSs that are activated when the elementary stream is decoded. Thus, the es_color_format_unchanging_flag syntax element may indicate whether all CVSs in the elementary stream have the same color format.

A SPS may include a VUI parameters syntax structure that includes an aspect_ratio_idc syntax element. The aspect_ratio_idc syntax element specifies a value of a sample aspect ratio of luma samples (e.g., 1:1, 12:11, 10:11, 16:11, 40:33, etc.). Table E-1 of HEVC Working Draft 8 indicates an example interpretation of the aspect_ratio_idc syntax element. Furthermore, when the aspect_ratio_idc syntax element indicates Extended_SAR (e.g., when the aspect_ratio_idc syntax element is equal to 255), the VUI parameters syntax structure may include a sar_width syntax element and a sar_height syntax element. The sar_width syntax element indicates a horizontal size of a sample aspect ratio (in arbitrary units). The sar_height syntax element indicates a vertical size of the sample aspect ratio in the same arbitrary units used for the sar_width syntax element.

In the example of Table 1, the es_aspect_ratio_unchanging_flag syntax element equal to 1 indicates that the value of the aspect_ratio_idc syntax element is identical for all sequence parameter sets that are activated when the elementary stream is decoded, and, when aspect_ratio_idc is equal to Extended_SAR, the values of the sar_width syntax element and the sar_height syntax element are respectively identical for all sequence parameter sets that are activated when the elementary stream is decoded. The es_aspect_ratio_unchanging_flag syntax element equal to 0 indicates that the value of the aspect_ratio_idc syntax element is not identical for all sequence parameter sets that are activated when the elementary stream is decoded, or, the values of the sar_width syntax element and the sar_height syntax element are not respectively identical for all sequence parameter sets that are activated when the elementary stream is decoded. Thus, the es_aspect_ratio_unchanging_flag syntax element may indicate whether all CVSs in the elementary stream have the same sample aspect ratio.

A SPS may include a bit_depth_minus8 syntax element and a bit_depth_chroma_minus8 syntax element. The bit_depth_minus8 syntax element, plus 8, specifies a bit depth of samples of the luma array and a value of a luma quantization parameter range offset. The bit_depth_chroma_minus8 syntax element, plus 8, specifies a bit depth of samples of the chroma arrays and a value of a chroma quantization parameter range offset. In the example of Table 1, the es_bit_depth_unchanging_flag syntax element equal to 1 indicates that the values of the bit_depth_luma_minus8 syntax element and the bit_depth_chroma_minus8 syntax element are respectively identical for all SPSs that are activated when the elementary stream is decoded. The es_bit_depth_unchanging_flag syntax element equal to 0 indicates that the values of the bit_depth_luma_minus8 syntax element and the bit_depth_chroma_minus8 syntax element are not respectively identical for all sequence parameter sets that are activated when the elementary stream is decoded. Thus, the es_bit_depth_unchanging_flag syntax element may indicate whether all the CVSs in the elementary stream have the same set of bit depths for luma and chroma.

Furthermore, in the example of Table 1, the es_full_random_access_enabled_flag syntax element equal to 1 indicates that it is possible to perform random access at the position of each RAP access unit in the elementary stream by discarding all access units before the RAP access unit and to correctly decode the RAP picture and all the subsequent non-TFD pictures in decoding order, i.e., for each RAP access unit, when all access units before the RAP access unit are discarded and the remaining part of the elementary stream is decoded, each parameter set is still available in the elementary stream when it needs to be activated. The es_full_random_access_enabled_flag syntax element equal to 0 indicates that it is not possible to perform random access at the position of each RAP access unit in the elementary stream by discarding all access units before the RAP access unit and/or it is not possible to correctly decode the RAP picture and all the subsequent non-TFD pictures in decoding order. Thus, the es_full_random_access_enabled_flag syntax element may indicate whether the presence of parameter sets in the elementary stream enables full random accessibility. This may require that, when the above random access is performed at any RAP access unit, each parameter set is available in the bitstream when it needs to be activated.

In the example of Table 1, the es_all_vps_in_first_au_flag syntax element equal to 1 indicates that all VPSs that are activated when the elementary stream is decoded are present in the first access unit in the elementary stream. The es_all_vps_in_first_au_flag syntax element equal to 0 indicates that not all VPSs that are activated when the elementary stream is decoded are present in the first access unit in the elementary stream. When the es_all_vps_in_first_au_flag syntax element is equal to 1, there may still be VPSs repeated in other access units in the elementary stream (e.g., for error resilience purposes). However, there may not be any VPS update among the repeated VPSs. Thus, the es_all_vps_in_first_au_flag syntax element may indicate whether all VPSs that are activated when the elementary stream is decoded are present in the first access unit in the elementary stream.

A VPS may include a video_parameter_set_id syntax element that identifies the VPS. A SPS may include a video_parameter_set_id syntax element that identifies a VPS in use for the SPS. In the example of Table 1, the es_no vps_update_flag syntax element equal to 1 indicates that the content of at least one VPS in the elementary stream is changed without changing the video_parameter_set_id syntax element in the VPS NAL unit. The es_no_vps_update_flag syntax element equal to 0 indicates that the content of no VPS in the elementary stream is changed without changing the video_parameter_set_id syntax element in the VPS NAL unit. Thus, the es_no_vps_update_flag may indicate whether the content of at least one VPS in the elementary stream is changed without changing the video_parameter_set_id syntax element in the VPS NAL unit.

Furthermore, in the example of Table 1, the es_all_sps_in_first_au_flag syntax element equal to 1 indicates that all SPSs that are activated when the elementary stream is decoded are present in the first access unit of the elementary stream. The es_all_sps_in_first_au_flag syntax element equal to 0 indicates that not all SPSs that are activated when the elementary stream is decoded are present in the first access unit of the elementary stream. When the es_all_sps_in_first_au_flag syntax element is equal to 1, there may still be SPSs repeated in other access units in the elementary stream (e.g., for error resilience purposes). However, there is not any SPS update among the repeated SPSs. Thus, the es_all_sps_in_first_au_flag syntax element may indicate whether all SPSs that are activated when the elementary stream is decoded are present in the first access unit in the bitstream.

A SPS may include a seq_parameter_set_id syntax element that identifies the SPS. A PPS may include a seq_parameter_set_id syntax element that identifies a SPS in use for the PPS. In the example of Table 1, the es_no_sps_update_flag syntax element equal to 1 indicates that the content of at least one SPS in the elementary stream is changed without changing the seq_parameter_set_id syntax element in the SPS NAL unit. The es_no_sps_update_flag syntax element equal to 0 indicates that the content of no SPS in the elementary stream is changed without changing the seq_parameter_set_id in the SPS NAL unit. Thus, the es_no_sps_update_flag syntax element indicates whether at least one SPS is updated in the elementary stream, b using the same SPS identifier is used.

Furthermore, in the example of Table 1, the es_all_pps_in_first_au_flag syntax element equal to 1 indicates that all PPSs that are activated when the elementary stream is decoded are present in the first access unit in the elementary stream. The es_all_pps_in_first_au_flag syntax element equal to 0 indicates that not all PPSs that are activated when the elementary stream is decoded are present in the first access unit in the elementary stream. When the es_all_pps_in_first_au_flag syntax element is equal to 1, there may still be PPSs repeated in other access units in the elementary stream (e.g., for error resilience purposes). However, there may not be any PPS update among the repeated PPSs. Thus, the es_all_pps_in_first_au_flag syntax element may indicate whether all PPSs are present at the beginning of the elementary stream.

A PPS may include a pic_parameter_set_id syntax element that identifies the PPS. A slice header of a slice may include a pic_parameter_set_id syntax element that identifies a PPS in use for the slice. In the example of Table 1, the es_no_pps_update_flag syntax element equal to 1 indicates that the content of at least one PPS in the elementary stream is changed without changing the pic_parameter_set_id syntax element in the PPS NAL unit. The es_no_pps_update_flag syntax element equal to 0 indicates that the content of no PPS in the elementary stream is changed without changing the pic_parameter_set_id in the PPS NAL unit. Thus, the es_no_pps_update_flag syntax element may indicate whether in the elementary stream at least one PPS is changed but using the same PPS identifier.

A SPS may include a VUI parameters syntax structure that includes a field_seq_flag syntax element. The field_seq_flag syntax element may specify whether a CVS conveys pictures that represent fields, and specifies whether a field indication SEI message shall be present in every access unit of the CVS. In general, a field (i.e., a "video field") may represent odd or even numbered lines. The use of fields may enable interlacing. Subclause D.1.19 of HEVC Working Draft 8 provides an example syntax for a field indication SEI message. Subclause D.2.19 of HEVC Working Draft 8 provides example semantics for the field indication SEI message. In the example of Table 1, the es_progressive_frames_only_flag syntax element equal to 1 indicates that the value of the field_seq_flag syntax element is equal to 0 for all SPSs that are activated when the elementary stream is decoded, and there is no field indication SEI message in the elementary stream. The es_progressive_frames_only_flag syntax element equal to 0 indicates that there is at least one field indication SEI message in the elementary stream. Thus, the es_progressive_frames_only_flag syntax element may indicate whether all CVSs in the elementary stream contain only progressive frames coded in frame pictures.

A frame packing arrangement SEI message may provide information about packing of stereoscopic video into an HEVC bitstream. Subclause D.1.25 of Rec. ITU-T H.264|ISO/IEC 14496-10 provides an example syntax for a frame packing arrangement SEI message. In the example of Table 1, the es_unpacked_frames_only_flag syntax element equal to 1 indicates that there is no frame packing arrangement SEI message in the elementary stream. The es_unpacked_frames_only_flag syntax element equal to 0 indicates that there is at least one frame packing arrangement SEI message in the elementary stream. Thus, the es_unpacked_frames_only_flag syntax element may indicate whether all CVSs in the elementary stream contain no frame packing arrangement SEI messages.

Figure 4:
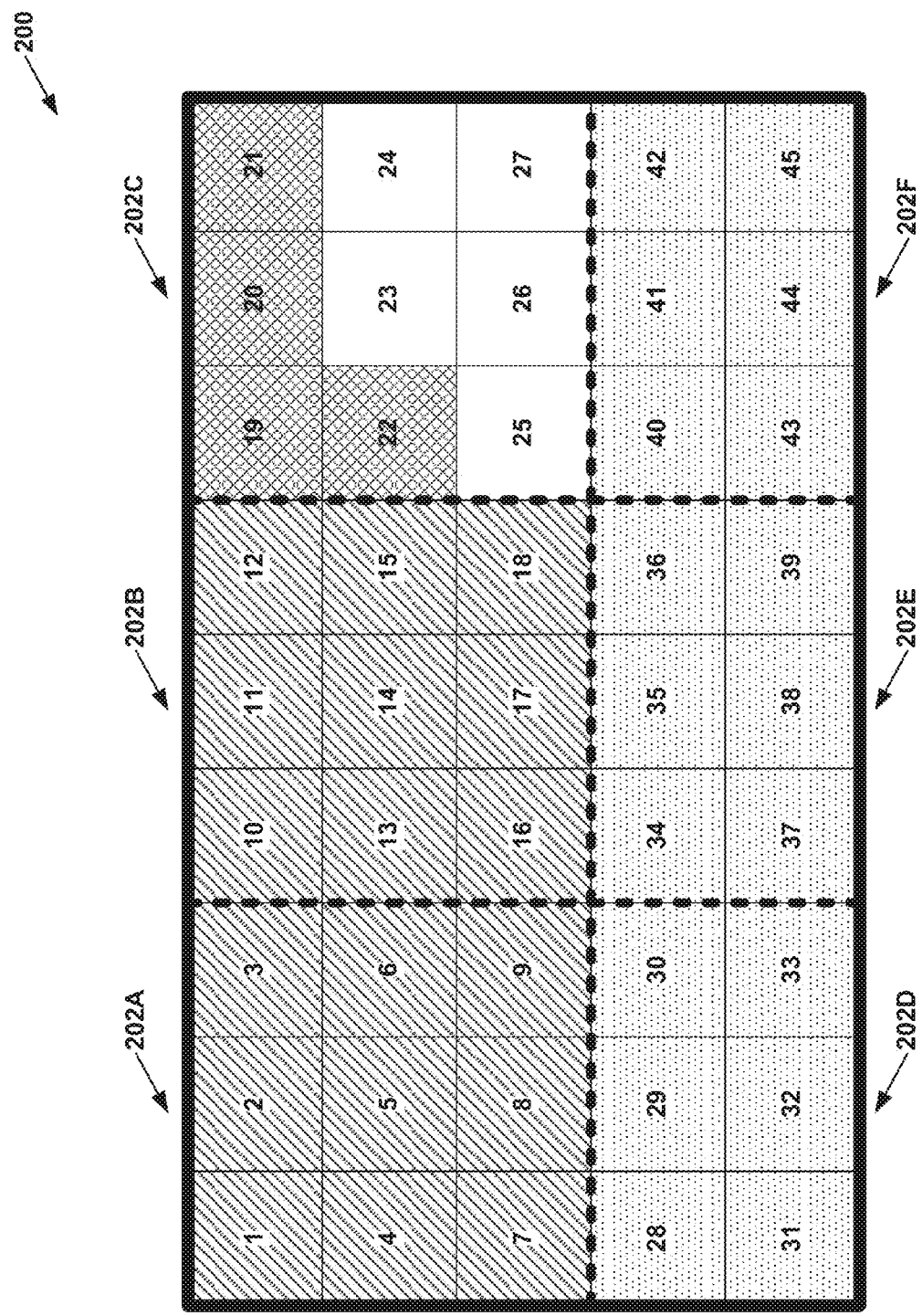
FIG. 4 is a conceptual diagram illustrating an example coding tree block coding order for a picture that is partitioned into multiple tiles.

A PPS may include a tiles_enabled_flag syntax element. The tiles_enabled_flag syntax element of a PPS may specify whether there may be more than one tile in each picture referring to the PPS. The tiles of a picture are defined by horizontal and/or vertical tile boundaries that pass through the picture. The tiles of a picture are coded according to a raster scan order and CTBs within each tile are also coded according to the raster scan order. Furthermore, a SPS may include a VUI parameters syntax structure that includes a tiles_fixed_structure_flag syntax element. The tiles_fixed_structure_flag syntax element indicates whether each PPS that is active in the CVS has the same value of the syntax elements that define the tile structure of pictures (e.g., num_tile_columns_minus1, num_tile_rows_minus1, uniform_spacing_flag, column_width_minus1 [i], row_height_minus 1 [i], and loop_filter_across_tiles_enabled_flag). The num_columns_minus 1 syntax element, plus 1, specifies the number of tile columns partitioning the picture. The num_tile_rows_minus1 syntax element, plus 1, specifies the number of tile rows partitioning the picture. The uniform_spacing_flag syntax element indicates whether column boundaries and likewise row boundaries are distributed uniformly across the picture. The column_width_minus 1[i] syntax element, plus 1, specifies the width of the i-th tile column in units of coding tree blocks. The row_height_minus [i] syntax element, plus 1, specifies the height of the i-th tile row in units of coding tree blocks. The loop_filter_across_tiles_enabled_flag indicates whether in-loop filtering operations are performed across tile boundaries. FIG. 4, described elsewhere in this disclosure, describes the use of tiles in video coding.

In the example of Table 1, the es_tiles_unchanging_flag syntax element equal to 1 indicates that the value of the tiles_enabled_flag syntax element is identical for all PPSs that are activated when the elementary stream is decoded, and when the value of the tiles_enabled_flag syntax element is equal to 1, the value of the tiles_fixed_structure_flag syntax element is identical for all SPSs that are activated when the elementary stream is decoded. The es_tiles_unchanging_flag syntax element equal to 0 indicates that the value of the tiles_enabled_flag syntax element is not identical for all PPSs that are activated when the elementary stream is decoded, or the value of the tiles_fixed_structure_flag syntax element is not identical for all SPSs that are activated when the elementary stream is decoded. Thus, the es_tiles_unchanging_flag syntax element may indicate whether all CVSs in the elementary stream have the same tile configuration.

Figure 5:
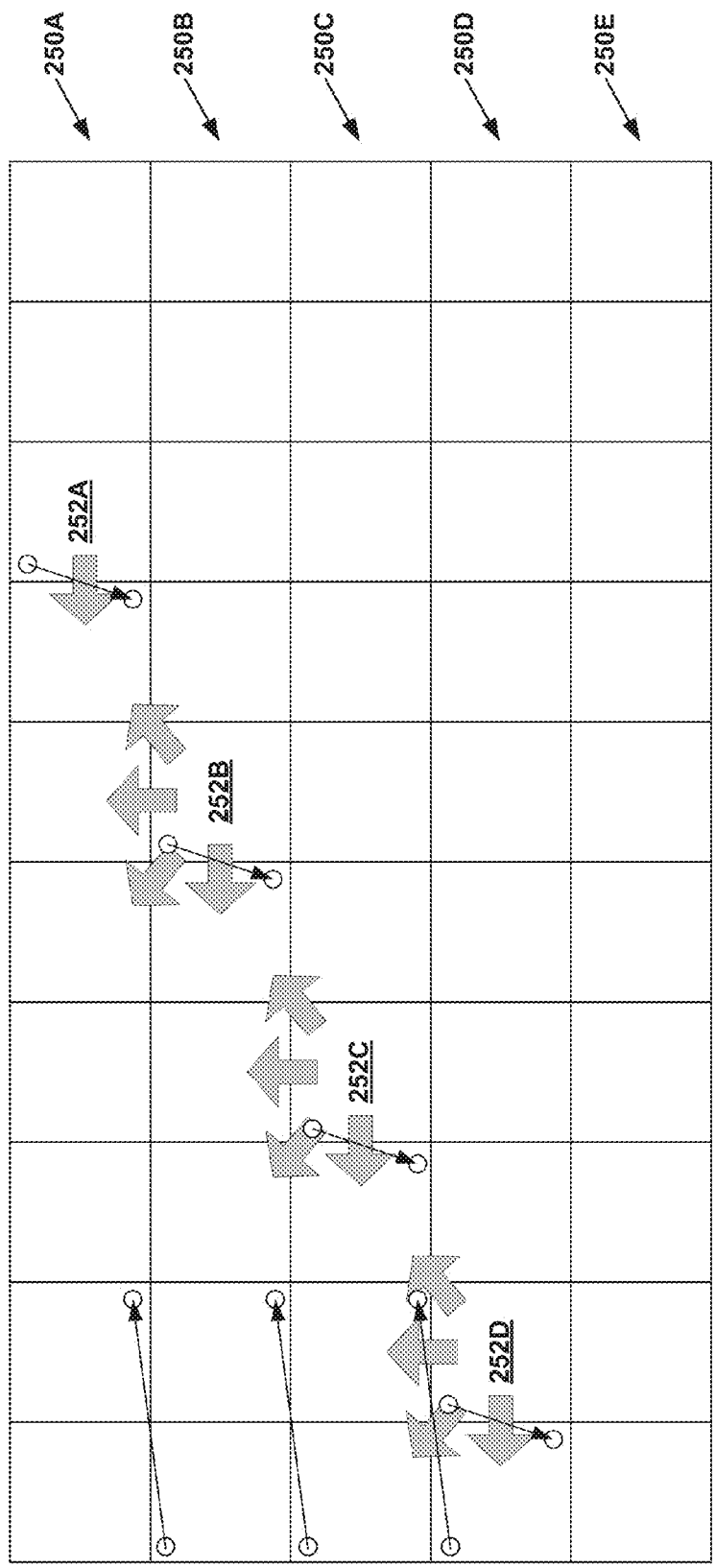
FIG. 5 is a conceptual diagram illustrating an example of wavefront parallel processing.

Furthermore, a PPS may include an entropy_coding_sync_enabled_flag syntax element. The entropy_coding_sync_enabled_flag syntax element of a PPS may indicate whether a specific synchronization process for context variables is invoked before decoding the first coding tree block of a row of coding tree blocks in each tile in each picture referring to the PPS and a specific memorization process for context variables is invoked after decoding two coding tree blocks of a row of coding tree blocks in each tile in each picture referring to the PPS. This specific synchronization process and specific memorization process may enable wavefront parallel processing (WPP). In WPP, each row of CTBs in a picture is a "WPP wave." When a video coder uses WPP to code a picture, the video coder may start coding the CTBs of a WPP wave from left-to-right after the video coder has coded two or more CTBs of an immediately higher WPP wave. FIG. 5, described elsewhere in this disclosure, is a conceptual diagram that illustrates WPP coding of a picture.

In the example of Table 1, the es_wpp_unchanging_flag syntax element equal to 1 indicates that the values of entropy_coding_sync_enabled_flag syntax elements are identical for all PPSs that are activated when the elementary stream is decoded. The es_wpp_unchanging_flag syntax element equal to 0 indicates that the values of entropy_coding_sync_enabled_flag syntax elements are not identical for all PPSs that are activated when the elementary stream is decoded. Thus, the es_wpp_unchanging_flag syntax element may indicate whether all CVSs in the elementary stream make use of wavefront parallel processing.

The dependent_slices_enabled_flag syntax element is a syntax element in a PPS that specifies whether dependent_slice_flag syntax elements are present in slice headers for coded pictures referring to the PPS. The dependent_slice_flag syntax element of a slice header may indicate whether a value of each slice header syntax element not present in the slice header is inferred to be equal to a value of a corresponding slice header syntax element in a preceding slice. In the example of Table 1, the es_dependent_slices_unchanging_flag syntax element equal to 1 indicates that the value of the dependent_slices_enabled_flag syntax element is identical for all PPSs that are activated when the elementary stream is decoded. The es_dependent_slices_unchanging_flag syntax element equal to 0 indicates that the value of the dependent_slices_enabled_flag syntax element is not identical for all PPSs that are activated when the elementary stream is decoded. Thus, the es_dependent_slices_unchanging_flag syntax element may indicate whether all CVSs in the elementary stream make use of dependent slices.

In the example of Table 1, the es_properties_sei_extension_flag syntax element equal to 0 indicates that no additional data follows within the ESP SEI message. It may be a requirement of bitstream conformance that the value of the es_properties_sei_extension_flag syntax element shall be equal to 0. The value 1 for the es_properties_sei_extension_flag syntax element may be reserved for future use by ITU-T|ISO/IEC. In some examples, video decoders shall ignore the value of the es_properties_sei_extension_flag syntax element in an ESP SEI message and shall ignore all data that follows within an ESP SEI message after the value 1 for the es_properties_sei_extension_flag syntax element. Thus, the es_properties_sei_extension_flag syntax element may indicate whether any additional data follows in the SEI message.

In some examples, a distinct NAL unit type (e.g., an ESP NAL unit) is defined to signal elementary stream level properties instead of an ESP SEI message. The ESP NAL unit may be specified as a non-VCL NAL unit. The ESP NAL unit provides information for the entire elementary stream containing the NAL unit. The ESP NAL unit may include some or all of the syntax elements of Table 1, above. Furthermore, in some examples, the ESP NAL unit may include syntax elements in addition to those in Table 1.

In some examples, an ESP NAL unit may be present in the first access unit of an elementary stream. In other examples, an ESP NAL unit may be present in any RAP access unit in an elementary stream. In still other examples, an ESP NAL unit may be present in any access unit in an elementary stream. Furthermore, in some examples, it is required that an ESP NAL unit must be the first NAL unit in an access unit containing the ESP NAL unit. In some examples, it is required that the first access unit of an elementary stream shall include an ESP NAL unit.

As indicated elsewhere in this disclosure, video encoder 20 may signal bitstream properties of a bitstream in a bitstream properties SEI message. The bitstream properties SEI message provides information applicable for the entire bitstream containing the SEI message. In some examples, the bitstream properties SEI message may only be present in the first access unit of a bitstream. Furthermore, in some examples, the SEI NAL unit containing the bitstream properties SEI message shall not contain other SEI messages. In some examples, a video coding specification may require the value of a nuh_temporal_id_plus1 syntax element in an SEI NAL unit containing a bitstream properties SEI message to be equal to 0.

A bitstream properties SEI message may be signaled at various locations within a bitstream. For example, a video coding specification may require a bitstream properties SEI message may be present in the first access unit of a bitstream. In another example, a video coding specification may allow a bitstream properties SEI message to be present in any RAP access unit in a bitstream. In another example, a video coding specification may allow a bitstream properties SEI message to be present in any access unit in a bitstream. In another example, when a bitstream properties SEI message is present in an SEI NAL unit, a video coding specification may require the bitstream properties SEI message to be the first SEI message in the SEI NAL unit. In another example, a video coding specification may require that an SEI NAL unit containing a bitstream properties SEI message to not contain other SEI messages. Furthermore, in some examples, when an SEI NAL unit contains a bitstream properties SEI message, a video coding specification may require the SEI NAL unit to be the first SEI NAL unit other than an elementary stream level NAL unit in the access unit containing the SEI NAL unit. Furthermore, a video coding specification may require that the first access unit of each bitstream includes an SEI NAL unit that contains a bitstream properties SEI message. In an alternative example, a video coding specification may require that the first access unit of each bitstream includes an SEI NAL unit that contains only a bitstream properties SEI message.

In one example, the bitstream properties SEI message may conform to the syntax shown in Table 2, below. In other example, the bitstream properties SEI message may include more, fewer, or different syntax elements than those shown in the example of Table 2.

TABLE 2

| bitstream_properties( payloadSize ) { | Descriptor |
|---|---|
| bitstream_profile_unchanging_flag | u(1) |
| bitstream_tier_level_unchanging_flag | u(1) |
| bitstream_spatial_resolution_unchanging_flag | u(1) |
| bitstream_num_sub_layers_unchanging_flag | u(1) |
| bitstream_max_bitrate_unchanging_flag | u(1) |
| bitstream_max_pic_rate_unchanging_flag | u(1) |
| bitstream_color_format_unchanging_flag | u(1) |
| bitstream_aspect_ratio_unchanging_flag | u(1) |
| bitstream_bit_depth_unchanging_flag | u(1) |
| bitstream_full_random_access_enabled_flag | u(1) |
| bitstream_all_vps_in_first_au_flag | u(1) |
| if( bitstream_all_vps_in_first_au_flag ) | |
|     bitstream_no_vps_update_flag | u(1) |
| bitstream_all_sps_in_first_au_flag | u(1) |
| if(bitstream all_sps_in_first_au_flag ) | |
|     bitstream_no_sps_set_update_flag | u(1) |
| bitstream_all_pps_in_first_au_flag | u(1) |
| if(bitstream_all_pps_in_first_au_flag ) | |
|     bitstream_no_pps_set_update_flag | u(1) |
| bitstream_progressive_frames_only_flag | u(1) |
| bitstream_unpacked_frames_only_flag | u(1) |
| bitstream_tiles_unchanging_flag | u(1) |
| bitstream_wpp_unchanging_flag | u(1) |
| bitstream_dependent_slices_unchanging_flag | u(1) |
| bitstream_proterties_sei_extension_flag | u(1) |
| } | |

In the following description of the syntax elements in the bitstream properties SEI message, "the bitstream" may refer to "the bitstream containing the bitstream properties SEI message."

A VPS may include a general_profile_space syntax element, general_profile_idc syntax element, a general_profile_compatibility_flag[i] syntax element, and a general_reserved_zero_16 bits syntax element. In the example of Table 2, the bitstream_profile_unchanging_flag syntax element equal to 1 indicates that the values of the general_profile_idc syntax element, the general_profile_compatibility_flag[i] syntax element for i in the range of 0 to 31, inclusive, and the general_reserved_zero_16 bits syntax element are respectively identical for all SPSs that are activated when the bitstream is decoded. If the bitstream_profile_unchanging_flag syntax element is equal to 0, the values of the general_profile_idc syntax element, the general_profile_compatibility_flag[i] syntax element for i in the range of 0 to 31, inclusive, and the general_reserved_zero_16 bits syntax element are not respectively identical for all SPSs that are activated when the bitstream is decoded.

Thus, each of SPSs that is activated when a bitstream is decoded may include a plurality of general profile compatibility flag syntax elements. Each respective general profile compatibility flag syntax element in each plurality of general profile compatibility flag syntax elements is associated with an index (e.g., i). Furthermore, corresponding general profile compatibility flag syntax elements are associated with the same index. Thus, a general profile compatibility flag syntax element associated with index i in a first SPS may correspond to a general profile compatibility flag syntax element with index i in a second SPS. When a particular syntax element (e.g., bitstream_profile_unchanging_flag) has a particular value (e.g., 1), each of the corresponding general profile compatibility flag syntax elements in the SPSs has an identical value. Furthermore, each of the SPSs may include a general_reserved_zero_16 bits syntax element. When the particular syntax element (e.g., bitstream_profile_unchanging_flag) has the particular value (e.g., 1), the general_reserved_zero_16 bits syntax element in each of the SPSs has the same value.

A VPS may include a profile_tier_level syntax structure that includes a general_tier_flag syntax element and a general_level_idc syntax element. In the example of Table 2, if the bitstream_tier_level_unchanging_flag syntax element is equal to 1, the values of the general_tier_flag syntax element and the general_level_idc syntax element are respectively identical for all SPSs that are activated when the bitstream is decoded. If the bitstream_tier_level_unchanging_flag syntax element is equal to 0, the values of the general_tier_flag syntax element and the general_level_idc syntax element are not respectively identical for all SPSs that are activated when the bitstream is decoded. Thus, the bitstream_tier_level_unchanging_flag syntax element may indicate whether the values of the general_tier_flag syntax element and the general_level_idc syntax element are identical for all SPSs that are activated when the bitstream is decoded.

A SPS may include a pic_width_in_luma_samples syntax element and a pic_height_in_luma_samples syntax element. In the example of Table 2, if the bitstream_spatial_resolution_unchanging_flag syntax element is equal to 1, the values of the pic_width_in_luma_samples syntax element and the pic_height_in_luma_samples syntax element are respectively identical for all SPSs that are activated when the bitstream is decoded. If the bitstream_spatial_resolution_unchanging_flag syntax element is equal to 0, the values of the pic_width_in_luma_samples syntax element and the pic_height_in_luma_samples syntax element are not respectively identical for all SPSs that are activated when the bitstream is decoded. Thus, the bitstream_spatial_resolution_unchanging_flag syntax element may indicate whether all CVSs of the bitstream have the same spatial resolution.

Furthermore, in the example of Table 2, if the bitstream_num_sub_layers_unchanging_flag syntax element is equal to 1, the number of temporal sub-layers is identical for all CVSs in the bitstream. If the bitstream_num_sub_layers_unchanging_flag syntax element is equal to 0, the number of temporal sub-layers is not identical for all CVSs in the bitstream. Thus, the bitstream_num_sub_layers_unchanging_flag syntax element may indicate whether the number of temporal sub-layers of the bitstream is identical for all CVSs in the bitstream.

In the example of Table 2, if the bitstream_max_bitrate_unchanging_flag is equal to 1, the maximum bitrate is identical for all CVSs in the bitstream. If the bitstream_max_bitrate_unchanging_flag syntax element is equal to 0, the maximum bitrate is not identical for all CVSs in the bitstream. Thus, the bitstream_max_bitrate_unchanging_flag syntax element may indicate whether the maximum bitrate is identical for all CVSs in the bitstream.

In addition, in the example of Table 2, if the bitstream_max_pic_rate_unchanging_flag syntax element is equal to 1, the maximum picture rate is identical for all CVSs in the bitstream. If the bitstream_max_pic_rate_unchanging_flag syntax element is equal to 0, the maximum picture rate is not identical for all CVSs in the bitstream. Thus, the bitstream_max_pic_rate_unchanging_flag syntax element may indicate whether the maximum picture rate is identical for all CVSs in the bitstream.

Furthermore, in the example of Table 2, the bitstream_color_format_unchanging_flag syntax element equal to 1 indicates that the value of the chroma_format_idc syntax element is identical for all SPSs that are activated when the bitstream is decoded. The bitstream_color_format_unchanging_flag syntax element equal to 0 indicates that the value of the chroma_format_idc syntax element is not identical for all SPSs that are activated when the bitstream is decoded. Thus, the bitstream_color_format_unchanging_flag syntax element may indicate whether all CVSs in the bitstream have the same color format.

A SPS may include a VUI parameters syntax structure that includes an aspect_ratio_idc syntax element. In the example of Table 2, the bitstream_aspect_ratio_unchanging_flag syntax element equal to 1 indicates that the value of the aspect_ratio_idc syntax element is identical for all SPSs that are activated when the bitstream is decoded, and, when the aspect_ratio_idc syntax element is equal to Extended_SAR, the values of the sar_width syntax element and the sar_height syntax element are respectively identical for all SPSs that are activated when the bitstream is decoded. The bitstream_aspect_ratio_unchanging_flag syntax element equal to 0 indicates that the value of the aspect_ratio_idc syntax element is not identical for all SPSs that are activated when the bitstream is decoded, or, the values of the sar_width syntax element and the sar_height syntax element are not respectively identical for all SPSs that are activated when the bitstream is decoded. Thus, the bitstream_aspect_ratio_unchanging_flag syntax element may indicate whether all CVSs in the bitstream have the same sample aspect ratio.

A SPS may include a bit_depth_minus8 syntax element and a bit_depth_chroma_minus8 syntax element. The bitstream_bit_depth_unchanging_flag syntax element of Table 2 equal to 1 indicates that the values of the bit_depth_luma_minus8 syntax element and the bit_depth_chroma_minus8 syntax element are respectively identical for all SPSs that are activated when the bitstream is decoded. The bitstream_bit_depth_unchanging_flag syntax element equal to 0 indicates that the values of the bit_depth_luma_minus8 syntax element and the bit_depth_chroma_minus8 syntax element are not respectively identical for all SPSs that are activated when the bitstream is decoded. Thus, the bitstream_bit_depth_unchanging_flag syntax element may indicate whether all the CVSs in the bitstream have the same set of bit depths for luma and chroma.

Furthermore, the bitstream_full_random_access_enabled_flag syntax element of Table 2 equal to 1 indicates that it is possible to perform random access at the position of each RAP access unit in the bitstream by discarding all access units before the RAP access unit and to correctly decode the RAP picture and all the subsequent non-TFD pictures in decoding order. That is, for each RAP access unit, when all access units before the RAP access unit are discarded and the remaining part of the bitstream is decoded, each parameter set is still available in the bitstream when the parameter set needs to be activated. Thus, the bitstream_full_random_access_enabled_flag syntax element may indicate whether the presence of parameter sets in the bitstream enables full random accessibility. This may require that, when the above random access is performed at any RAP access unit, each parameter set is available in the bitstream when the parameter set needs to be activated.

In the example of Table 2, the bitstream_all_parameter_sets_in_first_au_flag syntax element equal to 1 indicates that all parameter sets that are activated when the bitstream is decoded are present in the first access unit in bitstream. The bitstream_all_parameter_sets_in_first_au_flag syntax element equal to 0 indicates that not all parameter sets that are activated when the bitstream is decoded are present in the first access unit in bitstream. When the bitstream_all_parameter_sets_in_first_au_flag syntax element is equal to 1, there may still be parameter sets repeated in other access units in the bitstream (e.g., for error resilience purposes). However, there may parameter set updates among the repeated parameter sets. Thus, the bitstream_all_parameter_sets_in_first_au_flag syntax element may indicate whether all parameter sets are present within the first access unit in the bitstream.

In addition, in the example of Table 2, the bitstream_no_parameter_set_update_flag syntax element equal to 1 indicates that the content of at least one video parameter set, sequence parameter set, or picture parameter set in the bitstream is changed without changing the video_parameter_set_id, seq_parameter_set_id, or pic_parameter_set_id in the parameter set NAL unit. The bitstream_no_parameter_set_update_flag syntax element equal to 0 indicates that the content of no parameter set is changed without changing the video_parameter_set_id, seq_parameter_set_id, or pic_parameter_set_id in the parameter set NAL unit. Thus, the bitstream_no_parameter_set_update_flag syntax element indicates whether in the bitstream at least one VPS is updated, whether in the bitstream at least one SPS is updated, or whether in the bitstream at least one PPS is updated.

In the example of Table 2, the bitstream_all_sps_in_first_au_flag syntax element equal to 1 indicates that all SPSs that are activated when the bitstream is decoded are present in the first access unit in the bitstream. The bitstream_all_sps_in_first_au_flag syntax element equal to 0 indicates that not all SPSs that are activated when the bitstream is decoded are present in the first access unit in bitstream. When bitstream_all_sps_in_first_au_flag is equal to 1, there may still be SPSs repeated in other access units in the bitstream, e.g., for error resilience purposes. However, there may not be any SPS update between the repeated SPSs. Thus, the bitstream_all_sps_in_first_au_flag syntax element may indicate whether all SPSs that are activated when the bitstream is decoded are present in the first access unit in the bitstream.

Furthermore, in the example of Table 2, the bitstream_no_sps_update_flag syntax element equal to 1 indicates that the content of at least one SPS in the bitstream is changed without changing the seq_parameter_set_id in an SPS NAL unit that encapsulates the SPS. The bitstream_no_sps_update_flag syntax element equal to 0 indicates that the content of no SPS in the bitstream is changed without changing the seq_parameter_set_id in the SPS NAL unit. Thus, the bitstream_no_sps_update_flag syntax element may indicate whether at least one SPS is updated while the same SPS identifier is used.

The bitstream_all_pps_in_first_au_flag syntax element of Table 2 equal to 1 indicates that all PPSs that are activated when the bitstream is decoded are present in the first access unit in the bitstream. The bitstream_all_pps_in_first_au_flag syntax element equal to 0 indicates that not all PPSs that are activated when the bitstream is decoded are present in the first access unit in the bitstream. When the bitstream_all_pps_in_first_au_flag syntax element is equal to 1, there may still be PPSs repeated in other access units in the bitstream, e.g., for error resilience purposes. However, there may not be any PPS update among the repeated PPSs. Thus, the bitstream_all_pps_in_first_au_flag syntax element may indicate whether all PPSs are present at the beginning of the bitstream.

In addition, in the example of Table 2, the bitstream_no_pps_update_flag syntax element equal to 1 indicates that the content of at least one PPS in the bitstream is changed without changing the pic_parameter_set_id syntax element in the PPS NAL unit. The bitstream_no_pps_update_flag syntax element equal to 0 indicates that the content of no PPS in the bitstream is changed without changing the pic_parameter_set_id syntax element in the PPS NAL unit. Thus, the bitstream_no_pps_update_flag syntax element may indicate whether in the bitstream at least one PPS is changed but the same PPS identifier is used.

A SPS may include a VUI parameters syntax structure that includes a field_seq_flag syntax element. Furthermore, in the example of Table 2, the bitstream_progressive_frames_only_flag syntax element equal to 1 indicates that the value of the field_seq_flag syntax element of an SPS is equal to 0 for all SPSs that are activated when the bitstream is decoded, and there is no field indication SEI message in the bitstream. The bitstream_progressive_frames_only_flag syntax element equal to 0 indicates that there is at least one field indication SEI message in the bitstream. Thus, the bitstream_progressive_frames_only_flag syntax element may indicate whether all CVSs in the bitstream contain only progressive frames coded in frame pictures.

In the example of Table 2, the bitstream_unpacked_frames_only_flag syntax element equal to 1 indicates that there is no frame packing arrangement SEI message in the bitstream. The bitstream_unpacked_frames_only_flag syntax element equal to 0 indicates that there is at least one frame packing arrangement SEI message in the bitstream. Thus, the bitstream_unpacked_frames_only_flag syntax element may indicate whether all CVSs in the bitstream contain no frame packing arrangement SEI messages.

A PPS may include a tiles_enabled_flag syntax element. The tiles_enabled_flag syntax element of a PPS may specify whether there may be more than one tile in each picture referring to the PPS. In the example of Table 2, the bitstream_tiles_unchanging_flag syntax element equal to 1 indicates that values of tiles_enabled_flag syntax elements of PPSs are identical for all PPSs that are activated when the bitstream is decoded, and when the value of the tiles_enabled_flag syntax elements are equal to 1, values of tiles_fixed_structure_flag syntax elements are identical for all SPSs that are activated when the bitstream is decoded. The bitstream_tiles_unchanging_flag syntax element equal to 0 indicates that the values of tiles_enabled_flag syntax elements are not identical for all PPSs that are activated when the bitstream is decoded, or the values of tiles_fixed_structure_flag syntax elements are not identical for all SPSs that are activated when the bitstream is decoded. Thus, the bitstream_tiles_unchanging_flag syntax element may indicate whether all CVSs in the bitstream have the same tile configuration.

A PPS may include an entropy_coding_sync_enabled_flag syntax element. In the example of Table 2, the bitstream_wpp_unchanging_flag syntax element equal to 1 indicates that values of entropy_coding_sync_enabled_flag syntax elements of a PPS are identical for all PPSs that are activated when the bitstream is decoded. The bitstream_wpp_unchanging_flag syntax element equal to 0 indicates that values of entropy_coding_sync_enabled_flag syntax elements are not identical for all PPSs that are activated when the bitstream is decoded. Thus, the bitstream_wpp_unchanging_flag syntax element may indicate whether all CVSs in the bitstream make use of wavefront parallel processing.

The dependent_slices_enabled_flag syntax element is a syntax element in a PPS that specifies whether dependent_slice_flag syntax elements are present in slice headers for coded pictures referring to the PPS. In addition, in the example of Table 2, the bitstream_dependent_slices_unchanging_flag syntax element equal to 1 indicates that values of dependent_slices_enabled_flag syntax elements of PPSs are identical for all PPSs that are activated when the bitstream is decoded. The bitstream_dependent_slices_unchanging_flag syntax element equal to 0 indicates that values of dependent_slices_enabled_flag syntax elements are not identical for all PPSs that are activated when the bitstream is decoded. Thus, the bitstream_dependent_slices_unchanging_flag syntax element may indicate whether all CVSs in the bitstream make use of dependent slices.

Furthermore, in the example of Table 2, the bitstream_properties_sei_extension_flag syntax element equal to 0 indicates that no additional data follows within the bitstream properties SEI message. It may be a requirement of bitstream conformance that the value of the bitstream_properties_sei_extension_flag syntax element shall be equal to 0. The value 1 for the bitstream_properties_sei_extension_flag syntax element may be reserved for future use by ITU-T|ISO/IEC. In some examples, video decoders shall ignore the value of the bitstream_properties_sei_extension_flag syntax element in a bitstream properties SEI message and shall ignore all data that follows within a bitstream properties SEI message after the value 1 for bitstream_properties_sei_extension_flag. Thus, the bitstream_properties_sei_extension_flag syntax element may indicate whether any additional data follows in the bitstream properties SEI message.

In other examples, a distinct NAL unit type is defined to signal bitstream level properties instead of a bitstream properties SEI message. NAL units belonging to this NAL unit type may be referred to as bitstream properties NAL units. The bitstream properties NAL unit may be specified as a non-VCL NAL unit. The bitstream properties NAL unit may provide information for the entire bitstream containing the NAL unit. The bitstream properties NAL unit may include some or all of the syntax elements of Table 2, above.

In some examples, the bitstream properties NAL unit may be present in the first access unit of a bitstream. Alternatively, in other examples, the bitstream properties NAL unit may be present in any RAP access unit in a bitstream. Furthermore, in some examples, the bitstream properties NAL unit may be present in any access unit in a bitstream. In some examples, it is required that the bitstream properties NAL unit must be the first NAL unit other than an elementary stream level NAL unit in the access unit containing the bitstream properties NAL unit. Alternatively, in other examples, it is required that the first access unit of each bitstream shall include a bitstream properties NAL unit.

FIG. 4 is a conceptual diagram illustrating an example CTB coding order for a picture 200 that is partitioned into multiple tiles 202A, 202B, 202C, 202D, 202E, and 202F (collectively, "tiles 202"). Each square block in picture 200 represents a coding tree block (CTB) associated with a CTU. The thick dashed lines indicate example tile boundaries. Different types of cross-hatching correspond to different slices.

The numbers in the pixel blocks indicate positions of the corresponding CTBs in a tile coding order for picture 200. As illustrated in the example of FIG. 4, CTBs in tile 202A are coded first, followed by CTBs in tile 202B, followed by CTBs in tile 202C, followed by CTBs in tile 202D, followed by CTBs in tile 202E, followed by CTBs in tile 202F. Within each of tiles 202, the CTBs are coded according to a raster scan order.

A video encoder may generate four coded slice NAL units for picture 200. The first coded slice NAL unit may include encoded representations of CTBs 1-18. The slice data of the first coded slice NAL unit may include two sub-streams. The first sub-stream may include the encoded representations of CTBs 1-9. The second sub-stream may include the encoded representations of CTBs 10-18. Thus, the first coded slice NAL unit may include an encoded representation of a slice that contains multiple tiles.

A second coded slice NAL unit may include encoded representations of CTBs 19-22. The slice data of the second coded slice NAL unit may include a single sub-stream. A third coded slice NAL unit may include encoded representations of CTBs 23-27. The slice data of the third coded slice NAL unit may include only a single sub-stream. Thus, tile 202C may contain multiple slices.

A fourth coded slice NAL unit may include encoded representations of CTBs 28-45. The slice data of the fourth coded slice NAL unit may include three sub-streams, one each for tiles 202D, 202E, and 202F. Thus, the fourth coded slice NAL unit may include an encoded representation of a slice that contains multiple tiles.

FIG. 5 is a conceptual diagram illustrating an example of WPP. As described above, a picture may be partitioned into CTBs, each of which is associated a CTU. FIG. 5 illustrates the CTBs as a grid of white squares. The picture includes CTB rows 250A-250E (collectively, "CTB rows 250").

A first parallel processing thread (e.g., executed by one of a plurality of parallel processing cores) may be coding CTBs in CTB row 250A. Concurrently, other threads (e.g., executed by other parallel processing cores) may be coding CTBs in CTB rows 250B, 250C, and 250D. In the example of FIG. 5, the first thread is currently coding a CTB 252A, a second thread is currently coding a CTB 252B, a third thread is currently coding a CTB 252C, and a fourth thread is currently coding a CTB 252D. This disclosure may refer to CTBs 252A, 252B, 252C, and 252D collectively as "current CTBs 252." Because the video coder may begin coding a CTB row after more than two CTBs of an immediately higher row have been coded, current CTBs 252 are horizontally displaced from each other by the widths of two CTBs.

In the example of FIG. 5, the threads may use data from CTBs indicated by the thick gray arrows to perform intra prediction or inter prediction for CUs in current CTBs 252. (The threads may also use data from one or more reference frames to perform inter prediction for CUs.) To code a given CTB, a thread may select one or more CABAC contexts based on information associated with previously-coded CTBs. The thread may use the one or more CABAC contexts to perform CABAC coding on syntax elements associated with the first CU of the given CTB. If the given CTB is not the leftmost CTB of a row, the thread may select the one or more CABAC contexts based on information associated with a last CU of the CTB to the left of the given CTB. If the given CTB is the leftmost CTB of a row, the thread may select the one or more CABAC contexts based on information associated with a last CU of a CTB that is above and two CTBs right of the given CTB. The threads may use data from the last CUs of the CTBs indicated by the thin black arrows to select CABAC contexts for the first CUs of current CTBs 252.

Figure 6:
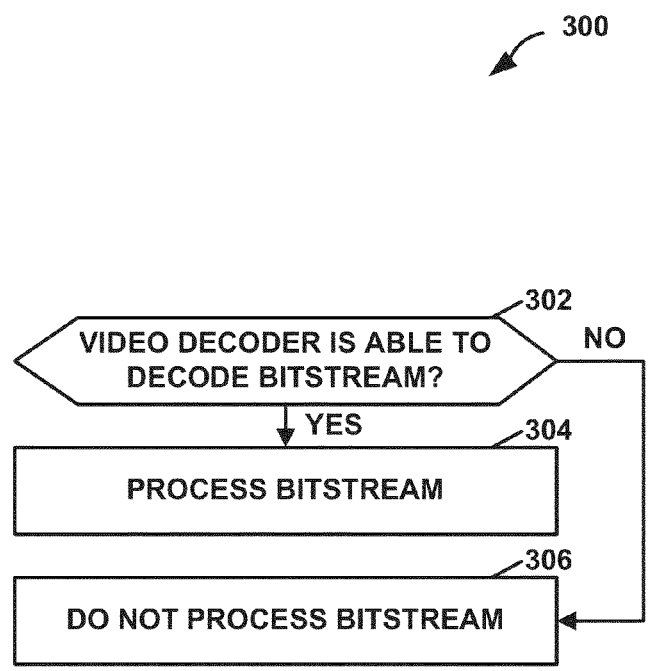
FIG. 6 is a flowchart illustrating an example operation of a video decoder, in accordance with one or more techniques of this disclosure.

FIG. 6 is a flowchart illustrating an example operation 300 of video decoder 30, in accordance with one or more techniques of this disclosure. In the example of FIG. 6, a video processing device (e.g., video decoder 30) may determine, based on a particular syntax element in a Supplemental Enhancement Information (SET) message in a bitstream that comprises an encoded representation of video data, whether video decoder 30 is able to decode the bitstream (302). In some examples, when the signaled property has a particular value, all the CVSs of the bitstream conform to the same profile. In another example, the signaled property may be a particular syntax element (e.g., bitstream_profile_unchanging_flag) and when the particular syntax element has a particular value, general profile indicator (e.g., general profile_idc) syntax elements in respective SPSs that are activated when the bitstream is decoded have identical values. Each of the general profile indicator syntax elements indicates a profile to which a CVS conforms.

When video decoder 30 is able to decode the bitstream ("YES" of 302), the video processing device may process the bitstream (304). For example, the video processing device may decode the bitstream. In another example, the video processing device may forward the bitstream to video decoder 30. Otherwise, when video decoder 30 is not able to decode the bitstream ("NO" of 302), the video processing device does not process the bitstream (306). For example, the video processing device does not decode the bitstream. In another example, the video processing device does not forward the bitstream to video decoder 30. In this way, the video processing device may process, based on the determination, the bitstream.

Figure 7:
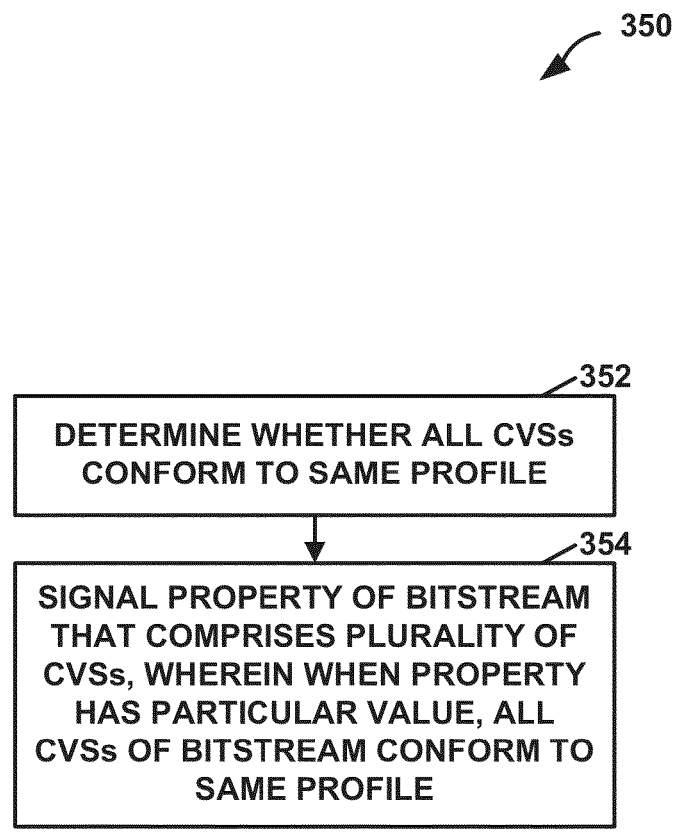
FIG. 7 is a flowchart illustrating an example operation of a video processing device, in accordance with one or more techniques of this disclosure.

FIG. 7 is a flowchart illustrating an example operation 350 of a video processing device, in accordance with one or more techniques of this disclosure. In the example of FIG. 7, the video processing device may be a video encoder (e.g., video encoder 20), a MANE, or another type of device. Furthermore, in the example of FIG. 7, the video processing device may determine whether all CVSs of a bitstream conform to the same profile (352). For instance, the video processing device may determine whether general profile syntax elements in respective SPSs that are activated when the bitstream is decoded have an identical value.

Furthermore, the video processing device may signal a property of the bitstream, wherein when the property has a particular value, all the CVSs of the bitstream conform to the same profile (354). For example, the video processing device may signal, in a bitstream or elementary stream, a SEI message that contains a particular syntax element. In this example, when the particular syntax element has a particular value, general profile indicator syntax elements in respective SPSs that are activated when the bitstream is decoded have an identical value, wherein each of the general profile indicator syntax elements indicates a profile to which a CVS conforms.

In some examples, this disclosure describes a method of processing video data, the method comprising: signaling a set of bitstream properties in a bitstream or a set of ESP in an elementary stream, wherein signaling comprises at least one of the following: signaling the set of bitstream properties in a bitstream properties SEI message; signaling the set of ESP in an ESP SEI message; signaling the set of bitstream properties in a NAL unit that has a distinct NAL unit type, wherein the distinct NAL unit type defines the presence of the set of bitstream properties in the NAL unit; signaling the set of ESP in a NAL unit that has a distinct ESP NAL unit type, wherein the distinct ESP NAL unit type define the presence of the set of ESP properties in the NAL unit; signaling the set of bitstream properties in an ISO base media file format; signaling the set of ESP in an ISO base media file format; signaling the set of bitstream properties in a DASH MPD, wherein DASH stands for dynamic adaptive streaming over HTTP. HTTP stands for hypertext transfer protocol and MPD stands for media presentation description; signaling the set of ESP in a DASH MPD; signaling the set of bitstream properties as CODEC parameters according to RFC 6381; signaling the set of ESP as CODEC parameters according to RFC 6381; signaling the set of bitstream properties in a session description protocol (SDP) file; and signaling the set of ESP in an SDP file. In this example, processing may comprise encoding; and signaling may include generating the bitstream so as to include the set of bitstream properties or generating the elementary stream so as to include the ESP. Alternatively, in this example, processing comprises decoding; and signaling includes receiving and decoding the bitstream that includes the set of bitstream properties or receiving and decoding the elementary stream so as to include the ESP. In this example, processing may occur at a MANE; and signaling includes receiving and interpreting the set of bitstream properties without fully decoding the bitstream or receiving and interpreting the ESP without fully decoding the elementary stream. A device configured to perform the method of this example. The device may comprise one of: an encoder; a decoder, and a MANE. A computer readable storage medium comprising instructions that when executed cause one or more processors to perform the method of this example. A device that processes video data, the device comprising means for performing the method of this example.

One or more techniques of this disclosure provide for a method of processing video data, the method comprising: signaling a set of bitstream properties in a bitstream, wherein signaling the set of bitstream properties comprises signaling the set of bitstream properties in a bitstream properties SEI message. In this example, the bitstream properties SEI message may be present in a first access unit of the bitstream. Alternatively, in this example, the bitstream properties SEI message is present in a RAP access unit of the bitstream. In this example, the bitstream properties SEI message, when present in an SEI NAL unit, may be located as a first SEI message in the SEI NAL unit. Alternatively, in this example, the bitstream properties SEI message, when present, may located in an SEI NAL unit that does not contain any other SEI messages. Alternatively, in this example, the bitstream properties SEI message, when present in an SET NAL unit, is located as a first SEI message in an access unit, other than an elementary stream level NAL unit in the access unit that contains the SEI NAL unit. In this example, the bitstream may be required to include a first access unit that includes an SEI NAL unit that includes the bitstream properties SEI message. In some examples, the SEI NAL unit in the first access unit does not include any other SEI messages. In the method of this example, the bitstream properties SEI message may comprise one or more of the following plurality of flags: a bitstream_profile_unchanging_flag: a bitstream_tier_level_unchanging_flag; a bitstream_spatial_resolution_unchanging_flag; a bitstream_num_sub_layers_unchanging_flag; a bitstream_max_bitrate_unchanging_flag; a bitstream_max_pic_rate_unchanging_flag; a bitstream_color_format_unchanging_flag; a bitstream_aspect_ratio_unchanging_flag; a bitstream_bit_depth_unchanging_flag; a bitstream_full_random_access_enabled_flag; a bitstream_all_parameter_sets_in_first_au_flag; a bitstream_no_parameter_set_update_flag: an es_all_sps_in_first_au_flag; an es_no_sps_update_flag; an es_all_pps_in_first_au_flag; an es_no_pps_update_flag; a bitstream_progressive_frames_only_flag; a bitstream_unpacked_frames_only_flag; a bitstream_tiles_unchanging_flag; a bitstream_wpp_unchanging_flag; a bitstream_dependent_slices_unchanging_flag; and bitstream_proterties_sei_extension_flag. In this example method, the bitstream properties SEI message may include a subset of the plurality of the flags listed above, wherein the subset includes at least two or more of the plurality of flags. In this example method, the bitstream properties SEI message may include all of the plurality of the flags listed above. In this example method, the bitstream properties SEI message includes at least one additional flag not above. The above method may further comprise: processing comprises encoding; and signaling the set of bitstream properties in the bitstream includes generating the bitstream so as to include the set of bitstream properties. In the above method processing may comprise decoding; and signaling the set of bitstream properties in the bitstream may include receiving and decoding the bitstream that includes the set of bitstream properties. Furthermore, in this method processing may occur at a MANE; and signaling the set of bitstream properties in the bitstream may include receiving and interpreting the set of bitstream properties without fully decoding the bitstream.

In another example, this disclosure describes a method of processing video data, the method comprising: signaling a set of ESP in an elementary stream, wherein signaling the set of ESP comprises signaling the set of ESP in an ESP SEI message. In this example method, the ESP SEI message may include information for an entire elementary stream containing the ESP SEI message. Furthermore, in this example method, the ESP SEI message may be included in a first access unit of the elementary stream. In this example method, the ESP SEI message may be included in a RAP access unit of the elementary stream. In this example method, the ESP SEI message can be included within any access unit of the elementary stream. Furthermore, in this example method, the ESP SEI message, when present in an SEI NAL unit, is a located as a first SEI message in the SEI NAL unit. In this example method, the ESP SEI message, when present, may be located in SEI NAL unit that does not contain any other SEI messages. In this example method, the ESP SEI message, when present in an SEI NAL unit, may be located as a first SEI message in an access unit. Furthermore, in this example method, the elementary stream may be required to include a first access unit that includes an SEI NAL unit that includes the ESP SEI message. In this example method, the ESP SEI message may comprise one or more of the following plurality of flags: an es_profile_unchanging_flag; an es_tier_level_unchanging_flag; an es_spatial_resolution_unchanging_flag; an es_num_sub_layers_unchanging_flag; an es_max_bitrate_unchanging_flag; an es_max_pic_rate_unchanging_flag; an es_color_format_unchanging_flag; an es_aspect_ratio_unchanging_flag; an es_bit_depth_unchanging_flag; an es_full_random_access_enabled_flag; an es_all_vps_in_first_au_flag; an es_no_vps_update_flag; an es_all_sps_in_first_au_flag; an es_no_sps_update_flag; an es_all_pps_in _first_au_flag; an es_no_pps_update_flag; an es_progressive_frames_only_flag; an es_unpacked_frames_only_flag; an es_tiles_unchanging_flag; an es_wpp_unchanging_flag; an es_dependent_slices_unchanging_flag; and an es_proterties_sei_extension_flag. In this example method, the ESP SEI message may include a subset of the plurality of the flags listed above, wherein the subset includes at least two or more of the plurality of flags. In this example method, the ESP SEI message may include all of the plurality of the flags listed above. In this example method, the ESP SEI message may include at least one additional flag not listed above. In this example method, processing may comprise encoding; and signaling the set of ESP may include generating the elementary stream so as to include the ESP. In this example method processing may comprise decoding; and signaling the set of ESP in the elementary stream may include receiving and decoding the elementary stream that includes the set of ESP. In this example method, processing may occur at a MANE; and signaling the set of ESP in the elementary stream may include receiving and interpreting the elementary stream without fully decoding the elementary stream.

In another example, this disclosure describes a method of processing video data, the method comprising: signaling a set of bitstream properties in a bitstream, wherein signaling the set of bitstream properties comprises signaling the set of bitstream properties in a network abstraction layer NAL unit that has a distinct NAL unit type, wherein the distinct NAL unit type defines the presence of the set of bitstream properties in the NAL unit. In this example method, the NAL unit that has the distinct NAL unit type may comprise a bitstream properties NAL unit. In some instances, the NAL unit that has the distinct NAL unit type may not be variable length coded (VCL). In this example method, the NAL unit that has the distinct NAL unit type may provide information for an entire bitstream containing the NAL unit. In this example method, the NAL unit that has the distinct NAL unit type may be present in the first access unit of the bitstream. In this example, the NAL unit that has the distinct NAL unit type may be present in RAP access unit in a bitstream. In this example, the NAL unit that has the distinct NAL unit type may be present in any access unit in a bitstream. In this example, the NAL unit that has the distinct NAL unit type may comprise a first NAL unit other than an elementary stream level NAL unit in an access unit containing the NAL unit that has the distinct NAL unit type. In this example, the NAL unit that has the distinct NAL unit type may be included in a first access unit of every bitstream that is coded according to a particular video coding standard. In this example, processing may comprise encoding; and signaling the set of bitstream properties in the bitstream may include generating the bitstream so as to include the set of bitstream properties. In this example, processing may comprise decoding; and signaling the set of bitstream properties in the bitstream may include receiving and decoding the bitstream that includes the set of bitstream properties. In this example, processing may occur at a MANE; and signaling the set of bitstream properties in the bitstream may include receiving and interpreting the set of bitstream properties without fully decoding the bitstream. In this example, the device performing the method may comprise one of: an encoder; a decoder; and a MANE.

In another example, this disclosure describes a method of processing video data, the method comprising: signaling a set of ESP in an elementary stream, wherein signaling the set of ESP comprises signaling the set of ESP in a NAL unit that has a distinct ESP NAL unit type, wherein the distinct ESP NAL unit type define the presence of the set of ESP properties in the NAL unit. In some instance, in this example, the NAL unit that has the distinct ESP NAL unit type is not variable length coded (VCL). In this example, the NAL unit that has the distinct ESP NAL unit type may provide information for an entire bitstream containing the NAL unit. In this example, the NAL unit that has the distinct ESP NAL unit type may be present in the first access unit of the bitstream. In this example, the NAL unit that has the distinct ESP NAL unit type may be present in RAP access unit in a bitstream. In this example, the NAL unit that has the distinct ESP NAL unit type may be present in any access unit in a bitstream. In this example, the NAL unit that has the distinct ESP NAL unit type may comprise a first NAL unit in an access unit containing the NAL unit that has the distinct ESP NAL unit type. In this example, the NAL unit that has the distinct ESP NAL unit type may be included in a first access unit of every elementary stream that is coded according to a particular video coding standard. In this example, processing may comprise encoding; and signaling the set of ESP may include generating the elementary stream so as to include the set of ESP. In this example, processing may comprise decoding; and signaling the set of ESP may include receiving and decoding the elementary stream that includes the set of ESP. In this example, processing occurs at a MANE; and signaling the set of ESP may include receiving and interpreting the ESP without fully decoding the elementary stream. In this example, the device that performs the method may comprise one of: an encoder, a decoder; and a MANE.

In another example, this disclosure describes a method of processing video data, the method comprising: signaling a set of bitstream properties in a bitstream, wherein signaling the set of bitstream properties comprises signaling the set of bitstream properties in an ISO base media file format. In this example, the ISO base media file format may comprise a sample entry in a HEVC track. In this example, the ISO base media file format may comprise a properties box that is contained in one or more of: a track header box, a media information box, and a video media header box of an HEVC video track.

In another example, this disclosure describes a method of processing video data, the method comprising: signaling a set of ESP in an elementary stream, wherein signaling the set of ESP comprises signaling the set of ESP in an ISO base media file format. In this example, the ISO base media file format may comprise an elementary stream properties box that is contained in one or more of: a track header box, a media information box, and a video media header box of an HEVC video track. In this example, processing may comprise encoding; and signal the set of bitstream properties or the ESP may include generating the bitstream so as to include the set of bitstream properties or generating the elementary stream so as to include the ESP. In this example, processing may comprise decoding; and signaling the set of bitstream properties or the ESP includes receiving and decoding the bitstream that includes the set of bitstream properties or elementary stream that includes the ESP. In this example, processing may occur at a MANE; and signaling the set of bitstream properties or the ESP may include receiving and interpreting the set of bitstream properties or the ESP without fully decoding the bitstream or the elementary stream. In this example, the device performing the method may comprise one of: an encoder; a decoder; and a MANE.

In another example, this disclosure describes a method of processing video data, the method comprising: signaling a set of bitstream properties in a bitstream, wherein signaling the set of bitstream properties comprises signaling the set of bitstream properties in a DASH MPD, wherein DASH stands for dynamic adaptive streaming over HTTP, HTTP stands for hypertext transfer protocol and MPD stands for media presentation description. In this example, signaling the set of bitstream properties in the DASH MPD may comprise signaling on one of: a period level; an adaption set level; a representation level; and a sub-representation level.

In another example, this disclosure describes a method of processing video data, the method comprising: signaling a set of ESP in a DASH MPD, wherein DASH stands for dynamic adaptive streaming over HTTP, HTTP stands for hypertext transfer protocol and MPD stands for media presentation description. In this example, signaling the set of ESP in the DASH MPD may comprise signaling on one of: a period level; an adaption set level; a representation level; and a sub-representation level.

In another example, this disclosure describes a method of processing video data, the method comprising: signaling a set of bitstream properties in a bitstream, wherein signaling the set of bitstream properties comprises signaling the set of bitstream properties as CODEC parameters according to RFC 6381. In this example, signaling the set of bitstream properties as CODEC parameters comprises signaling multiple profiles and/or tiers and levels in the codecs parameters to represent maximum sets of profiles, tiers and levels of the bitstream.

In another example, this disclosure describes a method of processing video data, the method comprising: signaling a set of ESP as CODEC parameters according to RFC 6381. In this example, signaling the set of ESP as CODEC parameters comprises signaling multiple profiles and/or tiers and levels in the codecs parameters to represent maximum sets of profiles, tiers and levels of an elementary stream.

In another example, this disclosure describes a method of processing video data, the method comprising: signaling a set of bitstream properties in a bitstream, wherein signaling the set of bitstream properties comprises signaling the set of bitstream properties in a SDP file. In this example, signaling the set of bitstream properties in the SDP file may comprise signaling multiple profiles and/or tiers and levels in one or more media level SDP attributes to represent a maximum sets of profiles, tiers and levels in the bitstream. In this example, signaling the set of bitstream properties in the SDP file may comprise using an optional payload type parameter that includes multiple profiles.

In another example, this disclosure describes a method of processing video data, the method comprising: signaling a set of ESP in a SDP file. In this example, signaling the set of ESP in the SDP file may comprise signaling multiple profiles and/or tiers and levels in one or more media level SDP attributes to represent a maximum sets of profiles, tiers, and levels in the bitstream. In this example, signaling the set of bitstream properties in the SDP file may comprise using an optional payload type parameter that includes multiple profiles. In this example, processing may comprise encoding; and signaling the set of bitstream properties or the ESP may include generating the bitstream or the elementary stream so as to include the set of bitstream properties or the ESP. In this example, processing may comprise decoding; and signaling the set of bitstream properties or the ESP may include receiving and decoding the bitstream or that includes the set of bitstream properties or the elementary stream that includes the ESP. In this example, processing occurs at a MANE; and signaling the set of bitstream properties may comprise receiving and interpreting the set of bitstream properties or the ESP without fully decoding the bitstream or the elementary stream. In this example, the device performing the method may comprise one of: an encoder; a decoder; and a MANE.

In another example, this disclosure describes a method of processing video data, the method comprising: signaling a set of bitstream properties in a bitstream, wherein the bitstream properties include information indicating whether tier and level remains unchanged for all CVSs in the bitstream.

In another example, this disclosure describes a method of processing video data, the method comprising: signaling a set of bitstream properties in a bitstream, wherein the bitstream properties include information indicating whether all CVSs in the bitstream have a same spatial resolution.

In another example, this disclosure describes a method of processing video data, the method comprising: signaling a set of bitstream properties in a bitstream, wherein the bitstream properties include information indicating whether all CVSs in the bitstream have a same maximum number of temporal sub-layers.

In another example, this disclosure describes a method of processing video data, the method comprising: signaling a set of bitstream properties in a bitstream, wherein the bitstream properties include information indicating whether all CVSs in the bitstream have a same maximum number of layers. In this example, the method may further comprise signaling whether in all CVSs in the bitstream, all the layers have the same set of layer IDs.

In another example, this disclosure describes a method of processing video data, the method comprising: signaling a set of bitstream properties in a bitstream, wherein the bitstream properties include information indicating whether all CVSs in the bitstream support a same set of operation points.

In another example, this disclosure describes a method of processing video data, the method comprising: signaling a set of bitstream properties in a bitstream, wherein the bitstream properties include information indicating whether all CVSs in the bitstream have a same maximum picture rate.

In another example, this disclosure describes a method of processing video data, the method comprising: signaling a set of bitstream properties in a bitstream, wherein the bitstream properties include information indicating whether all CVSs in the bitstream have a same maximum bitrate.

In another example, this disclosure describes a method of processing video data, the method comprising: signaling a set of bitstream properties in a bitstream, wherein the bitstream properties include information indicating whether all CVSs in the bitstream have a same color format.

In another example, this disclosure describes a method of processing video data, the method comprising: signaling a set of bitstream properties in a bitstream, wherein the bitstream properties include information indicating whether all CVSs in the bitstream have a same sample aspect ratio.

In another example, this disclosure describes a method of processing video data, the method comprising: signaling a set of bitstream properties in a bitstream, wherein the bitstream properties include information indicating whether all CVSs in the bitstream have a same set of bit depths for luma samples and chroma samples.

In another example, this disclosure describes a method of processing video data, the method comprising: signaling a set of bitstream properties in a bitstream, wherein the bitstream properties include information indicating whether at least one parameter set is updated in the bitstream.

In another example, this disclosure describes a method of processing video data, the method comprising: signaling a set of bitstream properties in a bitstream, wherein the bitstream properties include information indicating whether all parameter sets are present at the beginning of the bitstream.

In another example, this disclosure describes a method of processing video data, the method comprising: signaling a set of bitstream properties in a bitstream, wherein the bitstream properties include information indicating whether a presence of parameter sets in the bitstream enables full random accessibility In another example, this disclosure describes a method of processing video data, the method comprising: signaling a set of bitstream properties in a bitstream, wherein the bitstream properties include information indicating whether all CVSs in the bitstream contain only progressive frames coded in frame pictures.

In another example, this disclosure describes a method of processing video data, the method comprising: signaling a set of bitstream properties in a bitstream, wherein the bitstream properties include information indicating whether all CVSs in the bitstream contain no frame packing arrangement SEI messages.

In another example, this disclosure describes a method of processing video data, the method comprising: signaling a set of bitstream properties in a bitstream, wherein the bitstream properties include information indicating whether all CVSs in the bitstream contain the support of tiles.

In another example, this disclosure describes a method of processing video data, the method comprising: signaling a set of bitstream properties in a bitstream, wherein the bitstream properties include information indicating whether all CVSs in the bitstream have a same tile configuration.

In another example, this disclosure describes a method of processing video data, the method comprising: signaling a set of bitstream properties in a bitstream, wherein the bitstream properties include information indicating whether all CVSs in the bitstream have a same coding tree block size.

In another example, this disclosure describes a method of processing video data, the method comprising: signaling a set of bitstream properties in a bitstream, wherein the bitstream properties include information indicating whether all CVSs in the bitstream have a same maximum coding tree block size.

In another example, this disclosure describes a method of processing video data, the method comprising: signaling a set of bitstream properties in a bitstream, wherein the bitstream properties include information indicating whether all CVSs in the bitstream have a same minimum coding tree block size.

In another example, this disclosure describes a method of processing video data, the method comprising: signaling a set of bitstream properties in a bitstream, wherein the bitstream properties include information indicating whether all CVSs in the bitstream have a same set of sequence level parameters.

In another example, this disclosure describes a method of processing video data, the method comprising: signaling a set of bitstream properties in a bitstream, wherein the bitstream properties include information indicating whether all CVSs in the bitstream have some comment set of sequence level parameters.

In another example, this disclosure describes a method of processing video data, the method comprising: signaling a set of bitstream properties in a bitstream, wherein the bitstream properties include information indicating whether all CVSs in the bitstream make use of a particular coding tool. In this example, the particular coding tool may be one of: dependent slices; wavefront parallel processing; tiles; and weighted prediction.

In another example, this disclosure describes a method of processing video data, the method comprising: signaling a set of bitstream properties in a bitstream, wherein the bitstream properties include information indicating whether all CVSs in the bitstream have a same SOP as described by SOP description SEI messages.

In another example, this disclosure describes a method of processing video data, the method comprising: signaling a set of bitstream properties in a bitstream, wherein the bitstream properties include information indicating whether all CVSs in the bitstream can be decoded and outputted with acceptable quality.

In another example, this disclosure describes a method of processing video data, the method comprising: signaling a set of bitstream properties in a bitstream, wherein the bitstream properties include information indicating whether there should only be one VPS activated when the bitstream is decoded. In this example, the method may further comprise: signaling a VPS identification (ID) of the one VPS.

In another example, this disclosure describes a method of processing video data, the method comprising: signaling a set of bitstream properties in a bitstream, wherein the bitstream properties include information indicating whether there should only be one SPS activated when the bitstream is decoded. In this example, the method may further comprise signaling a SPS identification (ID) of the one SPS.

In another example, this disclosure describes a method of processing video data, the method comprising: signaling a set of bitstream properties in a bitstream, wherein the bitstream properties include information indicating whether there should only be one PPS activated when the bitstream is decoded. In this example, the method may further comprise signaling a PPS identification (ID) of the one PPS.

In another example, a method of processing video data, the method comprising: signaling a set of bitstream properties in a bitstream, wherein the bitstream properties include information indicating whether all RAP pictures are IDR pictures in the bitstream.

In another example, this disclosure describes a method of processing video data, the method comprising: signaling a set of bitstream properties in a bitstream, wherein the bitstream properties include information indicating whether all (RAP pictures are not IDR pictures in the bitstream.

In another example, this disclosure describes a method of processing video data, the method comprising: signaling a set of bitstream properties in a bitstream, wherein the bitstream properties include information indicating whether there are RAP pictures that are IDR pictures in the bitstream.

In another example, this disclosure describes a method of processing video data, the method comprising: signaling a set of bitstream properties in a bitstream, wherein the bitstream properties include information indicating whether there are non-IDR pictures that are RAP pictures in the bitstream.

In another example, this disclosure describes a method of processing video data, the method comprising: signaling a set of bitstream properties in a bitstream, wherein the bitstream properties include information indicating whether all RAP pictures in the bitstream are CRA pictures.

In another example, this disclosure describes a method of processing video data, the method comprising: signaling a set of bitstream properties in a bitstream, wherein the bitstream properties include information indicating whether all RAP pictures in the bitstream are not CRA pictures.

In another example, this disclosure describes a method of processing video data, the method comprising: signaling a set of bitstream properties in a bitstream, wherein the bitstream properties include information indicating whether there are RAP pictures in the bitstream that are CRA pictures.

In another example, this disclosure describes a method of processing video data, the method comprising: signaling a set of bitstream properties in a bitstream, wherein the bitstream properties include information indicating whether there are non-CRA pictures that are RAP pictures in the bitstream.

In another example, this disclosure describes a method of processing video data, the method comprising: signaling a set of bitstream properties in a bitstream, wherein the bitstream properties include information indicating whether all RAP pictures in the bitstream are BLA pictures.

In another example, this disclosure describes a method of processing video data, the method comprising: signaling a set of bitstream properties in a bitstream, wherein the bitstream properties include information indicating whether all RAP pictures in the bitstream are not BLA pictures.

In another example, this disclosure describes a method of processing video data, the method comprising: signaling a set of bitstream properties in a bitstream, wherein the bitstream properties include information indicating whether there are RAP pictures in the bitstream that are BLA pictures.

In another example, this disclosure describes a method of processing video data, the method comprising: signaling a set of bitstream properties in a bitstream, wherein the bitstream properties include information indicating whether there are non-IDR pictures in the bitstream that are BLA pictures.

In another example, this disclosure describes a method of processing video data, the method comprising: signaling a set of bitstream properties in a bitstream, wherein the bitstream properties include information indicating whether there are DLPs in the bitstream.

In another example, this disclosure describes a method of processing video data, the method comprising: signaling a set of bitstream properties in a bitstream, wherein the bitstream properties include information indicating whether there are non-NLPs in the bitstream.

In another example, this disclosure describes a method of processing video data, the method comprising: signaling a set of bitstream properties in a bitstream, wherein the bitstream properties include information indicating whether there are temporal TSA pictures in the bitstream.

In another example, this disclosure describes a method of processing video data, the method comprising: signaling a set of bitstream properties in a bitstream, wherein the bitstream properties include information indicating whether there are STSA pictures in the bitstream.

In another example, this disclosure describes a method of processing video data, the method comprising: signaling a set of bitstream properties in a bitstream, wherein the bitstream properties include information indicating whether a value of sps_temporal_id_nesting_flag is identical for all sequence parameter sets that are activated when an elementary stream is decoded.

In another example, this disclosure describes a method of processing video data, the method comprising: signaling a set of bitstream properties in a bitstream, wherein the set of bitstream properties include information indicating whether a value of vps_temporal_id_nesting_flag is identical for all video parameter sets that are activated when an elementary stream is decoded.

In another example, this disclosure describes a method of processing video data, the method comprising: signaling a set of bitstream properties in a bitstream, wherein the bitstream properties include information indicating a set of profiles in the bitstream.

A method of processing video data, the method comprising: signaling a set of bitstream properties in a bitstream, wherein the bitstream properties include information indicating a maximum set of profiles in the bitstream.

In another example, this disclosure describes a method of processing video data, the method comprising: signaling a set of bitstream properties in a bitstream, wherein the bitstream properties include information indicating a maximum set of tiers and levels in the bitstream.

In another example, this disclosure describes a method of processing video data, the method comprising: signaling a set of bitstream properties in a bitstream, wherein the bitstream properties include information indicating a maximum set of spatial resolutions in the bitstream.

In another example, this disclosure describes a method of processing video data, the method comprising: signaling a set of bitstream properties in a bitstream, wherein the bitstream properties include information indicating a maximum set of maximum numbers of temporal sub-layers in the bitstream.

In another example, this disclosure describes a method of processing video data, the method comprising: signaling a set of bitstream properties in a bitstream, wherein the bitstream properties include information indicating a maximum set of maximum numbers of layers and maximum numbers of layer identifications (IDs) in the bitstream.

In another example, this disclosure describes a method of processing video data, the method comprising: signaling a set of bitstream properties in a bitstream, wherein the bitstream properties include information indicating a maximum set of operation points in the bitstream.

In another example, this disclosure describes a method of processing video data, the method comprising: signaling a set of bitstream properties in a bitstream, wherein the bitstream properties include information indicating a maximum set of maximum frame rates in the bitstream.

In another example, this disclosure describes a method of processing video data, the method comprising: signaling a set of bitstream properties in a bitstream, wherein the bitstream properties include information indicating a maximum set of maximum bitrates in the bitstream.

In another example, this disclosure describes a method of processing video data, the method comprising: signaling a set of bitstream properties in a bitstream, wherein the bitstream properties include information indicating a maximum set color formats in the bitstream.

In another example, this disclosure describes a method of processing video data, the method comprising: signaling a set of bitstream properties in a bitstream, wherein the bitstream properties include information indicating a maximum set of sample aspect ratios in the bitstream.

In another example, this disclosure describes a method of processing video data, the method comprising: signaling a set of bitstream properties in a bitstream, wherein the bitstream properties include information indicating a maximum set of luma bit depths and chroma bit depths in the bitstream.

In another example, this disclosure describes a method of processing video data, the method comprising: signaling a set of bitstream properties in a bitstream, wherein the bitstream properties include information indicating a maximum set of frame packing types in the bitstream.

In another example, this disclosure describes a method of processing video data, the method comprising: signaling a set of bitstream properties in a bitstream, wherein the bitstream properties include information indicating a maximum set of tiles in the bitstream.

In another example, this disclosure describes a method of processing video data, the method comprising: signaling a set of bitstream properties in a bitstream, wherein the bitstream properties include information indicating a maximum set of maximum coding tree block sizes and minimum coding block sizes in the bitstream.

In another example, this disclosure describes a method comprising any combination of the methods described above. In this example and other examples methods, the method may comprise signaling a set of bitstream properties. In this example, signaling a set of bitstream properties may comprises at least one of the following: signaling the set of bitstream properties in a bitstream properties SEI message; signaling the set of bitstream properties in a NAL unit that has a distinct NAL unit type, wherein the distinct NAL unit type defines the presence of the set of bitstream properties in the NAL unit; signaling the set of bitstream properties in an ISO base media file format; signaling the set of bitstream properties in a DASH MPD, wherein DASH stands for dynamic adaptive streaming over HTTP, HTTP stands for hypertext transfer protocol and MPD stands for media presentation description; signaling the set of bitstream properties as CODEC parameters according to RFC 6381; and signaling the set of bitstream properties in a SDP file. In this method, processing may comprise encoding; and signaling the set of bitstream properties in the bitstream may include generating the bitstream so as to include the set of bitstream properties. Alternatively, in this method, processing may comprise decoding; and signaling the set of bitstream properties in the bitstream may include receiving and decoding the bitstream that includes the set of bitstream properties. In this method, processing may occur at a MANE; and signaling the set of bitstream properties in the bitstream may include receiving and interpreting the set of bitstream properties without fully decoding the bitstream.

In another example, this disclosure describes a method of processing video data, the method comprising: signaling a set of ESPs in an elementary stream, wherein the ESP include information indicating whether tier and level remains unchanged for all CVSs in the elementary stream.

In another example, this disclosure describes a method of processing video data, the method comprising: signaling a set of ESPs in an elementary stream, wherein the ESP includes information indicating whether all CVSs in the elementary stream have a same spatial resolution.

In another example, this disclosure describes a method of processing video data, the method comprising: signaling a set of ESPs in an elementary stream, wherein the ESP include information indicating whether all CVSs in the elementary stream have a same maximum number of temporal sub-layers.

In another example, this disclosure describes a method of processing video data, the method comprising: signaling a set of ESPs in an elementary stream, wherein the ESP include information indicating whether all CVSs in the elementary stream have a same maximum number of layers. In this example, the method may further comprise signaling whether in all CVSs in the elementary stream, all the layers have the same set of layer IDs.

In another example, this disclosure describes a method of processing video data, the method comprising: signaling a set of ESPs in an elementary stream, wherein the ESP include information indicating whether all CVSs in the elementary stream support a same set of operation points.

In another example, this disclosure describes a method of processing video data, the method comprising: signaling a set of ESPs in an elementary stream, wherein the ESP include information indicating whether all CVSs in the elementary stream have a same maximum picture rate.

In another example, this disclosure describes a method of processing video data, the method comprising: signaling a set of ESPs in an elementary stream, wherein the ESP include information indicating whether all CVSs in the elementary stream have a same maximum bitrate.

In another example, this disclosure describes a method of processing video data, the method comprising: signaling a set of ESPs in an elementary stream, wherein the ESP include information indicating whether all CVSs in the elementary stream have a same color format.

In another example, this disclosure describes a method of processing video data, the method comprising: signaling a set of ESPs in an elementary stream, wherein the ESP include information indicating whether all CVSs in the elementary stream have a same sample aspect ratio.

In another example, this disclosure describes a method of processing video data, the method comprising: signaling a set of ESPs in an elementary stream, wherein the ESP include information indicating whether all CVSs in the elementary stream have a same set of bit depths for luma samples and chroma samples.

In another example, this disclosure describes a method of processing video data, the method comprising: signaling a set of ESPs in an elementary stream, wherein the ESP include information indicating whether at least one parameter set is updated in the elementary stream.

In another example, this disclosure describes a method of processing video data, the method comprising: signaling a set of ESPs in an elementary stream, wherein the ESP include information indicating whether all parameter sets are present at the beginning of the elementary stream.

In another example, this disclosure describes a method of processing video data, the method comprising: signaling a set of ESPs in an elementary stream, wherein the ESP include information indicating whether a presence of parameter sets in the elementary stream enables full random accessibility.

In another example, this disclosure describes a method of processing video data, the method comprising: signaling a set of ESPs in an elementary stream, wherein the ESP include information indicating whether all CVSs in the elementary stream contain only progressive frames coded in frame pictures.

In another example, this disclosure describes a method of processing video data, the method comprising: signaling a set of ESPs in an elementary stream, wherein the ESP include information indicating whether all CVSs in the elementary stream contain no frame packing arrangement SEI messages.

In another example, this disclosure describes a method of processing video data, the method comprising: signaling a set of ESPs in an elementary stream, wherein the ESP include information indicating whether all CVSs in the elementary stream contain the support of tiles.

In another example, this disclosure describes a method of processing video data, the method comprising: signaling a set of ESPs in an elementary stream, wherein the ESP include information indicating whether all CVSs in the elementary stream have a same tile configuration.

In another example, this disclosure describes a method of processing video data, the method comprising: signaling a set of ESPs in an elementary stream, wherein the ESP include information indicating whether all CVSs in the elementary stream have a same coding tree block size.

In another example, this disclosure describes a method of processing video data, the method comprising: signaling a set of ESPs in an elementary stream, wherein the ESP include information indicating whether all CVSs in the elementary stream have a same maximum coding tree block size.

In another example, this disclosure describes a method of processing video data, the method comprising: signaling a set of ESPs in an elementary stream, wherein the ESP include information indicating whether all CVSs in the elementary stream have a same minimum coding tree block size.

In another example, this disclosure describes a method of processing video data, the method comprising: signaling a set of ESPs in an elementary stream, wherein the ESP include information indicating whether all CVSs in the elementary stream have a same set of sequence level parameters.

In another example, this disclosure describes a method of processing video data, the method comprising: signaling a set of ESPs in an elementary stream, wherein the ESP include information indicating whether all CVSs in the elementary stream have some comment set of sequence level parameters.

In another example, this disclosure describes a method of processing video data, the method comprising: signaling a set of ESPs in an elementary stream, wherein the ESPs include information indicating whether all CVSs in the elementary stream make use of a particular coding tool. In this example, the particular coding tool may be one of: dependent slices; wavefront parallel processing; tiles; and weighted prediction.

In another example, this disclosure describes a method of processing video data, the method comprising: signaling a set of ESPs in an elementary stream, wherein the ESP include information indicating whether all CVSs in the elementary stream have a same SOP as described by SOP description SEI messages.

In another example, this disclosure describes a method of processing video data, the method comprising: signaling a set of ESPs in an elementary stream, wherein the ESP include information indicating whether all CVSs in the elementary stream can be decoded and outputted with acceptable quality.

In another example, this disclosure describes a method of processing video data, the method comprising: signaling a set of ESPs in an elementary stream, wherein the ESP include information indicating whether there should only be one VPS activated when the elementary stream is decoded. In this example, the method may further comprise: signaling a VPS identification (ID) of the one VPS.

In another example, this disclosure describes a method of processing video data, the method comprising: signaling a set of ESPs in an elementary stream, wherein the elementary stream include information indicating whether there should only be one SPS activated when the elementary stream is decoded. In this example, the method may further comprise signaling a SPS identification (ID) of the one SPS.

In another example, this disclosure describes a method of processing video data, the method comprising: signaling a set of ESPs in an elementary stream, wherein the ESP include information indicating whether there should only be one PPS activated when the elementary stream is decoded. In this example, the method may further comprise signaling a PPS identification (ID) of the one PPS.

In another example, this disclosure describes a method of processing video data, the method comprising: signaling a set of ESPs in an elementary stream, wherein the ESP include information indicating whether all RAP pictures are IDR pictures in the elementary stream.

In another example, this disclosure describes a method of processing video data, the method comprising: signaling a set of ESPs in an elementary stream, wherein the ESP include information indicating whether all RAP pictures are not IDR pictures in the elementary stream.

In another example, this disclosure describes a method of processing video data, the method comprising: signaling a set of ESPs in an elementary stream, wherein the ESP include information indicating whether there are RAP pictures that are IDR pictures in the elementary stream.

In another example, this disclosure describes a method of processing video data, the method comprising: signaling a set of ESPs in an elementary stream, wherein the ESP include information indicating whether there are non-IDR pictures that are RAP pictures in the elementary stream.

In another example, this disclosure describes a method of processing video data, the method comprising: signaling a set of ESPs in an elementary stream, wherein the ESPs include information indicating whether all RAP pictures in the elementary stream are CRA pictures.

In another example, this disclosure describes a method of processing video data, the method comprising: signaling a set of ESPs in an elementary stream, wherein the ESP include information indicating whether all RAP pictures in the elementary stream are not CRA pictures.

In another example, this disclosure describes a method of processing video data, the method comprising: signaling a set of ESPs in an elementary stream, wherein the ESP include information indicating whether there are RAP pictures in the elementary stream that are CRA pictures.

In another example, this disclosure describes a method of processing video data, the method comprising: signaling a set of ESPs in an elementary stream, wherein the ESP include information indicating whether there are non-CRA pictures that are RAP pictures in the elementary stream.

In another example, this disclosure describes a method of processing video data, the method comprising: signaling a set of ESPs in an elementary stream, wherein the ESP include information indicating whether all RAP pictures in the elementary stream are BLA pictures.

In another example, this disclosure describes a method of processing video data, the method comprising: signaling a set of ESPs in an elementary stream, wherein the ESP include information indicating whether all RAP pictures in the elementary stream are not BLA pictures.

In another example, this disclosure describes a method of processing video data, the method comprising: signaling a set of ESPs in an elementary stream, wherein the ESP include information indicating whether there are RAP pictures in the elementary stream that are BLA pictures.

In another example, this disclosure describes a method of processing video data, the method comprising: signaling a set of ESPs in an elementary stream, wherein the ESP include information indicating whether there are non-IDR pictures in the elementary stream that are BLA pictures.

In another example, this disclosure describes a method of processing video data, the method comprising: signaling a set of ESPs in an elementary stream, wherein the ESP include information indicating whether there are DLPs in the elementary stream.

In another example, this disclosure describes a method of processing video data, the method comprising: signaling a set of ESPs in an elementary stream, wherein the ESP include information indicating whether there are NLPs in the elementary stream.

In another example, this disclosure describes a method of processing video data, the method comprising: signaling a set of ESPs in an elementary stream, wherein the ESP include information indicating whether there are TSA pictures in the elementary stream.

In another example, this disclosure describes a method of processing video data, the method comprising: signaling a set of ESPs in an elementary stream, wherein the ESP include information indicating whether there are STSA pictures in the elementary stream.

In another example, this disclosure describes a method of processing video data, the method comprising: signaling a set of ESPs in an elementary stream, wherein the ESP include information indicating whether a value of sps_temporal_id_nesting_flag is identical for all sequence parameter sets that are activated when the elementry stream is decoded.

In another example, this disclosure describes a method of processing video data, the method comprising: signaling a set of ESPs in an elementary stream, wherein the set of ESP include information indicating whether a value of vps_temporal_id_nesting_flag is identical for all video parameter sets that are activated when the elementary stream is decoded.

In another example, this disclosure describes a method of processing video data, the method comprising: signaling a set of ESPs in an elementary stream, wherein the bitstream properties include information indicating a set of profiles in the bitstream.

In another example, this disclosure describes a method of processing video data, the method comprising: signaling a set of ESPs in an elementary stream, wherein the ESPs include information indicating a maximum set of profiles in the elementary stream.

In another example, this disclosure describes a method of processing video data, the method comprising: signaling a set of ESPs in an elementary stream, wherein the ESPs include information indicating a maximum set of tiers and levels in the elementary stream.

In another example, this disclosure describes a method of processing video data, the method comprising: signaling a set of ESPs in an elementary stream, wherein the ESPs include information indicating a maximum set of spatial resolutions in the elementary stream.

In another example, this disclosure describes a method of processing video data, the method comprising: signaling a set of ESPs in an elementary stream, wherein the ESPs include information indicating a maximum set of maximum numbers of temporal sub-layers in the elementary stream.

In another example, this disclosure describes a method of processing video data, the method comprising: signaling a set of ESPs in an elementary stream, wherein the ESPs include information indicating a maximum set of maximum numbers of layers and maximum numbers of layer identifications (IDs) in the elementary stream.

In another example, this disclosure describes a method of processing video data, the method comprising: signaling a set of ESPs in an elementary stream, wherein the ESPs include information indicating a maximum set of operation points in the elementary stream.

In another example, this disclosure describes a method of processing video data, the method comprising: signaling a set of ESPs in an elementary stream, wherein the ESPs include information indicating a maximum set of maximum frame rates in the elementary stream.

In another example, this disclosure describes a method of processing video data, the method comprising: signaling a set of ESPs in an elementary stream, wherein the ESPs include information indicating a maximum set of maximum bitrates in the elementary stream.

In another example, this disclosure describes a method of processing video data, the method comprising: signaling a set of ESPs in an elementary stream, wherein the ESPs include information indicating a maximum set color formats in the elementary stream.

In another example, this disclosure describes a method of processing video data, the method comprising: signaling a set of ESPs in an elementary stream, wherein the ESPs include information indicating a maximum set of sample aspect ratios in the elementary stream.

In another example, this disclosure describes a method of processing video data, the method comprising: signaling a set of ESPs in an elementary stream, wherein the ESPs include information indicating a maximum set of luma bit depths and chroma bit depths in the elementary stream.

In another example, this disclosure describes a method of processing video data, the method comprising: signaling a set of ESPs in an elementary stream, wherein the ESPs include information indicating a maximum set of frame packing types in the elementary stream.

In another example, this disclosure describes a method of processing video data, the method comprising: signaling a set of ESPs in an elementary stream, wherein the ESPs include information indicating a maximum set of tiles in the elementary stream.

In another example, this disclosure describes a method of processing video data, the method comprising: signaling a set of ESPs in an elementary stream, wherein the ESPs include information indicating a maximum set of maximum coding tree block sizes and minimum coding block sizes in the elementary stream.

In another example, this disclosure describes a method comprising any combinations of the above methods that signal a set of ESPS in an elementary stream. In this example, signaling the set of ESPs may comprise at least one of the following: signaling the set of ESP in an ESP SEI message; signaling the set of ESP in a NAL unit that has a distinct ESP NAL unit type, wherein the distinct ESP NAL unit type define the presence of the set of ESP properties in the NAL unit; signaling the set of ESP in an ISO base media file format: signaling the set of ESP in a DASH MPD; signaling the set of ESPs as CODEC parameters according to RFC 6381; and signaling the set of ESP in an SDP file. In this example, processing may comprise encoding; and signaling the set of ESPs may include generating the elementary stream so as to include the set of ESP. In this example, processing may comprise decoding; and signaling the set of ESP may include receiving and decoding the elementary stream that includes the set of ESP. In this example, processing may occur at a MANE; and signaling the set of ESP may include receiving and interpreting the set of ESP without fully decoding the elementary stream.

In another example, this disclosure describes a method of processing video data, the method comprising: signaling bitstream properties in a bitstream, wherein the bitstream properties include one or more of the bitstream properties described in this disclosure. In this example, processing may refers to encoding and signaling may comprise generating a bitstream or elementary stream. In this example, processing may refer to decoding and signaling may comprise receiving and interpreting a bitstream or elementary stream. In this example, processing may refer to processing without decoding and signaling may comprise receiving and interpreting portions of a bitstream or elementary stream.

In another example, this disclosure describes a method of processing video data, the method comprising: signaling elementary stream properties in an elementary stream, wherein the elementary stream properties include one or more of the elementary stream properties described in this disclosure. In this example, processing may refers to encoding and signaling may comprise generating a bitstream or elementary stream. In this example, processing may refer to decoding and signaling may comprise receiving and interpreting a bitstream or elementary stream. In this example, processing may refer to processing without decoding and signaling may comprise receiving and interpreting portions of a bitstream or elementary stream.

In one or more of the example methods described above, or combinations thereof, the properties may include information that indicates at least one of:

1) Whether tier and level remains unchanged for all CVSs in the bitstream or elementary stream.
2) Whether all CVSs in the bitstream or elementary stream have the same spatial resolution.
3) Whether all CVSs in the bitstream or elementary stream have the same (maximum) number of temporal sub-layers.
4) Whether all CVSs in the bitstream or elementary stream have the same (maximum) number of layers (i.e. number of values for nuh_reserved_zero_6 bits for VCL NAL units), and if yes, whether in all CVSs in the bitstream or elementary stream all the layers have the same set of layer IDs (i.e. same set of nuh_reserved_zero_6 bits values).
5) Whether all CVSs in the bitstream or elementary stream support the same set of operation points. An operation point is e.g., identified by a set of nuh_reserved_zero_6 bits values, denoted as OpLayerIdSet, and a TemporalId value, denoted as OpTid, and the associated bitstream subset derived as the output of the sub-bitstream extraction process as specified in HEVC with OpTid and OpLayerIdSet as inputs is independently decodable.
6) Whether all CVSs in the bitstream or elementary stream have the same (maximum) picture rate.
7) Whether all CVSs in the bitstream or elementary stream have the same maximum bitrate.
8) Whether all CVSs in the bitstream or elementary stream have the same color format.

9) Whether all CVSs in the bitstream or elementary stream have the same sample aspect ratio.
10) Whether all CVSs in the bitstream or elementary stream have the same set of bit depths for luma and chroma.
11) Whether in the bitstream or elementary stream at least one parameter set is updated, i.e. a VPS. SPS or PPS is changed but using the same VPS, SPS or PPS ID. Or whether in the bitstream or elementary stream at least one VPS is updated, whether in the bitstream or elementary stream at least one SPS is updated, and whether in the bitstream or elementary stream at least one PPS is updated.
12) Whether all parameter sets are present at the beginning of the bitstream or elementary stream (i.e. within the first access unit in the bitstream or elementary stream)—note that if the condition is true, there may still be parameter sets repeated in other access units, e.g. for error resilience purposes, but there will nott be any parameter set update. Or whether all VPSs are present at the beginning of the bitstream or elementary stream, whether all SPSs are present at the beginning of the bitstream or elementary stream, and weather all PPSs are present at the beginning of the bitstream or elementary stream.
13) Whether the presence of parameter sets in the bitstream or elementary stream enables full random accessibility, i.e. it is possible to perform random access at the position of each RAP access unit by discarding all access units before the RAP access unit (and to correctly decode the RAP picture and all the subsequent non-TFD pictures in decoding order). This requires that, when the above random access is performed at any RAP access unit, each parameter set is available in the bitstream when it needs to be activated.
14) Whether all CVSs in the bitstream or elementary stream contain only progressive frames coded in frame pictures, i.e. the scan type is progressive not interlaced, and there is no field pictures.
15) Whether all CVSs in the bitstream or elementary stream contain no frame packing arrangement SEI messages, i.e. the video segment represented by each CVS in the bitstream or elementary stream is not frame-packed.
16) Whether all CVSs in the bitstream or elementary stream have the support of tiles and/or the same tile configuration.
17) Whether all CVSs in the bitstream or elementary stream have the same coding tree block size and the same minimum coding block size.
18) Whether all CVSs in the bitstream or elementary stream have the same set of sequence level HRD parameters (or a part thereof), e.g. as signaled in the hrd_parameters( ) syntax structure as specified in HEVC, and/or the same set of decoded picture buffer sizes, e.g. as signaled by the vps_max_dec_pic_buffering[i] syntax element as specified in HEVC.
19) Whether all CVSs in the bitstream or elementary stream make use of a particular coding tool, e.g., dependent slices (supported when dependent_slices_enabled_flag is equal to 1), wavefront parallel processing (supported when entropy_coding_sync_enabled_flag is equal to 1), weighted prediction, and so on.
20) Whether all CVSs in the bitstream or elementary stream have the same structures of pictures (SOP) as described by SOP description SEI messages.
21) Whether TFD pictures in all CVSs in the bitstream or elementary stream may be decoded and outputted with acceptable quality.
22) Whether there is only one VPS that is activated when the bitstream or elementary stream is decoded, and if yes, the VPS ID of that VPS.
23) Whether there is only one SPS that is activated when the bitstream or elementary stream is decoded, and if yes, the SPS ID of that SPS.
24) Whether there is only one PPS that is activated when the bitstream or elementary stream is decoded, and if yes, the PPS ID of that PPS.
25) One or more of the following and their combinations:
   a. Whether in the bitstream or elementary stream all RAP pictures are IDR pictures.
   b. Whether in the bitstream or elementary stream all RAP pictures are not IDR pictures.
   c. Whether in the bitstream or elementary stream there are RAP pictures that are IDR pictures.
   d. Whether in the bitstream or elementary stream there are non-IDR RAP pictures.
   e. Whether in the bitstream or elementary stream all RAP pictures are CRA pictures.
   f. Whether in the bitstream or elementary stream all RAP pictures are not CRA pictures.
   g. Whether in the bitstream or elementary stream there are RAP pictures that are CRA pictures.
   h. Whether in the bitstream or elementary stream there are non-CRA RAP pictures.
   i. Whether in the bitstream or elementary stream all RAP pictures are BLA pictures.
   j. Whether in the bitstream or elementary stream all RAP pictures are not BLA pictures.
   k. Whether in the bitstream or elementary stream there are RAP pictures that are BLA pictures.
   l. Whether in the bitstream or elementary stream there are non-IDR BLA pictures.
   m. Whether in the bitstream or elementary stream there are DLP pictures.
   n. Whether in the bitstream or elementary stream there are TFD pictures.
   o. Whether in the bitstream or elementary stream there are TSA pictures.
   p. Whether in the bitstream or elementary stream there are STSA pictures.
26) Whether the value of sps_temporal_id_nesting_flag is identical for all sequence parameter sets that are activated when the elementary stream is decoded.
27) Whether the value of vps_temporal_id_nesting_flag is identical for all video parameter sets that are activated when the elementary stream is decoded.

In one or more of the example methods described above, of combinations thereof, the properties may include information that indicates at least one of:
1) The set of profiles (possibly with additional restrictions such as signaled in general_profile_compatibility_flag [i] for i in the range of 0 to 31, inclusive, and general_reserved_zero_16 bits as specified in HEVC) in the bitstream. Alternatively, the maximum set of profiles in the bitstream or elementary stream (i.e. no CVS in the bitstream or elementary stream shall conform to a profile that is not included in the set).
2) The (maximum) set of tiers and levels in the bitstream or elementary stream. This may be efficiently signaled as the highest tier, and for each tier the highest level.
3) The (maximum) set of spatial resolutions in the bitstream or elementary stream.
4) The (maximum) set of (maximum) numbers of temporal sub-layers in the bitstream or elementary stream.

5) The (maximum) set of (maximum) numbers of layers (i.e. number of values for nuh_reserved_zero__6 bits for VCL NAL units) and the (maximum) set of layer IDs (i.e. nuh_reserved_zero__6 bits values) in the bitstream or elementary stream.
6) The (maximum) set of operation points in the bitstream or elementary stream.
7) The (maximum) set of (maximum) frame rates in the bitstream or elementary stream.
8) The (maximum) set of maximum bitrates in the bitstream or elementary stream.
9) The (maximum) set of color formats in the bitstream or elementary stream.
10) The (maximum) set of sample aspect ratios in the bitstream or elementary stream.
11) The (maximum) set of luma bit depths and chroma bit depths in the bitstream or elementary stream.
12) The (maximum) set of frame packing types in the bitstream or elementary stream.
13) The (maximum) number of tiles in the bitstream or elementary stream.
14) The (maximum) set of coding tree block sizes and minimum coding block sizes in the bitstream or elementary stream.

In one or more of the example methods described above, of combinations thereof, signaling may comprise signaling via a SEI message. In one or more of the example methods described above, of combinations thereof, signaling may comprise signaling via a NAL unit.

One or more devices may be configured to perform the methods described above. In some examples, the one or more devices may include an encoder, a decoder, or a MANE.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing video data, the method comprising:
   determining, based on a signaled property of a bitstream that comprises an encoded representation of the video data, whether a video decoder is able to decode the bitstream,
       wherein the bitstream conforms to a video coding specification and comprises a plurality of coded video sequences (CVSs), and
       wherein the signaled property having a particular value indicates that values of profile indicator syntax elements are respectively identical for all sequence parameter sets (SPSs) that are activated when the bitstream is decoded,
       wherein each of the SPSs contains information that applies to all slices of a coded video sequence (CVS), and
       wherein the profile indicator syntax elements indicate that CVSs to which the SPSs apply conform to a profile, the profile being a subset of an entire bitstream syntax that is specified by the video coding specification; and
   processing, based on the determination, the bitstream.

2. The method of claim 1, wherein the signaled property is signaled in an International Organization for Standardization (ISO) base media file format file.

3. The method of claim 2, wherein the signaled property is signaled in a sample entry in a High Efficiency Video Coding (HEVC) video track of the ISO base media file format file.

4. The method of claim 1, wherein the signaled property comprises a parameter in an element or attribute in a media presentation description (MPD) of dynamic adaptive streaming over hypertext transfer protocol (DASH).

5. The method of claim 1, wherein the signaled property comprises a parameter of a session description protocol (SDP).

6. The method of claim 1, wherein processing the bitstream comprises decoding the bitstream.

7. The method of claim 1, wherein the signaled property is indicated by a particular syntax element.

8. The method of claim 7, wherein:
each of the SPSs includes a plurality of general profile compatibility flag syntax elements,
each respective general profile compatibility flag syntax element in each plurality of general profile compatibility flag syntax elements is associated with an index,
corresponding general profile compatibility flag syntax elements are associated with the same index, and
when the particular syntax element has the particular value, each of the corresponding general profile compatibility flag syntax elements in the SPSs has an identical value.

9. The method of claim 7, wherein:
each of the SPSs includes a general_reserved_zero_16bits syntax element, and
when the particular syntax element has the particular value, the general_reserved_zero_16bits syntax element in each of the SPSs has the same value.

10. The method of claim 1, wherein the signaled property comprises a particular syntax element in a Supplemental Enhancement Information (SEI) message.

11. The method of claim 10, wherein the video coding specification requires the SEI message to be in the first access unit of the bitstream.

12. The method of claim 10, wherein the video coding specification allows the SEI message to be signaled in any random access point (RAP) access unit of the bitstream.

13. The method of claim 10, wherein:
a Network Abstraction Layer (NAL) unit encapsulates the SEI message, and
the video coding specification requires the SEI message to be the first SEI message in the NAL unit.

14. The method of claim 10, wherein:
a Network Abstraction Layer (NAL) unit encapsulates the SEI message, and
the video coding specification requires the SEI message to be the only SEI message in the NAL unit.

15. The method of claim 10, wherein:
a Network Abstraction Layer (NAL) unit in an access unit encapsulates the SEI message, and
the video coding specification requires the NAL unit to be the first SEI NAL unit in the access unit, except for an elementary stream level NAL unit.

16. The method of claim 10, wherein the SEI message comprises one or more of the following plurality of flags:
a bitstream_tier_level_unchanging_flag syntax element that indicates whether values of general_tier_flag syntax elements and general_level_idc syntax elements are identical for all the SPSs that are activated when the bitstream is decoded, wherein the general_tier_flag syntax elements indicate tier contexts for interpretation of the general_level_idc syntax elements and the general_level_idc syntax elements indicate levels to which the CVSs conform;
a bitstream_spatial_resolution_unchanging_flag syntax element that indicates whether all CVSs of the bitstream have the same spatial resolution;
a syntax element that indicates whether the number of temporal sub-layers of the bitstream is identical for all CVSs in the bitstream;
a syntax element that indicates whether a maximum bitrate is identical for all the CVSs in the bitstream;
a syntax element that indicates whether a maximum picture rate is identical for all the CVSs in the bitstream;
a syntax element that indicates whether all the CVSs in the bitstream have the same color format;
a syntax element that indicates whether all the CVSs in the bitstream have the same sample aspect ratio;
a syntax element that indicates whether all the CVSs in the bitstream have the same set of bit depths for luma and chroma;
a syntax element that indicates whether the presence of parameter sets in the bitstream enables full random accessibility;
a syntax element that indicates whether all parameter sets are present within the first access unit in the bitstream;
a syntax element that indicates whether in the bitstream at least one VPS is updated, whether in the bitstream at least one SPS is updated, or whether in the bitstream at least one PPS is updated;
a syntax element that indicates whether all SPSs that are activated when the bitstream is decoded are present in the first access unit in the bitstream;
a syntax element that indicates whether at least one SPS is updated but using the same SPS identifier;
a syntax element that indicates whether all PPS are present at the beginning of the bitstream;
a syntax element that indicates whether in the bitstream at least one PPS is changed but the same PPS identifier is used;
a syntax element that indicates whether all CVSs in the bitstream contain only progressive frames coded in frame pictures;
a syntax element that indicates whether all CVSs in the bitstream contain no frame packing arrangement SEI messages;
a syntax element that indicates whether all CVSs in the bitstream have the same tile configuration;
a syntax element that indicates whether all CVSs in the bitstream make use of wavefront parallel processing;
a syntax element that indicates whether all CVSs in the bitstream make use of dependent slices; and
a syntax element that indicates whether any additional data follows in the SEI message.

17. A method of processing video data, the method comprising:
signaling a property of a bitstream, wherein the bitstream conforms to a video coding specification and comprises a plurality of coded video sequences (CVSs),
wherein the property having a particular value indicates that values of profile indicator syntax elements are respectively identical for all sequence parameter sets (SPSs) that are activated when the bitstream is decoded,
wherein each of the SPSs contains information that applies to all slices of a coded video sequence (CVS), and
wherein the profile indicator syntax elements indicate that CVSs to which the SPSs apply conform to a profile, the profile being a subset of an entire bitstream syntax that is specified by the video coding specification.

18. The method of claim 17, wherein the property is indicated by a particular syntax element.

19. The method of claim 18, wherein:
each of the SPSs includes a plurality of general profile compatibility flag syntax elements,
each respective general profile compatibility flag syntax element in each plurality of general profile compatibility flag syntax elements is associated with an index,
corresponding general profile compatibility flag syntax elements are associated with the same index, and
when the particular syntax element has the particular value, each of the corresponding general profile compatibility flag syntax elements in the SPSs has an identical value.

20. The method of claim 18, wherein:
each of the SPSs includes a general_reserved zero_16bits syntax element, and
when the particular syntax element has the particular value, the general_reserved_zero_16bits syntax element in each of the SPSs has the same value.

21. The method of claim 17, wherein signaling the property comprises signaling a particular syntax element in a Supplemental Enhancement Information (SEI) message.

22. The method of claim 21, wherein the video coding specification requires the SEI message to be in the first access unit of the bitstream.

23. The method of claim 21, wherein the video coding specification allows the SEI message to be signaled in any random access point (RAP) access unit of the bitstream.

24. The method of claim 21, wherein:
a Network Abstraction Layer (NAL) unit encapsulates the SEI message, and
the video coding specification requires the SEI message to be the first SEI message in the NAL unit.

25. The method of claim 21, wherein:
a Network Abstraction Layer (NAL) unit encapsulates the SEI message, and
the video coding specification requires the SEI message to be the only SEI message in the NAL unit.

26. The method of claim 21, wherein:
a Network Abstraction Layer (NAL) unit in an access unit encapsulates the SEI message, and
the video coding specification requires the NAL unit to be the first SEI NAL unit in the access unit, except for an elementary stream level NAL unit.

27. The method of claim 21, wherein the SEI message comprises one or more of the following plurality of flags:
a bitstream_tier_level_unchanging_flag syntax element that indicates whether values of general_tier_flag syntax elements and general_level_idc syntax elements are identical for all the SPSs that are activated when the bitstream is decoded, wherein the general_tier_flag syntax elements indicate tier contexts for interpretation of the general_level_idc syntax elements and the general_level_idc syntax elements indicate levels to which the CVSs conform;
a bitstream_spatial_resolution_unchanging flag syntax element that indicates whether all CVSs of the bitstream have the same spatial resolution;
a syntax element that indicates whether the number of temporal sub-layers of the bitstream is identical for all CVSs in the bitstream;
a syntax element that indicates whether a maximum bitrate is identical for all the CVSs in the bitstream;
a syntax element that indicates whether a maximum picture rate is identical for all the CVSs in the bitstream;
a syntax element that indicates whether all the CVSs in the bitstream have the same color format;
a syntax element that indicates whether all the CVSs in the bitstream have the same sample aspect ratio;
a syntax element that indicates whether all the CVSs in the bitstream have the same set of bit depths for luma and chroma;
a syntax element that indicates whether the presence of parameter sets in the bitstream enables full random accessibility;
a syntax element that indicates whether all parameter sets are present within the first access unit in the bitstream;
a syntax element that indicates whether in the bitstream at least one VPS is updated, whether in the bitstream at least one SPS is updated, or whether in the bitstream at least one PPS is updated;
a syntax element that indicates whether all SPSs that are activated when the bitstream is decoded are present in the first access unit in the bitstream;
a syntax element that indicates whether at least one SPS is updated but using the same SPS identifier;
a syntax element that indicates whether all PPS are present at the beginning of the bitstream;
a syntax element that indicates whether in the bitstream at least one PPS is changed but the same PPS identifier is used;
a syntax element that indicates whether all CVSs in the bitstream contain only progressive frames coded in frame pictures;
a syntax element that indicates whether all CVSs in the bitstream contain no frame packing arrangement SEI messages;
a syntax element that indicates whether all CVSs in the bitstream have the same tile configuration;
a syntax element that indicates whether all CVSs in the bitstream make use of wavefront parallel processing;
a syntax element that indicates whether all CVSs in the bitstream make use of dependent slices; and
a syntax element that indicates whether any additional data follows in the SEI message.

28. A video processing device comprising:
one or more data storage media configured to store at least a portion of a bitstream that comprises an encoded representation of video data
one or more processors configured to:
determine, based on a signaled property of the bitstream, whether a video decoder is able to decode bitstream, wherein the signaled property having a particular value indicates that values of profile indicator syntax elements are respectively identical for all sequence parameter sets (SPSs) that are activated when the bitstream is decoded,
wherein each of the SPSs contains information that applies to all slices of a coded video sequence (CVS), and
wherein the profile indicator syntax elements indicate that CVSs to which the SPSs apply conform to a profile, the profile being a subset of an entire bitstream syntax that is specified by the video coding specification; and
process, based on the determination, the bitstream.

29. The video processing device of claim 28, wherein the signaled property indicated by is a particular syntax element.

30. The video processing device of claim 29, wherein:
each of the SPSs includes a plurality of general profile compatibility flag syntax elements,
each respective general profile compatibility flag syntax element in each plurality of general profile compatibility flag syntax elements is associated with an index,
corresponding general profile compatibility flag syntax elements are associated with the same index, and when the particular syntax element has the particular value, each of the corresponding general profile compatibility flag syntax elements in the SPSs has an identical value.

31. The video processing device of claim 29, wherein:
each of the SPSs includes a general_reserved_zero_16bits syntax element, and
when the particular syntax element has the particular value, the general_reserved_zero_16bits syntax element in each of the SPSs has the same value.

32. The video processing device of claim 28, wherein the signaled property comprises a particular syntax element in a Supplemental Enhancement Information (SEI) message.

33. The video processing device of claim 32, wherein the video coding specification requires the SEI message to be in the first access unit of the bitstream.

34. The video processing device of claim 32, wherein the video coding specification allows the SEI message to be signaled in any random access point (RAP) access unit of the bitstream.

35. The video processing device of claim 32, wherein:
a Network Abstraction Layer (NAL) unit encapsulates the SEI message, and
the video coding specification requires the SEI message to be the first SEI message in the NAL unit.

36. The video processing device of claim 32, wherein:
a Network Abstraction Layer (NAL) unit encapsulates the SEI message, and
the video coding specification requires the SEI message to be the only SEI message in the NAL unit.

37. The video processing device of claim 32, wherein:
a Network Abstraction Layer (NAL) unit in an access unit encapsulates the SEI message, and
the video coding specification requires the NAL unit to be the first SEI NAL unit in the access unit, except for an elementary stream level NAL unit.

38. The video processing device of claim 32, wherein the SEI message comprises one or more of the following plurality of flags:
a bitstream_tier_level_unchanging_flag syntax element that indicates whether values of general_tier_flag syntax elements and general_level_idc syntax elements are identical for all the SPSs that are activated when the bitstream is decoded, wherein the general_tier_flag syntax elements indicate tier contexts for interpretation of the general_level_idc syntax elements and the general_level_idc syntax elements indicate levels to which the CVSs conform;
a bitstream_spatial_resolution_unchanging flag syntax element that indicates whether all CVSs of the bitstream have the same spatial resolution;
a syntax element that indicates whether the number of temporal sub-layers of the bitstream is identical for all CVSs in the bitstream;
a syntax element that indicates whether a maximum bitrate is identical for all the CVSs in the bitstream;
a syntax element that indicates whether a maximum picture rate is identical for all the CVSs in the bitstream;
a syntax element that indicates whether all the CVSs in the bitstream have the same color format;
a syntax element that indicates whether all the CVSs in the bitstream have the same sample aspect ratio;
a syntax element that indicates whether all the CVSs in the bitstream have the same set of bit depths for luma and chroma;
a syntax element that indicates whether the presence of parameter sets in the bitstream enables full random accessibility;
a syntax element that indicates whether all parameter sets are present within the first access unit in the bitstream;
a syntax element that indicates whether in the bitstream at least one VPS is updated, whether in the bitstream at least one SPS is updated, or whether in the bitstream at least one PPS is updated;
a syntax element that indicates whether all SPSs that are activated when the bitstream is decoded are present in the first access unit in the bitstream;
a syntax element that indicates whether at least one SPS is updated but using the same SPS identifier;
a syntax element that indicates whether all PPS are present at the beginning of the bitstream;
a syntax element that indicates whether in the bitstream at least one PPS is changed but the same PPS identifier is used;
a syntax element that indicates whether all CVSs in the bitstream contain only progressive frames coded in frame pictures;
a syntax element that indicates whether all CVSs in the bitstream contain no frame packing arrangement SEI messages;
a syntax element that indicates whether all CVSs in the bitstream have the same tile configuration;
a syntax element that indicates whether all CVSs in the bitstream make use of wavefront parallel processing;
a syntax element that indicates whether all CVSs in the bitstream make use of dependent slices; and
a syntax element that indicates whether any additional data follows in the SEI message.

39. A video processing device comprising:
one or more data storage media configured to store video data and
one or more processors configured to:
signal a property of a bitstream that comprises an encoded representation of the video data, wherein the bitstream conforms to a video coding specification and comprises a plurality of coded video sequences (CVSs),
wherein the signaled property having a particular value indicates that values of profile indicator syntax elements are respectively identical for all sequence parameter sets (SPSs) that are activated when the bitstream is decoded,
wherein each of the SPSs contains information that applies to all slices of a coded video sequence (CVS), and
wherein the profile indicator syntax elements indicate that CVSs to which the SPSs apply conform to a profile, the profile being a subset of an entire bitstream syntax that is specified by the video coding specification.

40. The video processing device of claim 39, wherein the property is indicated by a particular syntax element.

41. The video processing device of claim 40, wherein:
each of the SPSs includes a plurality of general profile compatibility flag syntax elements,
each respective general profile compatibility flag syntax element in each plurality of general profile compatibility flag syntax elements is associated with an index,
corresponding general profile compatibility flag syntax elements are associated with the same index, and
when the particular syntax element has the particular value, each of the corresponding general profile compatibility flag syntax elements in the SPSs has an identical value.

42. The video processing device of claim 40, wherein:
each of the SPSs includes a general_reserved_zero_16bits syntax element, and
when the particular syntax element has the particular value, the general_reserved_zero_16bits syntax element in each of the SPSs has the same value.

43. The video processing device of claim 39, wherein the one or more processors are configured to signal a particular syntax element in a Supplemental Enhancement Information (SEI) message.

44. The video processing device of claim 43, wherein the video coding specification requires the SEI message to be in the first access unit of the bitstream.

45. The video processing device of claim 43, wherein the video coding specification allows the SEI message to be signaled in any random access point (RAP) access unit of the bitstream.

46. The video processing device of claim 43, wherein:
a Network Abstraction Layer (NAL) unit encapsulates the SEI message, and
the video coding specification requires the SEI message to be the first SEI message in the NAL unit.

47. The video processing device of claim 43, wherein:
a Network Abstraction Layer (NAL) unit encapsulates the SEI message, and
the video coding specification requires the SEI message to be the only SEI message in the NAL unit.

48. The video processing device of claim 43, wherein:
a Network Abstraction Layer (NAL) unit in an access unit encapsulates the SEI message, and
the video coding specification requires the NAL unit to be the first SEI NAL unit in the access unit, except for an elementary stream level NAL unit.

49. The video processing device of claim 43, wherein the SEI message comprises one or more of the following plurality of flags:
a bitstream_tier_level_unchanging_flag syntax element that indicates whether values of general_tier_flag syntax elements and general_level_idc syntax elements are identical for all the SPSs that are activated when the bitstream is decoded, wherein the general_tier_flag syntax elements indicate tier contexts for interpretation of the general_level_idc syntax elements and the general_level_idc syntax elements indicate levels to which the CVSs conform;
a bitstream_spatial_resolution_unchanging_flag syntax element that indicates whether all CVSs of the bitstream have the same spatial resolution;
a syntax element that indicates whether the number of temporal sub-layers of the bitstream is identical for all CVSs in the bitstream;
a syntax element that indicates whether a maximum bitrate is identical for all the CVSs in the bitstream;
a syntax element that indicates whether a maximum picture rate is identical for all the CVSs in the bitstream;
a syntax element that indicates whether all the CVSs in the bitstream have the same color format;
a syntax element that indicates whether all the CVSs in the bitstream have the same sample aspect ratio;
a syntax element that indicates whether all the CVSs in the bitstream have the same set of bit depths for luma and chroma;
a syntax element that indicates whether the presence of parameter sets in the bitstream enables full random accessibility;
a syntax element that indicates whether all parameter sets are present within the first access unit in the bitstream;
a syntax element that indicates whether in the bitstream at least one VPS is updated, whether in the bitstream at least one SPS is updated, or whether in the bitstream at least one PPS is updated;
a syntax element that indicates whether all SPSs that are activated when the bitstream is decoded are present in the first access unit in the bitstream;
a syntax element that indicates whether at least one SPS is updated but using the same SPS identifier;
a syntax element that indicates whether all PPS are present at the beginning of the bitstream;
a syntax element that indicates whether in the bitstream at least one PPS is changed but the same PPS identifier is used;
a syntax element that indicates whether all CVSs in the bitstream contain only progressive frames coded in frame pictures;
a syntax element that indicates whether all CVSs in the bitstream contain no frame packing arrangement SEI messages;
a syntax element that indicates whether all CVSs in the bitstream have the same tile configuration;
a syntax element that indicates whether all CVSs in the bitstream make use of wavefront parallel processing;
a syntax element that indicates whether all CVSs in the bitstream make use of dependent slices; and
a syntax element that indicates whether any additional data follows in the SEI message.

50. A video decoding device comprising:
means for determining, based on a signaled property of a bitstream that comprises an encoded representation of video data, whether a video decoder is able to decode the bitstream,
wherein the signaled property having a particular value indicates that values of profile indicator syntax elements are respectively identical for all sequence parameter sets (SPSs) that are activated when the bitstream is decoded,
wherein each of the SPSs contains information that applies to all slices of a coded video sequence (CVS), and
wherein the profile indicator syntax elements indicate that CVSs to which the SPSs apply conform to a profile, the profile being a subset of an entire bitstream syntax that is specified by the video coding specification; and
means for processing, based on the determination, the bitstream.

51. A non-transitory computer-readable data storage medium having instructions stored thereon that, when executed, configure a video decoder to:
determine, based on a signaled property of a bitstream that comprises an encoded representation of video data, whether a video decoder is able to decode the bitstream,
wherein the signaled property having a particular value indicates that values of profile indicator syntax elements are respectively identical for all sequence parameter sets (SPSs) that are activated when the bitstream is decoded,
wherein each of the SPSs contains information that applies to all slices of a coded video sequence (CVS), and
wherein the profile indicator syntax elements indicate that CVSs to which the SPSs apply conform to a profile, the profile being a subset of an entire bitstream syntax that is specified by the video coding specification; and
process, based on the determination, the bitstream.

* * * * *